United States Patent
Yamasaki et al.

(10) Patent No.: US 6,769,759 B2
(45) Date of Patent: Aug. 3, 2004

(54) PRINTING WITH SELECTION OF SUB-SCANNING

(75) Inventors: Keigo Yamasaki, Nagano-ken (JP); Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/187,329

(22) Filed: Jun. 28, 2002

(65) Prior Publication Data

US 2003/0048326 A1 Mar. 13, 2003

(30) Foreign Application Priority Data

| Jul. 2, 2001 | (JP) | 2001-200746 |
| Jul. 12, 2001 | (JP) | 2001-212280 |
| Jul. 25, 2001 | (JP) | 2001-224613 |

(51) Int. Cl.$^7$ .............. B41J 2/145; B41J 2/15; B41J 29/393
(52) U.S. Cl. .................. 347/41; 347/19
(58) Field of Search ............ 347/43, 19, 41, 347/16; 358/1.2, 1.8, 1.9

(56) References Cited

U.S. PATENT DOCUMENTS

| 4,198,642 A | 4/1980 | Gamblin ............... 347/41 |
| 6,137,592 A | * 10/2000 | Arquilevich et al. ...... 358/1.8 |
| 6,386,673 B1 | * 5/2002 | Takahashi et al. ......... 347/19 |

FOREIGN PATENT DOCUMENTS

| EP | 0 931 671 A2 A3 | 7/1999 |
| EP | 1 002 651 A2 A3 | 5/2000 |
| JP | 08-085242 | 4/1996 |
| JP | 11-254776 | 9/1999 |
| JP | 2000-153660 | 6/2000 |

OTHER PUBLICATIONS

Abstract of Japanese Patent Pub. No. 08–085242, Pub. Date: Apr. 2, 1996, Patent Abstracts of Japan.
Abstract of Japanese Patent Pub. No. 11–254776, Pub. Date: Sep. 21 1999, Patent Abstracts of Japan.
Abstract of Japanese Patent Pub. No. 2000–153660, Pub. Date: Jun. 6, 2000, Patent Abstracts of Japan.

* cited by examiner

*Primary Examiner*—Thinh Nguyen
(74) *Attorney, Agent, or Firm*—Martine & Penilla, LLP

(57) ABSTRACT

An object of the present invention is to provide a technique that makes it possible to improve the image quality by selecting adequate paper feedings in a printer that performs printing. First, a test pattern is printed according to the interlace recording mode. The test pattern includes a plurality of color patches respectively printed using different correction values. The correction values for respective feed amounts are determined by investigating the printing results of this test pattern. Then, when an image is printed in this interlace recording mode, the sub-scan feed amount is corrected according to this correction value.

44 Claims, 46 Drawing Sheets

Fig.7
PATCH No. = 1
(Correction value δ = 0)
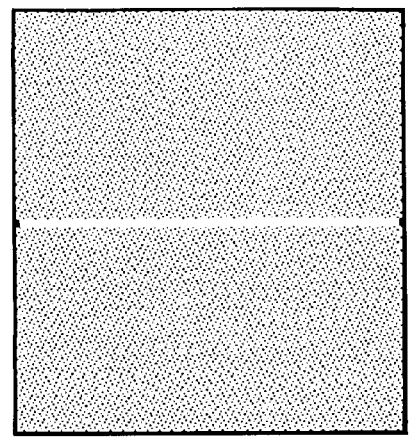
← WHITE STREAK
PATCH No. = 2
(Correction value δ = 1)
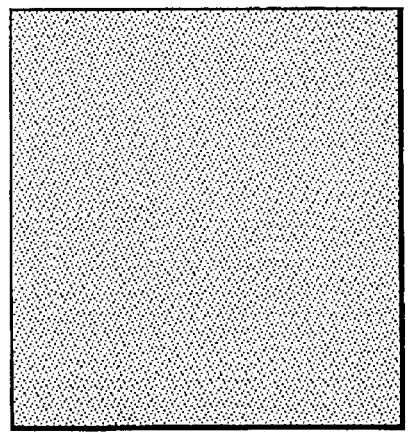
PATCH No. = 3
(Correction value = 2)
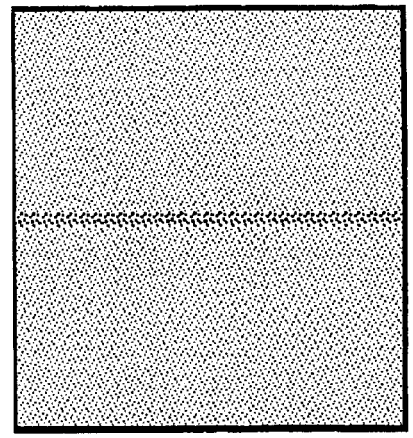
← BLACK STREAK PAPER FEED EXAMPLE 1 (composite black printing)

Fig.12(A)

PAPER FEED EXAMPLE 1 (quasi-band feed)

|  | F1-F3 | F4 | ΣFi | Number of used nozzles N per color | N × k |
|---|---|---|---|---|---|
| Color mode | 1 | 237 | 240 | 60 | 240 |
| Monochromatic mode | 1 | 717 | 720 | 180 | 720 |

Fig.12(B)

PAPER FEED EXAMPLE 2

|  | F1-F3 | F4 | ΣFi | Number of used nozzles N per color | N × k |
|---|---|---|---|---|---|
| Color mode | 59 | 59 | 236 | 59 | 236 |
| Monochromatic mode | 179 | 179 | 716 | 179 | 716 |

|  | Paper feed correction value $\delta$ (pulses) | | | |
|---|---|---|---|---|
|  | F=59 | F=179 | F=237 | F=717 |
| Ordinary paper | 3 | 8 | 10 | 22 |
| Glossy film | 3 | 8 | 10 | 22 |
| Photographic paper | 4 | 11 | 14 | 31 |
| Roll type photographic paper | 5 | 14 | 18 | 39 |

RELATIONSHIP BETWEEN PAPER FEED VELOCITY AND CORRECTION VALUE

PAPER FEED CORRECTION VALUE TRANSMISSION METHOD 1

PAPER FEED CORRECTION VALUE TRANSMISSION METHOD 2

PRINT SIGNAL FOR PATCH No. 1

Fig. 19(A)
EXAMPLE 1 OF TEST PATTERN PRINT SIGNALS

| | Paper feed amount | Raster data |
|---|---|---|
| Print signal for patch No. 1 | F1=F2=F3=1, F4=237 | Raster data RD1 |
| Print signal for patch No. 2 | F1=F2=F3=1, F4=237 | Raster data RD2 |
| Print signal for patch No. 3 | F1=F2=F3=1, F4=237 | Raster data RD3 |

(Paper feed amounts are maintained the same while raster data are set different)

Fig. 19(B)
EXAMPLE 2 OF TEST PATTERN PRINT SIGNALS

| | Paper feed amount | Raster data |
|---|---|---|
| Print signal for patch No. 1 | F1=F2=F3=1, F4=238 | Raster data RD2 |
| Print signal for patch No. 2 | F1=F2=F3=1, F4=237 | Raster data RD2 |
| Print signal for patch No. 3 | F1=F2=F3=1, F4=236 | Raster data RD2 |

(Raster data are maintained the same while paper feed mounts are set different)

DOT RECORDING FOR GRAY PATCH (No.1)

DOT SIZE: SOLID SIZE (100%)
DOT RECORDING RATE: 80%

DOT RECORDING FOR GRAY PATCH (No.2)

DOT SIZE: 80% OF SOLID SIZE
DOT RECORDING RATE: 100%

PAPER FEED EXAMPLE 1 (for low-resolution printing mode)

Fig.27(A) LOW RESOLUTION PRINTING MODE

| Printing resolution in sub-scanning direction | Nozzle pitch k | F1 | F2 | Σ Fi | Number of used nozzles N | N × k |
|---|---|---|---|---|---|---|
| 360dpi | 2 | 1 | 119 | 120 | 60 | 120 |

Fig.27(B) HIGH RESOLUTION PRINTING MODE

| Printing resolution in sub-scanning direction | Nozzle pitch k | F1–F3 | F4 | Σ Fi | Number of used nozzles N | N × k |
|---|---|---|---|---|---|---|
| 720dpi | 4 | 1 | 117 | 120 | 60 | 120 |

Fig.35

| Line | Pass 1 | 2 | 3 | 4 | 5 | 6 | 7 | 8 | 9 | 10 |
|---|---|---|---|---|---|---|---|---|---|---|
| 50 SS' |  | 83 |  |  | 36 |  |  |  |  |  |
| 51 | 95 |  |  | 48 |  |  |  |  | 1 |  |
| 52 |  |  | 60 |  |  |  |  | 13 |  |  |
| 53 |  | 72 |  |  | 25 |  |  |  |  |  |
| 54 |  | 84 |  |  | 37 |  |  |  |  |  |
| 55 | 96 |  |  | 49 |  |  |  |  | 2 |  |
| 56 |  |  | 61 |  |  |  |  | 14 |  |  |
| 57 |  | 73 |  |  | 26 |  |  |  |  |  |
| 58 |  | 85 |  |  | 38 |  |  |  |  |  |
| 59 |  |  |  | 50 |  |  |  |  | 3 |  |
| 60 |  |  | 62 |  |  |  |  | 15 |  |  |
| 61 47 dots |  | 74 |  |  | 27 |  |  |  |  |  |
| 62 |  | 86 |  |  | 39 |  |  |  |  |  |
| 63 |  |  |  | 51 |  |  |  |  | 4 |  |
| 64 |  |  | 63 |  |  |  |  | 16 |  |  |
| 65 |  | 75 |  |  | 28 |  |  |  |  |  |
| 66 |  | 87 |  |  | 40 |  |  |  |  |  |
| 67 |  |  |  | 52 |  |  |  |  | 5 |  |
| 68 |  |  | 64 |  |  |  |  | 17 |  |  |
| 69 |  | 76 |  |  | 29 |  |  |  |  |  |
| 70 |  | 88 |  |  | 41 |  |  |  |  |  |
| 71 |  |  |  | 53 |  |  |  |  | 6 |  |
| 72 |  |  | 65 |  |  |  |  | 18 |  |  |
| 73 |  | 77 |  |  | 30 |  |  |  |  |  |
| 74 |  | 89 |  |  | 42 |  |  |  |  |  |
| 75 |  |  |  | 54 |  |  |  |  | 7 |  |
| 76 |  |  | 66 |  |  |  |  | 19 |  |  |
| 77 |  | 78 |  |  | 31 |  |  |  |  |  |
| 78 |  | 90 |  |  | 43 |  |  |  |  |  |
| 79 |  |  |  | 55 |  |  |  |  | 8 |  |
| 80 |  |  | 67 |  |  |  |  | 20 |  |  |
| 81 |  | 79 |  |  | 32 |  |  |  |  |  |
| 82 |  | 91 |  |  | 44 |  |  |  |  |  |
| 83 |  |  |  | 56 |  |  |  |  | 9 |  |
| 84 |  |  | 68 |  |  |  |  | 21 |  |  |
| 85 |  | 80 |  |  | 33 |  |  |  |  |  |
| 86 |  | 92 |  |  | 45 |  |  |  |  |  |
| 87 |  |  |  | 57 |  |  |  |  | 10 |  |
| 88 |  |  | 69 |  |  |  |  | 22 |  |  |
| 89 |  | 81 |  |  | 34 |  |  |  |  |  |
| 90 |  | 93 |  |  | 46 |  |  |  |  |  |
| 91 |  |  |  | 58 |  |  |  |  | 11 |  |
| 92 |  |  | 70 |  |  |  |  | 23 |  |  |
| 93 |  | 82 |  |  | 35 |  |  |  |  |  |
| 94 |  | 94 |  |  | 47 |  |  |  |  |  |
| 95 |  |  |  | 59 |  |  |  |  | 12 |  |
| 96 |  |  | 71 |  |  |  |  | 24 |  |  |
| 97 |  | 83 |  |  | 36 |  |  |  |  |  |
| 98 | 95 |  |  | 48 |  |  |  |  |  | 1 |
| 99 |  |  | 60 |  |  |  |  | 13 |  |  |
| 100 |  | 72 |  |  | 25 |  |  |  |  |  |
| 101 |  | 84 |  |  | 37 |  |  |  |  |  |
| 102 | 96 |  |  | 49 |  |  |  |  |  | 2 |
| 103 |  |  | 61 |  |  |  |  | 14 |  |  |

| Line | Pass | |
|---|---|---|
| 1 | 5 | 9 |
| 2 | 4 | 8 |
| 3 | 3 | 7 |
| 4 | 2 | 6 |
| 5 | 5 | 9 |
| 6 | 4 | 8 |
| 7 | 3 | 7 |
| 8 | 2 | 6 |
| 9 | 5 | 9 |
| 10 | 4 | 8 |
| 11 | 3 | 7 |
| 12 | 2 | 6 |
| 13 | 5 | 9 |
| 14 | 4 | 8 |
| 15 | 3 | 7 |
| 16 | 2 | 6 |
| 17 | 5 | 9 |
| 18 | 4 | 8 |
| 19 | 3 | 7 |
| 20 | 2 | 6 |
| 21 | 5 | 9 |
| 22 | 4 | 8 |
| 23 | 3 | 7 |
| 24 | 2 | 6 |
| 25 | 5 | 9 |
| 26 | 4 | 8 |
| 27 | 3 | 7 |
| 28 | 2 | 6 |
| 29 | 5 | 9 |
| 30 | 4 | 8 |
| 31 | 3 | 7 |
| 32 | 2 | 6 |
| 33 | 5 | 9 |
| 34 | 4 | 8 |
| 35 | 3 | 7 |
| 36 | 2 | 6 |
| 37 | 5 | 9 |
| 38 | 4 | 8 |
| 39 | 3 | 7 |
| 40 | 2 | 6 |
| 41 | 5 | 9 |
| 42 | 4 | 8 |
| 43 | 3 | 7 |
| 44 | 2 | 6 |
| 45 | 5 | 9 |
| 46 | 4 | 8 |
| 47 | 3 | 7 |

Fig.38(B)

| Line | Pass | |
|---|---|---|
| 1 | 5 | 9 |
| 2 | 2 | 6 |
| 3 | 3 | 7 |
| 4 | 4 | 8 |
| 5 | 5 | 9 |
| 6 | 2 | 6 |
| 7 | 3 | 7 |
| 8 | 4 | 8 |
| 9 | 5 | 9 |
| 10 | 2 | 6 |
| 11 | 3 | 7 |
| 12 | 4 | 8 |
| 13 | 5 | 9 |
| 14 | 2 | 6 |
| 15 | 3 | 7 |
| 16 | 4 | 8 |
| 17 | 5 | 9 |
| 18 | 2 | 6 |
| 19 | 3 | 7 |
| 20 | 4 | 8 |
| 21 | 5 | 9 |
| 22 | 2 | 6 |
| 23 | 3 | 7 |
| 24 | 4 | 8 |
| 25 | 5 | 9 |
| 26 | 2 | 6 |
| 27 | 3 | 7 |
| 28 | 4 | 8 |
| 29 | 5 | 9 |
| 30 | 2 | 6 |
| 31 | 3 | 7 |
| 32 | 4 | 8 |
| 33 | 5 | 9 |
| 34 | 2 | 6 |
| 35 | 3 | 7 |
| 36 | 4 | 8 |
| 37 | 5 | 9 |
| 38 | 2 | 6 |
| 39 | 3 | 7 |
| 40 | 4 | 8 |
| 41 | 5 | 9 |
| 42 | 2 | 6 |
| 43 | 3 | 7 |
| 44 | 4 | 8 |
| 45 | 5 | 9 |
| 46 | 2 | 6 |
| 47 | 3 | 7 |

Fig.38(C)

| Line | Pass | |
|---|---|---|
| 1 | 6 | 10 |
| 2 | 5 | 9 |
| 3 | 4 | 8 |
| 4 | 3 | 7 |
| 5 | 6 | 10 |
| 6 | 5 | 9 |
| 7 | 4 | 8 |
| 8 | 3 | 7 |
| 9 | 6 | 10 |
| 10 | 5 | 9 |
| 11 | 4 | 8 |
| 12 | 3 | 7 |
| 13 | 6 | 10 |
| 14 | 5 | 9 |
| 15 | 4 | 8 |
| 16 | 3 | 7 |
| 17 | 6 | 10 |
| 18 | 5 | 9 |
| 19 | 4 | 8 |
| 20 | 3 | 7 |
| 21 | 6 | 10 |
| 22 | 5 | 9 |
| 23 | 4 | 8 |
| 24 | 3 | 7 |
| 25 | 6 | 10 |
| 26 | 5 | 9 |
| 27 | 4 | 8 |
| 28 | 3 | 7 |
| 29 | 6 | 10 |
| 30 | 5 | 9 |
| 31 | 4 | 8 |
| 32 | 3 | 7 |
| 33 | 6 | 10 |
| 34 | 5 | 9 |
| 35 | 4 | 8 |
| 36 | 3 | 7 |
| 37 | 6 | 10 |
| 38 | 5 | 9 |
| 39 | 4 | 8 |
| 40 | 3 | 7 |
| 41 | 6 | 10 |
| 42 | 5 | 9 |
| 43 | 4 | 8 |
| 44 | 3 | 7 |
| 45 | 6 | 10 |
| 46 | 5 | 9 |
| 47 | 4 | 8 |

Fig.39(A)

| Line | Nozzle | | Deviation | |
|---|---|---|---|---|
| 1 | 48 | 1 | ↑ | |
| 2 | 60 | 13 | ↑ | |
| 3 | 72 | 25 | | |
| 4 | 84 | 37 | ↓ | ←AD |
| 5 | 49 | 2 | ↑ | |
| 6 | 61 | 14 | ↑ | |
| 7 | 73 | 26 | | |
| 8 | 85 | 38 | ↓ | ←AD |
| 9 | 50 | 3 | ↑ | |
| 10 | 62 | 15 | ↑ | |
| 11 | 74 | 27 | | |
| 12 | 86 | 39 | ↓ | ←AD |
| 13 | 51 | 4 | ↑ | |
| 14 | 63 | 16 | ↑ | |
| 15 | 75 | 28 | | |
| 16 | 87 | 40 | ↓ | ←AD |
| 17 | 52 | 5 | ↑ | |
| 18 | 64 | 17 | ↑ | |
| 19 | 76 | 29 | | |
| 20 | 88 | 41 | ↓ | ←AD |
| 21 | 53 | 6 | ↑ | |
| 22 | 65 | 18 | ↑ | ←AL |
| 23 | 77 | 30 | ↓ | |
| 24 | 89 | 42 | ↓ | ←AD |
| 25 | 54 | 7 | ↑ | |
| 26 | 66 | 19 | ↑ | ←AL |
| 27 | 78 | 31 | ↓ | |
| 28 | 90 | 43 | ↓ | ←AD |
| 29 | 55 | 8 | ↑ | |
| 30 | 67 | 20 | ↑ | ←AL |
| 31 | 79 | 32 | ↓ | |
| 32 | 91 | 44 | ↓ | ←AD |
| 33 | 56 | 9 | ↑ | |
| 34 | 68 | 21 | | |
| 35 | 80 | 33 | ↓ | |
| 36 | 92 | 45 | ↓ | ←AD |
| 37 | 57 | 10 | ↑ | |
| 38 | 69 | 22 | | |
| 39 | 81 | 34 | ↓ | |
| 40 | 93 | 46 | ↓ | ←AD |
| 41 | 58 | 11 | ↑ | |
| 42 | 70 | 23 | | |
| 43 | 82 | 35 | ↓ | |
| 44 | 94 | 47 | ↓ | ←AD |
| 45 | 59 | 12 | ↑ | |
| 46 | 71 | 24 | | |
| 47 | 83 | 36 | ↓ | |

Fig.39(B)

| Line | Nozzle | | Deviation | |
|---|---|---|---|---|
| 1 | 46 | 1 | ↑ | ←AL |
| 2 | 80 | 35 | ↓ | |
| 3 | 69 | 24 | | |
| 4 | 58 | 13 | ↑ | |
| 5 | 47 | 2 | ↑ | ←AL |
| 6 | 81 | 36 | ↓ | |
| 7 | 70 | 25 | | |
| 8 | 59 | 14 | ↑ | |
| 9 | 48 | 3 | ↑ | ←AL |
| 10 | 82 | 37 | ↓ | |
| 11 | 71 | 26 | | |
| 12 | 60 | 15 | ↑ | |
| 13 | 49 | 4 | ↑ | ←AL |
| 14 | 83 | 38 | ↓ | |
| 15 | 72 | 27 | | |
| 16 | 61 | 16 | ↑ | |
| 17 | 50 | 5 | ↑ | ←AL |
| 18 | 84 | 39 | ↓ | |
| 19 | 73 | 28 | | |
| 20 | 62 | 17 | ↑ | |
| 21 | 51 | 6 | ↑ | ←AL |
| 22 | 85 | 40 | ↓ | |
| 23 | 74 | 29 | | |
| 24 | 63 | 18 | ↑ | |
| 25 | 52 | 7 | ↑ | ←AL |
| 26 | 86 | 41 | ↓ | |
| 27 | 75 | 30 | | |
| 28 | 64 | 19 | ↑ | |
| 29 | 53 | 8 | ↑ | ←AL |
| 30 | 87 | 42 | ↓ | |
| 31 | 76 | 31 | | |
| 32 | 65 | 20 | ↑ | |
| 33 | 54 | 9 | ↑ | ←AL |
| 34 | 88 | 43 | ↓ | |
| 35 | 77 | 32 | ↓ | |
| 36 | 66 | 21 | | |
| 37 | 55 | 10 | ↑ | ←AL |
| 38 | 89 | 44 | ↓ | |
| 39 | 78 | 33 | ↓ | |
| 40 | 67 | 22 | | |
| 41 | 56 | 11 | ↑ | ←AL |
| 42 | 90 | 45 | ↓ | |
| 43 | 79 | 34 | ↓ | |
| 44 | 68 | 23 | | |
| 45 | 57 | 12 | ↑ | |
| 46 | 46 | 1 | | |
| 47 | 80 | 35 | ↓ | |

Fig.39(C)

| Line | Nozzle | | Deviation | |
|---|---|---|---|---|
| 1 | 44 | 1 | ↑ | |
| 2 | 55 | 12 | ↑ | |
| 3 | 66 | 23 | | |
| 4 | 77 | 34 | ↓ | ←AD |
| 5 | 45 | 2 | ↑ | |
| 6 | 56 | 13 | ↑ | |
| 7 | 67 | 24 | | |
| 8 | 78 | 35 | ↓ | ←AD |
| 9 | 46 | 3 | ↑ | |
| 10 | 57 | 14 | ↑ | |
| 11 | 68 | 25 | | |
| 12 | 79 | 36 | ↓ | ←AD |
| 13 | 47 | 4 | ↑ | |
| 14 | 58 | 15 | ↑ | |
| 15 | 69 | 26 | | |
| 16 | 80 | 37 | ↓ | ←AD |
| 17 | 48 | 5 | ↑ | |
| 18 | 59 | 16 | ↑ | |
| 19 | 70 | 27 | | |
| 20 | 81 | 38 | ↓ | ←AD |
| 21 | 49 | 6 | ↑ | |
| 22 | 60 | 17 | ↑ | |
| 23 | 71 | 28 | | |
| 24 | 82 | 39 | ↓ | ←AD |
| 25 | 50 | 7 | ↑ | |
| 26 | 61 | 18 | ↑ | |
| 27 | 72 | 29 | | |
| 28 | 83 | 40 | ↓ | ←AD |
| 29 | 51 | 8 | ↑ | |
| 30 | 62 | 19 | ↑ | |
| 31 | 73 | 30 | | |
| 32 | 84 | 41 | ↓ | ←AD |
| 33 | 52 | 9 | ↑ | |
| 34 | 63 | 20 | ↑ | |
| 35 | 74 | 31 | | |
| 36 | 85 | 42 | ↓ | ←AD |
| 37 | 53 | 10 | ↑ | |
| 38 | 64 | 21 | | |
| 39 | 75 | 32 | | |
| 40 | 86 | 43 | ↓ | ←AD |
| 41 | 54 | 11 | ↑ | |
| 42 | 65 | 22 | | |
| 43 | 76 | 33 | | |
| 44 | 44 | 1 | ↑ | |
| 45 | 55 | 12 | ↑ | |
| 46 | 66 | 23 | | |
| 47 | 77 | 34 | ↓ | |

PRINTING WITH SELECTION OF SUB-SCANNING

BACKGROUND OF THE INVENTION

1. Field of the Invention

The present invention relates to a technique for performing printing by recording ink dots on a recording medium while a print head is moving in the main scan direction.

2. Description of the Related Art

Ink jet printers which eject ink from a head and laser printers have become popular as output devices for computers. Especially in recent years, color printers using color inks have also been widely utilized.

Various types of printing media for ink jet printers have been commercially marketed. Since the coloring properties of inks differ in different printing media, there are considerable differences in the images obtained. The type of printing medium used also affects the precision of the sub-scan feed of the printing medium (hereafter referred to as the "paper feed"). For example, the actual feed amount may vary considerably between printing media with easy-slip surfaces and printing media with surfaces that do not slip easily, even if the same feed operation is performed. Furthermore, the precision of the paper feed tends to vary considerably from printer to printer.

The degree of precision of the paper feed has a great effect on the image quality. However, in the case of printers that perform printing using a so-called interlace recording mode, the image quality degradation caused by paper feed error can be suppressed to some extent by appropriately setting the paper feed amount. Here, the term "interlace recording mode" refers to a printing method that is performed using a print head that has nozzles aligned in a row at a nozzle pitch that is twice the dot pitch in the sub-scan direction (i.e., the main scan line pitch) or greater. In cases where such a print head is used, gaps are generated between the main scan lines (raster lines) that are recorded by a single main scan pass. Furthermore, a number of main scan passes that is equal to the number of main scan lines contained in these gaps is further required in order to eliminate the gaps. It is known that various feed amounts can be used in the case of such an interlace recording mode. Conventionally, therefore, the effect of variation in the paper feed precision on the mage quality has be minimized by appropriately selecting the paper feed amount in the interlace recording mode.

For the reasons described above, the direct correction of paper feed error in printers using an interlace recording mode has not been seriously considered. However, as high image quality in printers has spread in recent years, there has been a demand for further improvement of image quality by the appropriate correction of paper feed error in printers that perform printing in an interlace recording mode. This demand has been increased not only against interlace recording mode printers but also against non-interlace recording mode printers.

SUMMARY OF THE INVENTION

An object of the present invention is to provide a technique for improving image quality by correcting the paper feed error in a printer.

In order to attain the above object, the present invention executes prescribed processing in printing using a printing apparatus for printing by recording ink dots on a printing medium while moving a printing head in a main scanning direction. This printing apparatus comprises: a printing head including a plurality of nozzles arranged in a sub-scanning direction substantially perpendicular to a main scanning direction; a main scan drive unit configured to move the printing head in the main scanning direction, a sub-scan drive unit configured to move the printing medium in the sub-scanning direction by a plurality of intermittent feedings, a head driving unit configured to eject ink droplets from the nozzles while the main scan of the printing head, and a control unit configured to control the main scan drive unit, the sub-scan drive unit and the head driving unit.

With such the printing apparatus, a test pattern is formed on a printing medium. The test pattern includes a plurality of color patches printed in a plurality of printing modes, respectively. The test pattern is formed for selecting a printing mode from among the plurality of printing modes which are different each other in a sub-scan feed amount and/or an adjustment value for a sub-scan feed amount. Dots are recorded in accordance with a printing mode selected based on printing result of the test pattern.

With such an embodiment, image quality is improved by selecting the paper feed properly. This technique is described in many kinds of embodiment underneath.

(1) Pattern Printing in Interlace Printing Mode:

One embodiment for attaining the above object is as follows. That is a method for correcting the amount of sub-scan feed of the printing medium in a printing device which uses a print head that has a plurality of nozzles aligned in a row in the sub-scan direction, which is approximately perpendicular to the main scan direction, at a nozzle pitch of k times (k is an integer of 2 or greater) the dot pitch in the sub-scan direction, and which records ink dots on the printing medium while causing the print head to move in the main scan direction. The method comprises the steps of (a) printing, in accordance with an interlace recording mode, a test pattern that includes a plurality of color patches respectively printed using different correction values, as a test pattern for the purpose of determining the correction value of the sub-scan feed amount of the printing medium; and (b) correcting the sub-scan feed amount according to a correction value set in accordance with the printing results of the test pattern when the printing of images is performed in the interlace recording mode.

In this method, a test pattern that includes a plurality of color patches that are respectively printed using different correction values is printed according to the interlace recording mode, and the sub-scan feed amount is corrected using a correction value in accordance with the printing results of this test pattern. Accordingly, the sub-scan feed error of the printer that performs printing in an interlace recording mode can be corrected, so that the image quality is improved.

The step (a) may comprise the steps of as follows. These are (i) selecting N nozzles (N is an integer of 2 or greater) for each color among the plurality of nozzles as used nozzles; (ii) performing (k −1) scan sets each comprising a single main scan and a sub-scan feed by a first feed amount that is equal to the dot pitch in the sub-scanning direction, and then further performing a single main scan and a sub-scan feed by a second feed amount which is equal to $\{N \times k - (k-1)\}$ time the dot pitch; and (iii) printing the test pattern by repeatedly performing the step (ii).

In the test pattern that is printed by such a printing method, band-form areas of image deterioration called "banding" tend to be generated as a result of sub-scan feed error. Accordingly, if the correction value is determined using such a test pattern, the sub-scan feed error can be corrected so that banding tends not to occur.

It is preferable that the plurality of color patches are gray patches that are reproduced by composite black.

Composite black is reproduced using inks of the three hues CMY. The sub-scan feed error can be corrected with the ink dot trajectory error also taken into account; as a result, the mage quality can be further improved.

The plurality of color patches may be monochromatic patches that are reproduced using one ink among inks of black, cyan and magenta. The plurality of color patches may also be color patches of a secondary color that is reproduced using two inks among inks of three colors of cyan, magenta and yellow.

If inks with color components for which improvement of the image quality is especially desired are selected as the inks used to reproduce the color patches, the effect of the correction of the sub-scan feed error in improving the image quality is conspicuous.

(2) Pattern Printing in Given Ink Duty:

One embodiment for attaining the above object is as follows. That is a method for correcting sub-scan feed amount of a printing medium in a printing device that prints by recording dots onto a printing medium while moving a print head in the main scanning direction. The method comprises the step of (a) printing a test pattern for deciding a correction value for the sub-scan feed amount of the printing medium. The test pattern includes a multiplicity of color patches each printed at a different correction value, and being printed with one type of ink at ink duty of less than 100%. The method also comprises the step of (b) during printing, correcting the sub-scan feed amount in accordance with a correction value set with reference to the printed result of the test pattern.

With this method, color patches are printed using one type of ink at an ink duty of less than 100%, so that color patches that make image degradation due to paper feed error readily apparent can be printed. As a result, printer sub-scan feed error can be corrected with an appropriate correction value, and quality improved thereby.

The ink duty may be varied depending on a type of the printing medium.

Typically, if ink duty is excessively large, the ink tends to bleed, whereas conversely if it is too low, there is a tendency for image degradation due to paper feed error to become less readily apparent. It is normal for the susceptibility to ink bleeding to vary with the type of printing medium (particularly its surface qualities). Thus, by varying the ink duty depending on the type of printing medium, it becomes possible to print test patterns suitable for printing media of various kinds.

The plurality of color patches may be gray patches reproduced by means of black ink. The ink duty of each of the gray patches may be a value in a range of about 70% to about 90%.

With this embodiment, it is possible to print the test pattern that is suitable for deciding the proper correction value of paper feed error.

The plurality of color patches may be arrayed in a row in the sub-scanning direction on a single sheet of printing medium.

This embodiment allows a large number of color patches to be printed on a single sheet of printing medium, printing medium can be saved.

The print head may comprise a color nozzle row wherein a plurality of color nozzle groups are arranged in predetermined order in the sub-scanning direction, and a black nozzle row arranged juxtaposed to the color nozzle row. In such arrangement, it is preferable that the plurality of color patches are printed using only some of a plurality of black nozzles included in the black nozzle row.

With this arrangement, gaps between color patches can be made relatively small, allowing a large number of color patches to be printed on a single sheet of printing medium.

Furthermore, the present invention may be realized in various aspects; such as a method and apparatus for correcting the sub-scan feed amount (paper feed amount), a controlling method and apparatus for controlling the sub-scan feed, a printing method and apparatus which give consideration to the correction of the sub-scan feed amount, a printing control apparatus and method which are used to control a printing apparatus with consideration given to the correction of the sub-scan feed amount, computer programs for realizing such methods and apparatus, recording media for recording such computer programs, and data signals realized in carrier waves including such computer programs.

(3) Pattern Printing with Selection of Feeding Amount:

In order to attain at least part of the above objects, in one embodiment of the invention, the present invention executes prescribed processing with a printing device which performs printing by recording ink dots on a printing medium while causing a print head to move in the main scan direction. This printing device comprises: a nozzle group for ejecting drops of ink, a main scan drive unit for performing main scan by moving the nozzle group and/or the printing medium, a sub-scan drive unit for performing sub-scanning by moving the nozzle group and/or the printing medium in a direction intersecting the main scanning direction, an input unit for receiving data input from the outside, and a control unit for controlling each the unit.

With such printing device, color patches are formed on the printing medium using a multiplicity of dot recording modes in which the sub-scanning conducted at intervals between the main scans differs in content. Then a dot recording mode is decided by means of selecting one color patch from among the test patches. With this arrangement, a dot recording mode that gives the printed result of the best quality can be selected on the basis of actual printed results.

In case that the printing modes involves recording a plurality of pixels on a single main scan line over a plurality of different main scans, it is preferable that the color patches are formed on the printing medium using the plurality of dot recording modes in which the number of main scans needed to record all pixels on a single main scan line is mutually equal, and in which the sub-scan feed content conducted at intervals between the main scans is mutually different. With this arrangement, a dot recording mode can be selected from among a plurality of dot recording modes in which the number of the main scans needed to record all pixels included in a single main scan line are mutually equal. The selection can be made based on the quality of printed results that differs because of the differences of orders of recording pixels of a single given main scan line or the differences of the combinations of nozzles used to record each pixel.

It is preferable that the plurality of dot recording modes employ different combinations of nozzles for recording a plurality of pixels that are contiguous in the sub-scanning direction. With this arrangement, dot recording mode can be selected from among a multiplicity of dot recording modes that give printed results of different quality.

In forming color patches, the color patches may be formed on the printing medium using the plurality of dot recording modes each of which involves repeated execution of the sub-scan by a single constant feed amount. The dot recording modes may mutually differ in the feed amounts. In such the case, it is preferable that the feed amounts in the plurality of dot recording modes of mutually different feed amounts are substantially equal. With this arrangement, printing speed does not vary significantly regardless of the dot recording mode selected.

In forming color patches, it is preferable that color patches are formed on the printing medium using the plurality of dot recording modes each involving repeated execution of a unit sub-scan. In this arrangement, the unit sub-scan may include sub-scans with a plurality of feed amounts, and the dot recording modes may differ in an order of execution of sub-scans with the plurality of feed amounts included in the unit sub-scan, and/or in the plurality of feed amounts. In such an arrangement, the plurality of dot recording modes for repeated execution of the unit sub-scan have substantially equal average values for feed amount of the sub-scans included in the unit sub-scan. With this arrangement, printing speed does not vary significantly regardless of the dot recording mode selected.

In forming color patches, it is preferable that the color patches may be formed by forming dots with magenta, cyan and yellow inks in each of the dot recording modes. With this arrangement, it is possible to produce test patches that readily reflect image quality of printed results in color printing.

The present invention may be implemented to practice in number of embodiments, such as the following.

(1) Method for deciding dot recording mode; printing method; printing control method.
(2) Printing device; printing control device.
(3) Method for producing printing device.
(4) Computer program for implementing the device or method.
(5) Storage medium having recorded a computer program for implementing the device or method.
(6) Data signal including a computer program for implementing the device or method, and embodied in a carrier wave.

BRIEF DESCRIPTION OF THE DRAWINGS

FIG. 7 shows an example of test patterns;

FIGS. 12(A) and 12(B) show examples of the paper feed amounts used in actual printing using the print head 36 shown in FIG. 5;

FIGS. 19(A) and 19(B) are explanatory diagrams which show examples of construction of test pattern print signals;

FIGS. 27(A) and 27(B) are illustrative diagrams showing actual paper feed;

FIG. 35 is an illustrative diagram showing how main scan lines are recorded on printing paper in a first dot recording mode;

FIG. 36 is an illustrative diagram showing how main scan lines are recorded on printing paper in a second dot recording mode;

FIG. 37 is an illustrative diagram showing how main scan lines are recorded on printing paper in a third dot recording mode;

FIGS. 38(A), 38(B) and 38(C) are charts showing which main scan lines are recorded in which pass in the first to third dot recording modes;

FIGS. 39(A), 39(B) and 39(C) are illustrative diagrams showing printed result quality obtained in the first to third dot recording modes;

FIG. 44 is an illustrative diagram showing the manner in which main scan lines are recorded on printing paper in second dot recording mode in Example 2;

FIG. 46 is an illustrative diagram depicting printing in a dot recording mode that involves a 7-dot constant feed in a printer having eight nozzles.

DESCRIPTION OF THE PREFERRED EMBODIMENT

Embodiments of the present invention will be described in the following order on the basis of working examples.

Figure 1:
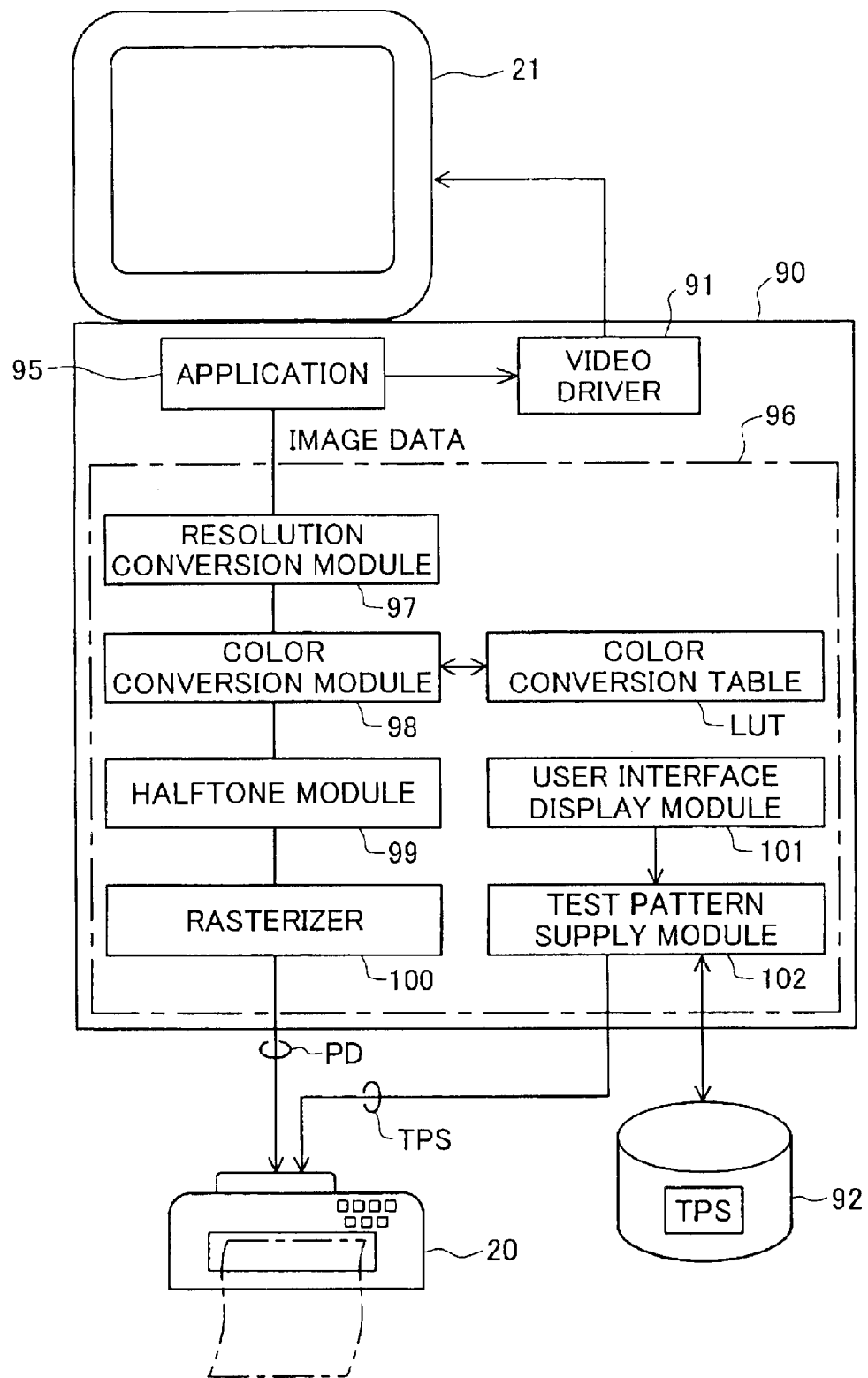
FIG. 1 is a block diagram which shows the structure of a printing system as one embodiment of the present invention.

I. The first embodiment
A. Overall structure of the apparatus
B. Outline procedure of paper feed correction
C. Details of test pattern printing method and method used to determine paper feed correction value
D. Structure of test pattern print signal
E. Modifications of the first embodiment
II. The second embodiment
A. Paper feed correction
B. Detailed description of test pattern printing method and method for determining paper feed correction value
C. Modification of the second embodiment
III. The third embodiment
A. Summary of the third embodiment
B. Example 1
C. Example 2
D. Example 3
E. Modifications of the third embodiment I. The First Embodiment A. Overall Structure of the Apparatus:

FIG. 1 is a block diagram which illustrates the structure of a printing system as one embodiment of the present invention. This printing system comprises a computer 90 and a color ink jet printer 20. The printing system including the printer 20 and computer 90 may be called a "printing apparatus" in a broad sense.

In the computer 90, an application program 95 is operated under the control of a specific operating system. A video driver 91 and a printer driver 96 are incorporated into the operating system, and printing data PD is output from the application program 95 to the printer 20 via these drivers. The application program 95 which performs image retouching and the like performs desired processing on the image that is the object of processing, and displays the image on a CRT 21 via the video driver 91.

When the application program 95 issues a print command, the printer driver 96 of the computer 90 receives the image data from the application program 95, and converts this data into printing data PD that is provided to the printer 20. The printer driver 96 includes a resolution conversion module 97, color conversion module 98, halftone module 99, rasterizer 100, user interface display module 101, test pattern supply module 102 and color conversion look-up table LUT.

The resolution conversion module 97 has the function of converting the resolution of the color image data formed by the application program 95 into the printing resolution. The image data thus subjected to resolution conversion is image information that still consists of the three color components RGB. The color conversion module 98 converts the RGB image data into multi-level data of a plurality of ink colors that can be utilized by the printer 20 for each pixel while referring to the color conversion look-up table LUT.

The multi-level data after the color conversion has, for example, 256 gradation values. The halftone module 99 performs so-called halftone processing, and thus produces halftone image data. This halftone image data is rearranged in the data order that is to be transmitted to the printer by the rasterizer 100, and is output as the final printing data PD. The printing data PD includes raster data that represents dot formation states during each main scan, and another data that indicates sub-scan feed amounts.

The user interface display module 101 has the function of displaying various user interface windows relating to printing, and the function of receiving user input in these windows.

The test pattern supply module 102 has the function of reading out from the hard disk 92 the test pattern print signal TPS that is used to determine a correction value for the sub-scan feed amount (also called the "paper feed amount"), and providing this signal to the printer 20. In cases where the test pattern print signal TPS is stored as compressed data, the test pattern supply module 102 has the function of expanding this compressed data.

The printer driver 96 corresponds to a program implementing the function of supplying printing data PD and test pattern print signals TPS to the printer 20. The program implementing the function of the printer driver 96 is provided in a form of a computer-readable recording medium storing the program. Various types of computer-readable recording media such as flexible disks, CD-ROMs, optical-magnetic disks, IC cards, ROM cartridges, punch cards, printed matter on which a code such as a bar code is printed, and computer internal memory devices (memories such as RAM, ROM) or external memory devices may be utilized as such a recording medium. Furthermore, such a computer program may also be downloaded into the computer 90 via the internet.

The computer 90 equipped with this printer driver 96 functions as a printing control device that causes printing to be performed by supplying printing data PD and test pattern print signals TPS to the printer 20.

Figure 2:
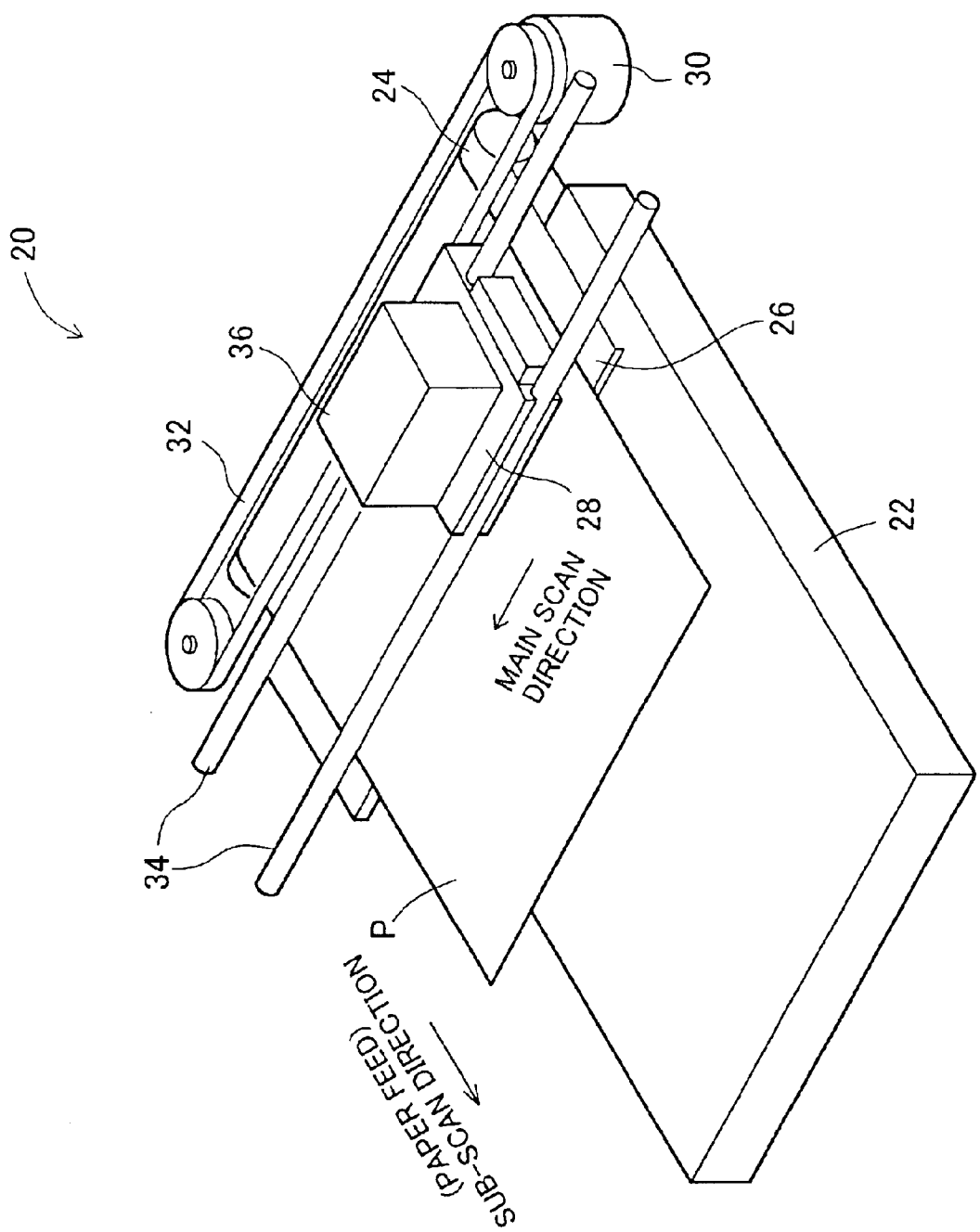
FIG. 2 is a schematic perspective view showing the main structure of a color ink jet printer 20.

FIG. 2 is a schematic perspective view which shows the main structure of a color ink jet printer 20. This printer 20 comprises a paper stacker 22, a paper fee roller 24 driven by a step motor (not shown in the figures), a platen 26, a carriage 28, a carriage motor 30, a tractor belt 32 driven by the carriage motor 30, and guide rails 34 for the carriage 28. A print head 36 equipped with numerous nozzles is mounted on the carriage 28.

The printing paper P is retrieved from the paper stacker 22 by the paper feed roller 24 and fed over the surface of the platen 26 in the sub-scan direction. The carriage 28 is pulled by the tractor belt 32 driven by the carriage motor 30 so that this carriage 28 moves in the main scan direction along the guide rails 34. The main scan direction is perpendicular to the sub-scan direction.

Figure 3:
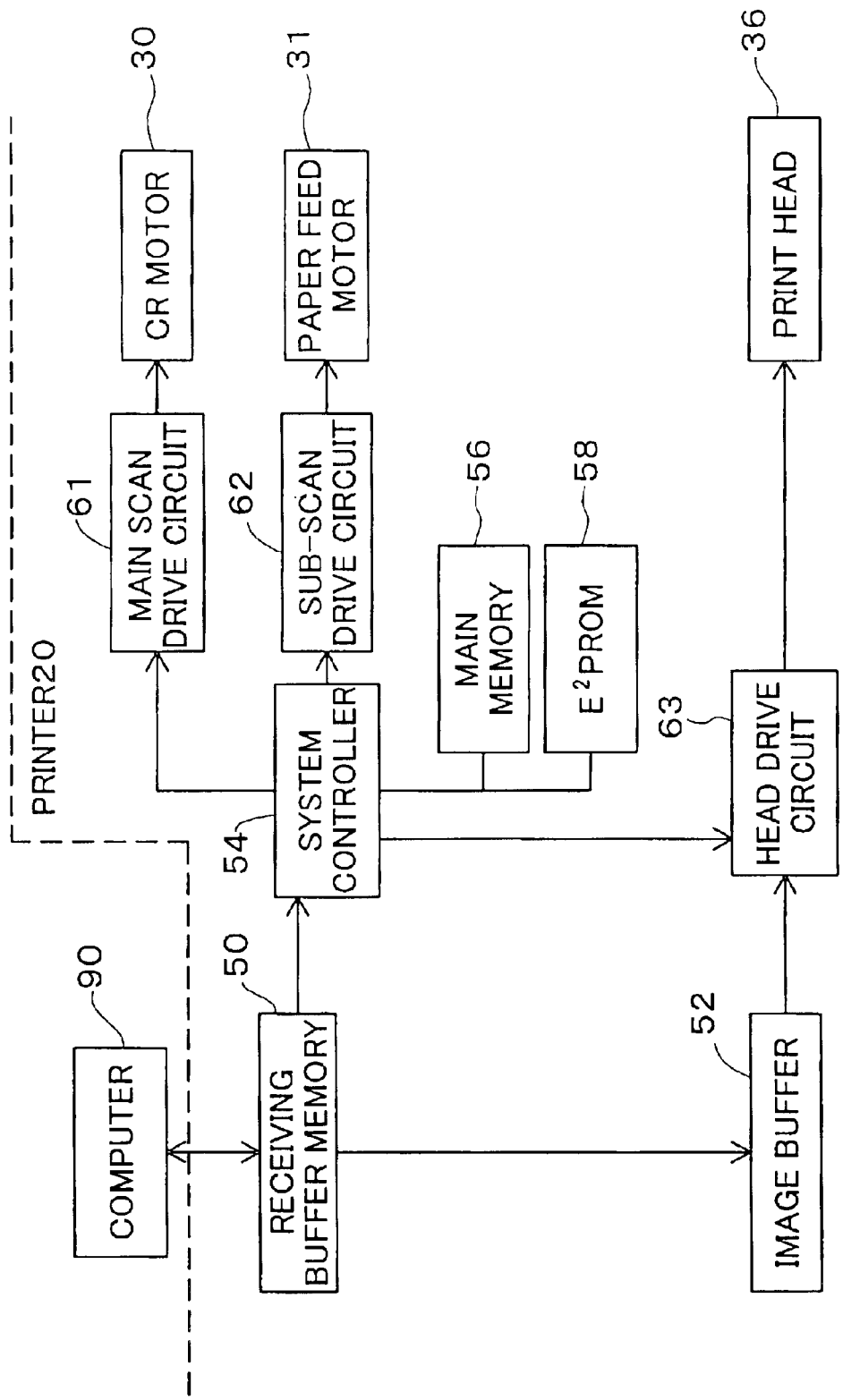
FIG. 3 is a block diagram which shows the electrical structure of the printer 20.

FIG. 3 is a block diagram which shows the electrical structure of the ink jet printer 20. This printer 20 comprises a receiving buffer memory 50 that receives signals provided from the computer 90, an image buffer 52 that stores printing data, a system controller 54 that control the operation of the printer 20 as a whole, a main memory 56, and an EEPROM 58. A main scan drive circuit 61 that drives the carriage motor 30, a sub-scan drive circuit 62 that drives the paper feed motor 31, and a head drive circuit 63 that drives the print head 36, are further connected to the system controller 54.

The main scan drive circuit 61, carriage motor 30, tractor belt 32 (FIG. 2) and guide rails 34 constitute a main scan drive mechanism. The sub-scan drive circuit 62, paper feed motor 31 and paper feed roller 24 (FIG. 2) constitute a sub-scan drive mechanism (also called a "feed mechanism").

The printing data that is transmitted from the computer 90 is temporarily stored in the receiving buffer memory 50. Inside the printer 20, the system controller 54 reads out the necessary information among the printing data from the receiving buffer memory 50, and sends control signals to the respective drive circuits 61, 62 and 63 on the basis of this information.

Printing data with a plurality of color components received by the receiving buffer memory 50 is stored in the image buffer 52. The head drive circuit 63 reads out the printing data of the respective color components from the image buffer 52 in accordance with the control signals from the system controller 54, and drives the nozzle array of respective colors installed in the print head 36 in accordance with this printing data.

Figure 4:
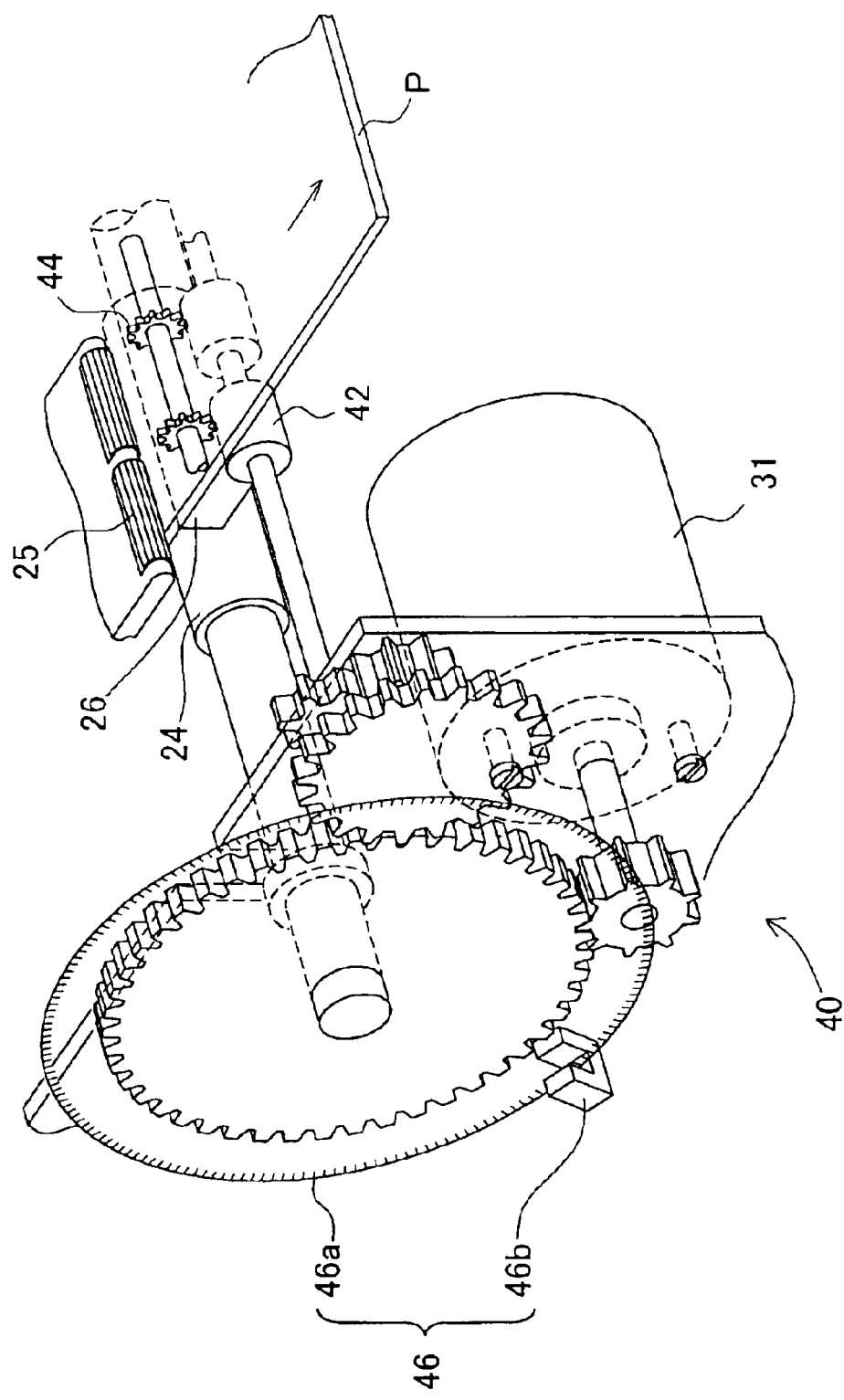
FIG. 4 is a perspective view which shows the structure of the sub-scan drive mechanism.

FIG. 4 is a perspective view which shows the structure of the sub-scan drive mechanism. The motive force of the paper feed motor 31 is transmitted to the paper feed roller 24 and paper ejection roller 42 via a gear train 40. A driven roller 25 is disposed against the paper feed roller 24, and a jag roller 44 is disposed as a driven roller against the paper ejection roller 42. The printing paper P is fed while being clamped by these rollers, and moves over the platen 26.

A rotary encoder 46 constructed from a scale disk 46a and a photo-sensor 46b is disposed on the shaft of the paper feed roller 24. The paper feed amount (sub-scan feed amount) is determined in accordance with pulse signals from this rotary encoder 46.

Figure 5:
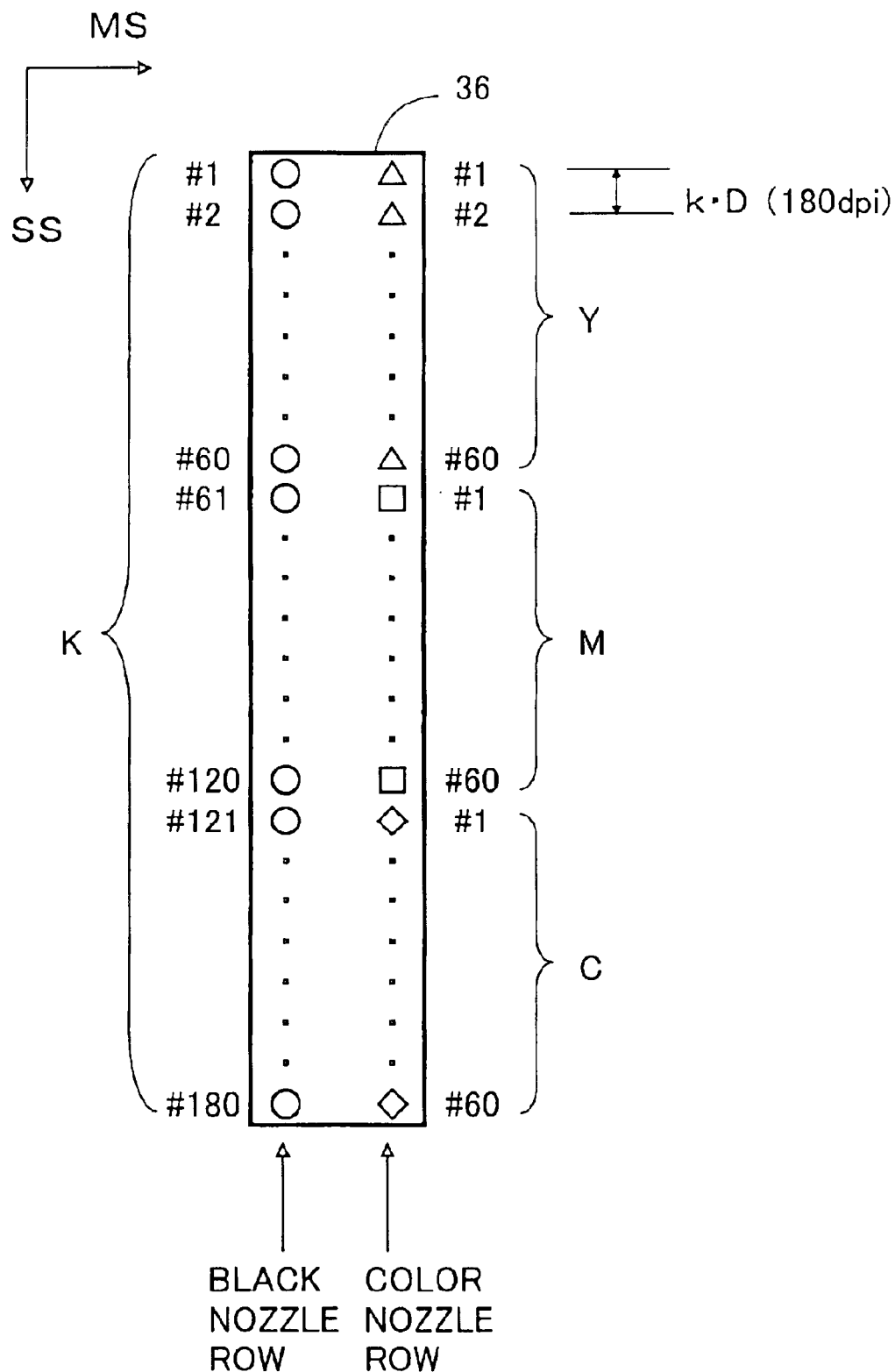
FIG. 5 is an explanatory diagram showing the nozzle arrangement on the undersurface of the print head 36.

FIG. 5 is an explanatory diagram which shows the nozzle arrangement on the undersurface of the print head 36. The print head 36 has a black nozzle row and a color nozzle row that are respectively arranged in single straight lines along the sub-scan direction SS. In the present specification, the "nozzle rows" will also be called "nozzle groups".

The black nozzle row (indicated by white circles) has 180 nozzles #1 through #180. These nozzles # 1 through # 180 are aligned at a fixed nozzle pitch k×D along the sub-scan direction. Here, D is a dot pitch in the sub-scan direction SS, and k is an integer. The dot pitch D is the value depending on the printing resolution in the sub-scanning direction. The dot pitch D in the sub-scan direction is also equal to the pitch of the main scan lines (raster lines). The integer k that expresses the nozzle pitch k×D will hereafter be referred to simply as the "nozzle pitch k". The units of the nozzle pitch k are "dots"; this refers to the dot pitch in the sub-scan direction.

In the example of FIG. 5, the nozzle pitch k·D is the value for 180 dpi. In case that the printing resolution (or dot pitch D) is set for 360 dpi in the sub-scanning direction, the nozzle pitch k is 2 dots. In case that the printing resolution is set for 720 dpi in the sub-scanning direction, the nozzle pitch k is 4 dots. The nozzle pitch k may take an integer of 1 or grater. In the first embodiment, the printing resolution is set for 720dpi.

The color nozzle row includes a yellow nozzle group Y (indicated by white triangles), a magenta nozzle group M (indicated by black squares) and a cyan nozzle group C (indicated by white diamonds). In this specification, the nozzle groups used for colored inks are also referred to as "colored nozzle groups". Each colored nozzle group has 60 nozzles # 1 through # 60. The nozzle pitch of the colored nozzle groups is the same as the nozzle pitch k of the black nozzle row. The nozzles of the colored nozzle groups are disposed in the same sub-scan positions as the nozzles of the black nozzle row.

Herein, as with the print head of FIG. 5, a print head that includes a color nozzle row composed of a multiplicity of color nozzle groups arrayed in order in the sub-scanning direction and a black nozzle row arranged parallel thereto shall be termed a "longitudinal array head". On the other hand, a print head wherein a multiplicity of color nozzle groups are present at substantially the same sub-scanning position arrayed in order along the main scanning direction shall be termed a "transverse array head". In a transverse array head as well, the multiplicity of nozzles making up each nozzle group are arrayed along the sub-scanning direction. In the example described hereinbelow, the longitudinal array head shown in FIG. 5 is used.

During printing, ink droplets are ejected from the respective nozzles while the print head 36 is moving at a constant speed in the main scan direction together with the carriage 28 (FIG. 2). However, depending on the printing system, all of the nozzles are not always used; in some cases, only some of the nozzles are used.

In the case of ordinary black and white printing, almost all of the 180 black nozzles are used. On the other hand, in the case of color printing, the 60 nozzles for each of the colors CMY are used, and 60 black nozzles are also used. For example, the 60 black nozzles that are used in color printing are the nozzles # 121 through # 180 disposed in the same sub-scan positions as the 60 cyan nozzles.

B. Outline Procedure of Paper Feed Correction:

As will be described below, the paper feed error can be corrected prior to the shipping of the printer 20, and also can be corrected by the user after shipping.

Figure 6:
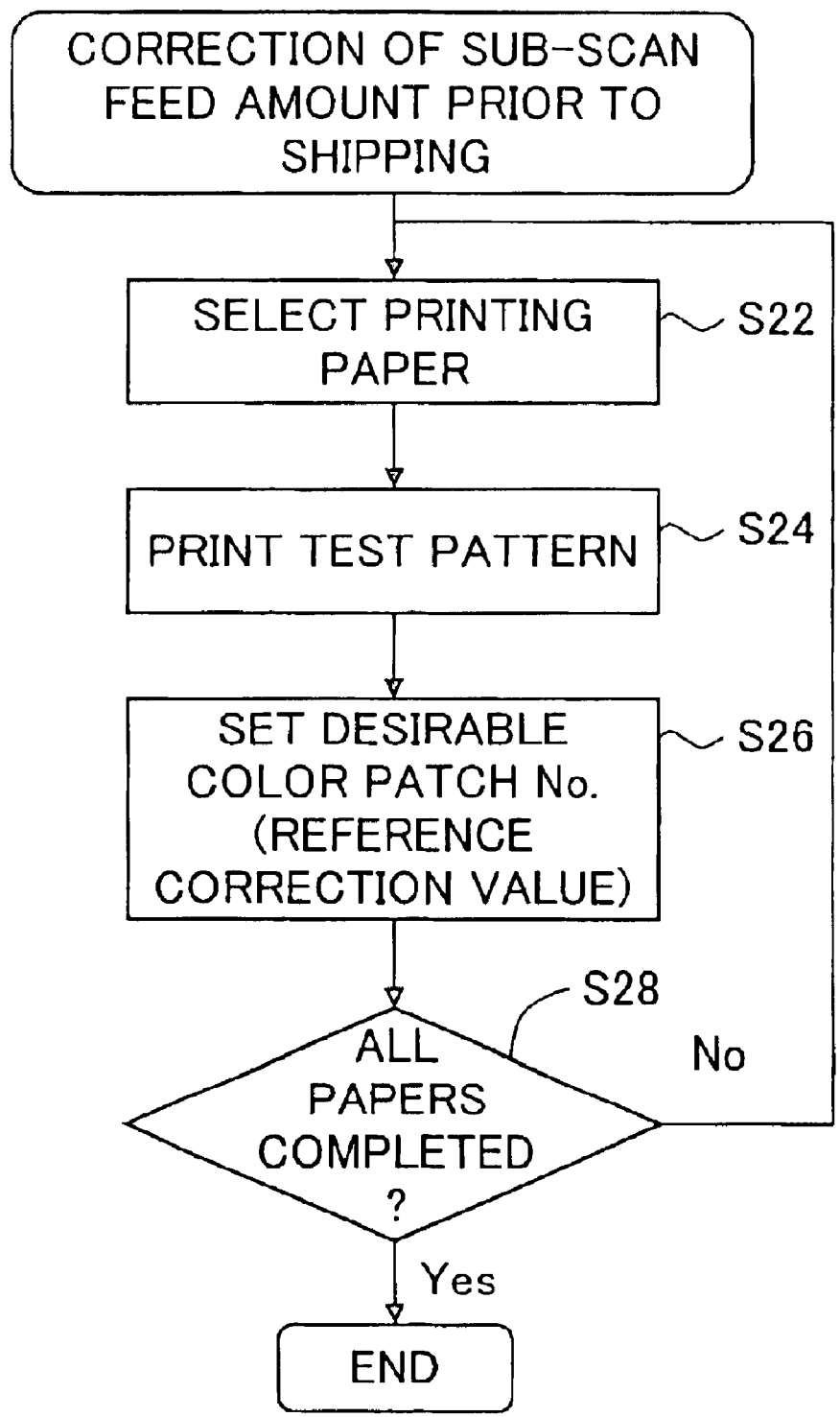
FIG. 6 is a flow chart which shows the procedure used to correct the paper feed prior to the shipping of the printer.

FIG. 6 is a flow chart which shows the procedure used to correct the paper feed prior to the shipping of the printer 20. In step SI, the types of printing paper (printing media) planned to be used in the printer 20 are successively selected. Types of printing paper that may be used include (for example) ordinary paper, glossy films, photographic paper, roll type photographic paper. In step S2, the selected printing paper is set in the printer 20, and a specific test pattern is printed.

FIG. 7 shows an example of a test pattern. In this example, the test pattern includes three color patches with different paper feed correction values δ. The patch number printed beside each color patch is associated beforehand with the paper feed correction value δ. However, the paper feed corrections values δ are merely depicted for convenience in the figure; these values are not actually printed. Each color patch is a gray patch in which a gray region of uniform optical density is reproduced by composite black using CMY inks. Such gray patches reflect both paper feed error and position error of the dots of the respective colors. Since the image quality of the actual printed matter is affected not only by the paper feed error, but also by the position error of the dots of the respective colors, it is desirable from the standpoint of improving the image quality to use gray patches that are reproduced by composite black as a test pattern. However, various other types of patterns can be used as test patterns; for example, other types of color patches and ruled line patters may also be used instead. In the present specification, the term "color patch" refers to an image region that is reproduced with an approximately uniform color. Details of the test pattern printing method will be described later.

Furthermore, in the present specification, the term "composite black" refers to a gray color that is reproduced using inks of the three hues CMY; this composite black may also be reproduced using inks of three or more types. For example, in cases where both a dark ink and a light ink can be respectively utilized for cyan and magenta, composite black can be reproduced using five types of inks, i.e., these four types of inks and a yellow ink.

The main cause of paper feed error in this printer 20 is manufacturing error of the paper feed roller 24 (FIG. 4). This manufacturing error includes error in the external diameter and error in the surface roughness. For example, if the external diameter of the paper feed roller 24 is greater than its design value, the feed error is a plus error; if this diameter is smaller than the design value, the feed error is a minus error. In the present embodiment, correction of the paper feed error caused by such manufacturing error in the paper feed roller 24 is corrected for each printer prior to shipping. Accordingly, even if the permissible error of the paper feed roller 24 is set at a somewhat large value, the paper feed error at the time of actual printing can be reduced almost to zero. Furthermore, as the tolerance regarding manufacturing error of the paper feed roller 24 is relaxed, the yield of the paper feed roller 24 is increased, so that the advantage of a reduction in the cost of the printer 20 is also obtained.

In step S26 in FIG. 6, the color patch with highest image quality is selected from the plurality of printed color patches, and the patch number of this patch is set in the EEPROM 58 (FIG. 3) of the printer 20. In the example shown in FIG. 7, a white streak has been generated in the uppermost color patch, and a black streak has been generated in the lowermost color patch. Accordingly, the patch number of the central color patch, in which there is no such deterioration in the image quality, is stored in the EPROM 58. The paper feed correction value set by inspection prior to shipping is referred to as the "reference correction value".

In step S28, a judgment is made as to whether or not steps S22 through S26 have been completed for all of the printing papers that are planned to be used in the printer 20. If the steps have not been completed, the processing returns to step S22. Here, the term "all of the printing papers that are planned to be used in the printer 20" refers to the types of printing papers that can be selected by the user in a property window of the printer driver 96 (FIG. 1). Thus, paper feed reference correction values are set for all of the different types of printing papers.

Figure 8:
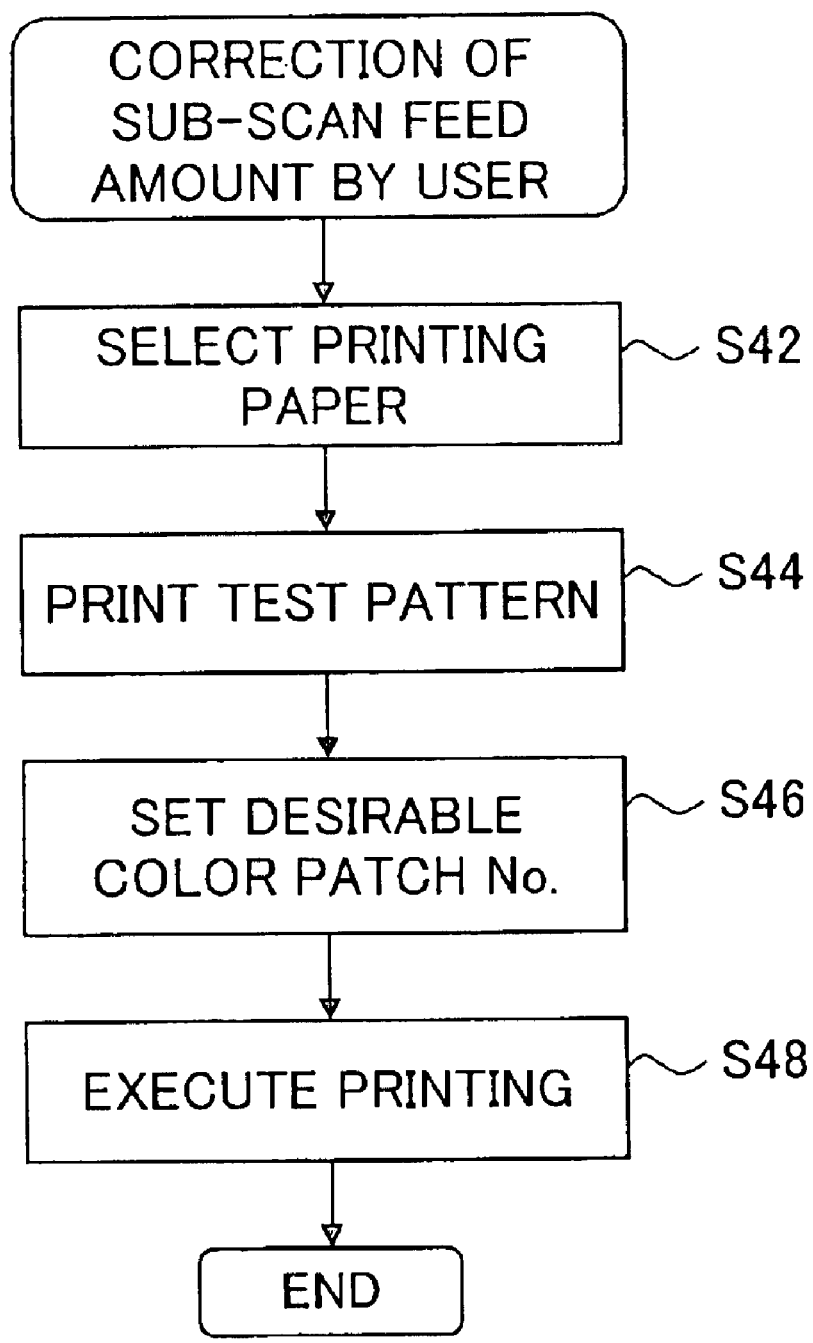
FIG. 8 is a flow chart which shows the procedure used for paper feed correction performed by a user.
Figure 9:
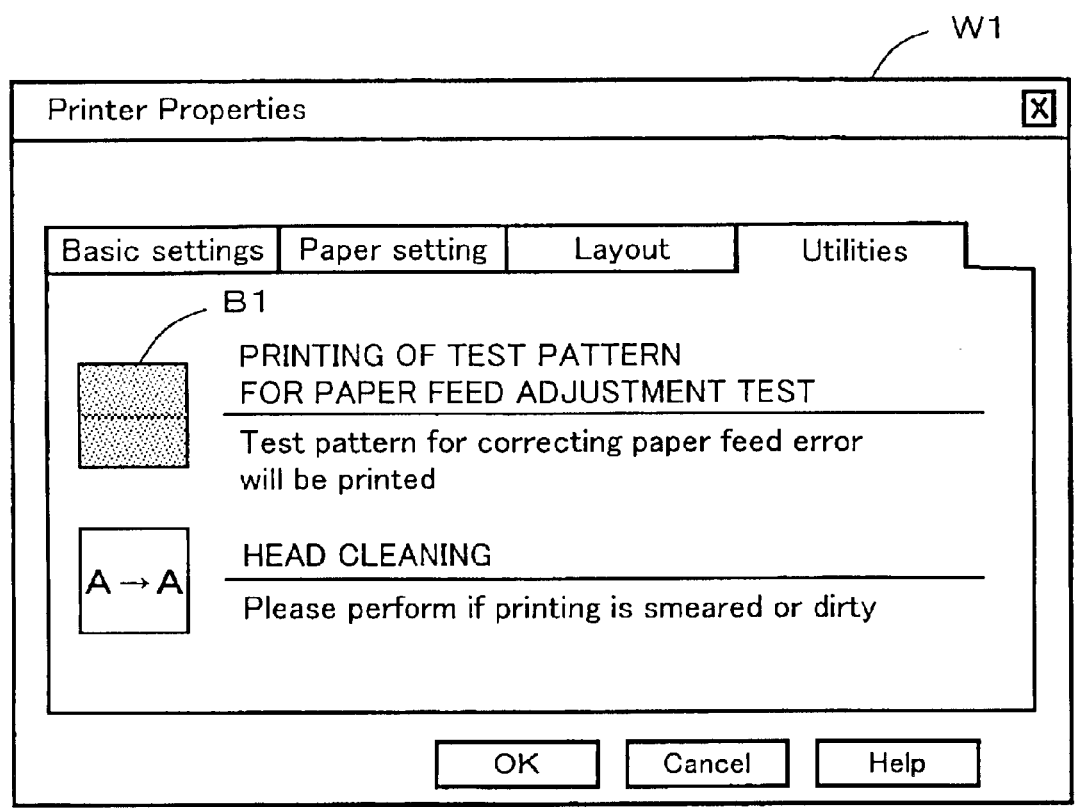
FIG. 9 is an explanatory diagram which shows an example of the user interface window W1 that allows the user to issue test pattern printing instructions.

FIG. 8 is a flow chart which shows the procedure used for paper feed correction performed by a user. In step S42, the user selects the type of printing paper, and in step S44, the user causes a test pattern to be printed by inputting a test pattern print command. FIG. 9 is an explanatory diagram which shows an example of the user interface window W1 that allows the user to issue test pattern printing instructions. This window W1 is a utility window in the printer properties; here, a button B1 which is used to input printing instructions for the paper feed adjustment test pattern is provided. When the user clicks on the button B1, the test pattern supply module 102 (FIG. 1) reads out a test pattern print signal TPS from the hard disk 92 and provides this signal to the printer 20, and the printer 20 prints a test pattern in accordance with this signal. This test pattern may be the same as the test pattern (FIG. 7) that is used for paper feed correction prior to shipping, or may be a different test pattern. In the present embodiment, the test pattern shown in FIG. 7 is also used for the paper feed correction that is performed by the user. The composition of the test pattern print signal TPS will be described later.

Figure 10:
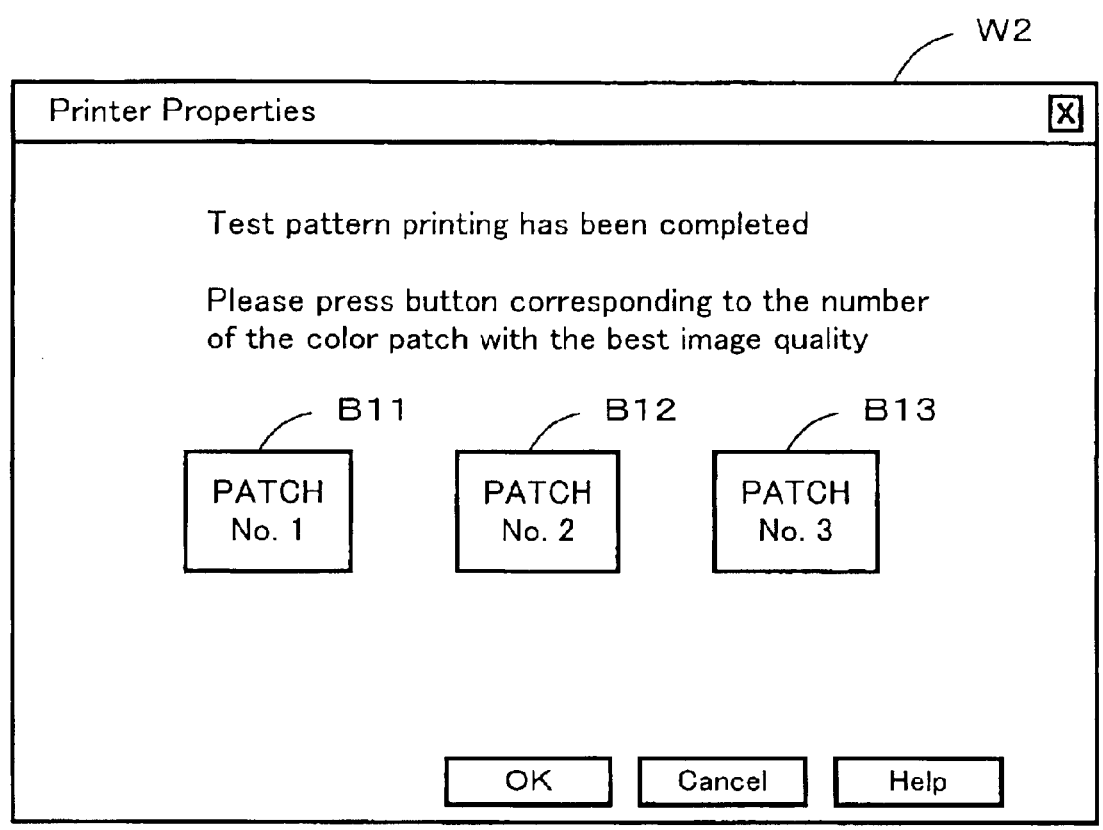
FIG. 10 is an explanatory diagram which shows an example of the user interface window W2 that allows the user to set the desired patch number.

In step S46 in FIG. 8, the color patch with the highest image quality is selected from the plurality of printed color patches, and the patch number of this color patch is set. FIG. 10 is an explanatory diagram which shows an example of the user interface window W2 that allows the user to set the desired patch number. When the test pattern is printed, this window W2 is automatically displayed by the user interface display module 101 (FIG. 1). A plurality of buttons B11 through B13 that are used to select the desired patch number are disposed in this window W2. When the user clicks on one of these buttons B11 through B13, the desired patch number is set in the EEPROM 58 (FIG. 3) of the printer 20. The patch number may be registered in the EEPROM 58 as a substitute for the reference correction value set in step S26 in FIG. 6, or may be registered in the EEPROM 58 as a value that further corrects the reference correction value. The patch number indicating the feed correction value set by the user may also be registered in the printer driver 96 rather than in the EEPROM 58.

In step S48 in FIG. 8, actual printing is performed in accordance with the instructions of the user. In this case, the operation of the paper feed motor 31 (FIG. 3) is controlled in accordance with the paper feed correction value set in step S46.

Thus, in the present embodiment, the paper feed error caused by manufacturing error in the paper feed roller 24 is corrected for each printer; accordingly, the paper feed error during actual printing can be reduced, so that printing with a high image quality can be realized. Furthermore, the tolerance of the manufacturing error of the paper feed roller 24 can be increased; as a result, the manufacturing yield of the paper feed roller 24 is increased, so that the cost of the printer 20 can be reduced. Moreover, since the user can also correct the paper feed error, compensation can be made for the paper feed error even in cases where the paper feed error varies over time as a result of wear on the gear train 40 (FIG. 4) of the paper feed mechanism or the like, so that printing with high image quality can be performed.

Figure 11:
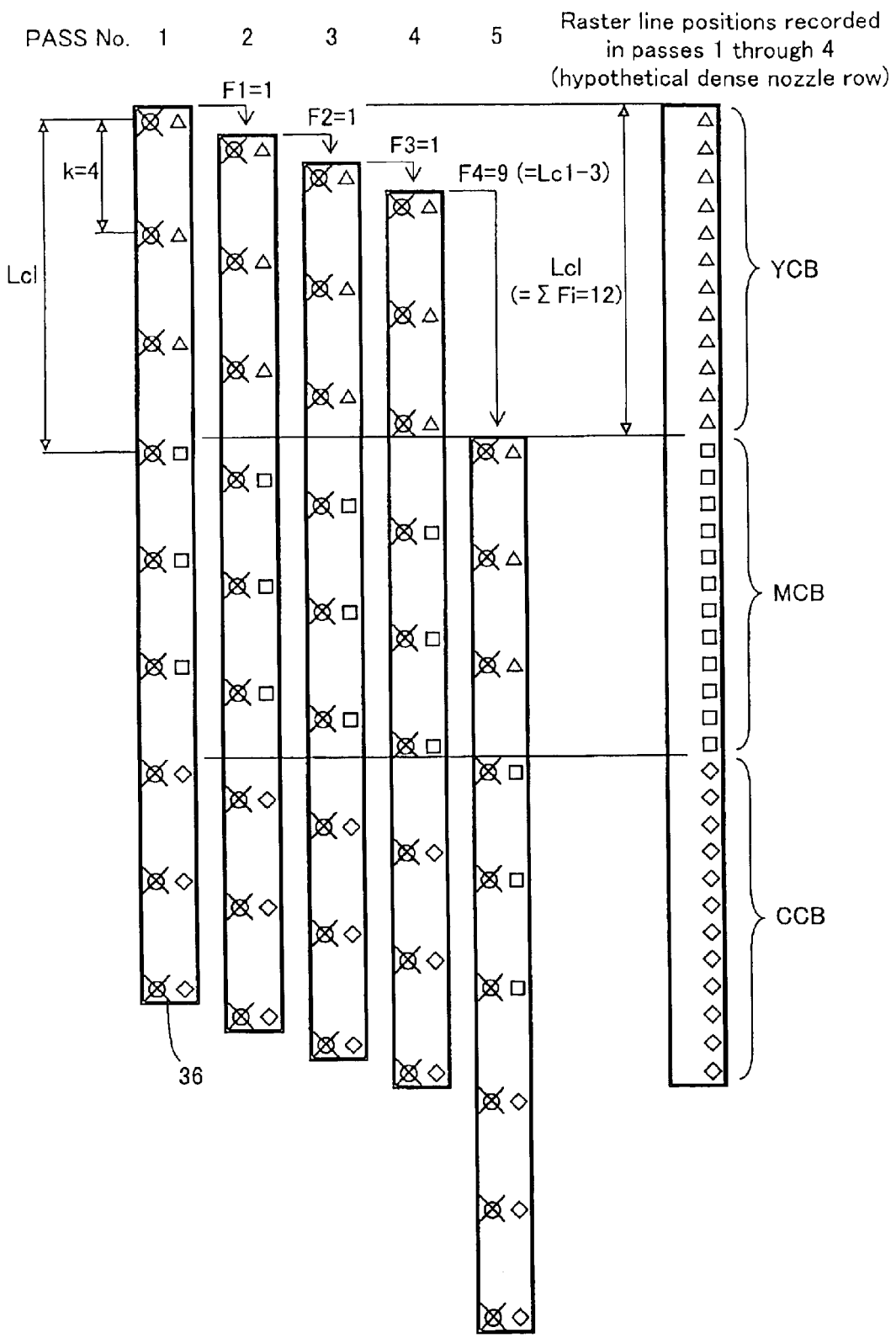
FIG. 11 shows an example of the paper feed used when the test pattern is printed.

C. Details of Test Pattern Printing Method and Method Used to Determine Paper Feed Correction Value:

FIG. 11 shows an example of the paper feed used when the test pattern is printed in step S24 in FIG. 6 and step S44 in FIG. 8. Here, the respective positions of the print head 36 in the sub-scan direction are shown in five passes, i.e., pass 1 through pass 5. Here, the term "pass" refers to a single main scan. In FIG. 11, only a reduced number of nozzles of the print head 36 are shown for convenience of illustration; the number of black nozzles (indicated by white circles) is nine, and the number of colored nozzles for each color is three. Furthermore, since the composite black gray patches shown in FIG. 7 are reproduced, the nine black nozzles are not used. In other words, three nozzles each are used for the three colors CMY.

Here, the nozzle pitch k is 4 dots, and a gap of 3 lines is formed between the raster lines (main scan lines) recorded in a single pass. The feed amounts F1, F2 and F3 following passes 1, 2 and 3 are each 1 dot. Accordingly, in passes 2 through 4, the 3 lines in the gap that were not recorded in pass 1 are recorded. The raster line positions recorded in passes 1 through 4 are shown at the right end of FIG. 11. As is seen from this figure, 12 contiguous lines are respectively recorded by the ink of each color in passes 1 through 4. Here, a band of the 12 lines recorded in yellow is called "yellow color band YCB". Similarly, a band of the 12 lines recorded in magenta is called "magenta color band MCB", and a band of the 12 lines recorded in cyan is called "cyan color band CCB". Each of the color bands is the same as the raster lines printed in a single pass using a hypothetical dense nozzle row that has 12 nozzles aligned at a nozzle pitch k of 1 dot for each ink. In other words, passes 1 through 4 are equivalent to a single pass using a dense nozzle row such as that shown at the right end of FIG. 11.

The paper feed amount F4 following pass 4 is 9 dots; as a result of this paper the nozzle at the upper end of the yellow nozzle group of the print head 36 is positioned at the uppermost end of the region in which no yellow dots are recorded. The same is true of the upper-end nozzles for the other inks. Such a recording method may be viewed as being equivalent to a recording method in which the paper is fed by the band width Lc1 of one color each time that one pass is made using the hypothetical dense nozzle row shown at the right end of FIG. 11. Accordingly, the paper feed shown in FIG. 11 is called a "quasi-band feed".

The feed amount F4 following pass 4 is equal to the value obtained by subtracting the total value (=3 dots) of the feed amounts F1 through F3 for the three preceding passes from the band width Lc1 of one color. Accordingly, the total $\Sigma Fi$ of the feed amounts F1 through F4 for four passes is equal to the band width Lc1 of one color. Furthermore, the band width Lc1 of one color is equal to the range of one colored nozzle row; this is also equal to the value N×k (=12) obtained by multiplying the number of nozzles N (=3) and the nozzle pitch k (=4).

In FIG. 11 the number of nozzles N per color is set at three for convenience of illustration; in actuality, however, the number of nozzles N per color is several tens of nozzles or greater. FIGS. 12(A) and 12(B) show examples of the paper feed amounts used in actual printing using the print head 36 shown in FIG. 5. This actual paper feed amount is set beforehand in the printer driver 96. FIG. 12(A) shows an example of quasi-band feed. In the color mode, the feed amounts F1 through F3 for three passes are all 1 dot, and the feed amount F4 for the fourth pass is 237 dots. The total of the feed amounts F1 through F4 for these four passes is equal to the band width of one color, i.e., N×k (=240). Furthermore, the number of nozzles N used for each color is 60. FIG. 11 shows the paper feed of this color mode in abbreviated form.

In the monochromatic mode shown in FIG. 12(A), 180 black nozzles are used. The feed amounts F1 through F3 for three passes are all 1 dot, and the feed amount F4 for the fourth pass is 717 dots. The total of the feed amounts F1 through F4 for these four passes is equal to the band width of the black nozzles, i.e., N×k (=720).

FIG. 12(B) shows an example of the paper feed amounts in printing using an ordinary interlace recording mode that does not use a quasi-band feed. Here, the term "interlace recording mode" refers to a printing method by which gaps are generated between the raster lines recorded in one pass. In other words, a printing method using a print head in which the nozzle pitch k is 2 dots or greater corresponds to an "interlace recording mode".

In the example shown in FIG. 12(B), the respective feed amounts Fi are equal to the number of nozzles N used; furthermore, the feed amounts are set at fixed integral values that are mutually prime with the nozzle pitch k. Here, "mutually prime" means that the two integers do not have a common factor other than 1. In the color mode example shown in FIG. 12(B), the number of nozzles N used is 59, and one of the 60 nozzles for each color is not used. In the monochromatic mode, the number of nozzles used is 179, and one of the 180 black nozzles is not used. In the present specification, the sub-scan in which the paper feed amounts Fi are thus fixed values is called a "fixed feed". Furthermore, the utilization of a "variable feed" in which a plurality of different values are used as the paper feed amounts Fi may also be utilized.

When a test pattern is printed utilizing a quasi-band feed such as that shown in FIGS. 11 and 12(A), banding tends to occur at the boundaries of the respective color bands as a result of paper feed error. Accordingly, this method is characterized by easy detection of the paper feed error. Here, the term "banding" refers to band-form areas of image deterioration running along the main scan direction. For example, in the case of the test pattern shown in the uppermost part of FIG. 7, light banding (a white streak) is generated at the boundary between the upper half and lower half, and in the case of the test pattern shown in the lowermost part of the same figure, dark banding (a black streak) is generated. Such a white streak is generated in cases where the paper feed is insufficient, and a black streak is generated in cases where the paper feed is excessive. The detection of banding may be accomplished using the naked eye, or may be accomplished automatically by capturing an image of the test pattern and subjecting this image to image processing.

Thus, when a test pattern (color patches) is printed by means of a quasi-band feed using a print head 36 in which the nozzle pitch k is 2 or greater, the advantage of easy detection of the paper feed error is obtained. In this sense, printing of a test pattern using the quasi-band feed shown in FIG. 12(A) is more desirable than printing in an interlace recording mode that does not use a quasi-band feed, as shown in FIG. 12(B). The quasi-band feed shown in FIG. 12(A) is the paper feed that is most frequently utilized in the actual printing of printed matter in a printer 20 which has the print head 36 shown in FIG. 5. Accordingly, the quasi-band feed shown in FIG. 12(A) is also desirable in that the test pattern can be printed using the paper feed that is most frequently used in actual printing "as is".

The test pattern print signal TPS representing the test pattern is registered in the printer driver 96 (FIG. 1), and is stored as a file for the printer driver 96 in the hard disk 92 of the computer 90. This test pattern print signal TPS has the same format as the printing data PD (raster data+paper feed amounts) that is transmitted to the printer 20 from the printer driver 96. However, it is desirable that this test pattern print signal TPS be stored in a form in which the data is compressed. When the user issues an instruction for the printing of a test pattern, this test pattern print signal TPS is called up by the test pattern supply module 102, and is transmitted to the printer 20 after being expanded if necessary. Thus, in the present embodiment, since the test pattern print signal TPS is registered in the printer driver 96 in a format that allows transmission to the printer 20 "as is", the system is advantageous in that the printing of the test pattern can be accomplished in a short time. This advantage is especially conspicuous in cases where a two dimensional test pattern such as the color patches shown in FIG. 7, is used.

Furthermore, in the present embodiment, since the test pattern print signal TPS is stored as a file in the printer driver 96, the following advantage is obtained: when the specifications of the printer driver 96 is changed, the test pattern print signal TPS can be simultaneously updated to a new version together with the printer driver 96. Accordingly, the test pattern that is used for the paper feed amount that is actually used by the printer driver 96 can be used to correct the paper feed amount.

In this printer 20, as is shown in FIGS. 12(A) and 12(B), a plurality of different paper feed amounts can be utilized. Accordingly, in the present embodiment, the correction value δ is determined for respective paper feed amounts.

Figure 13A:
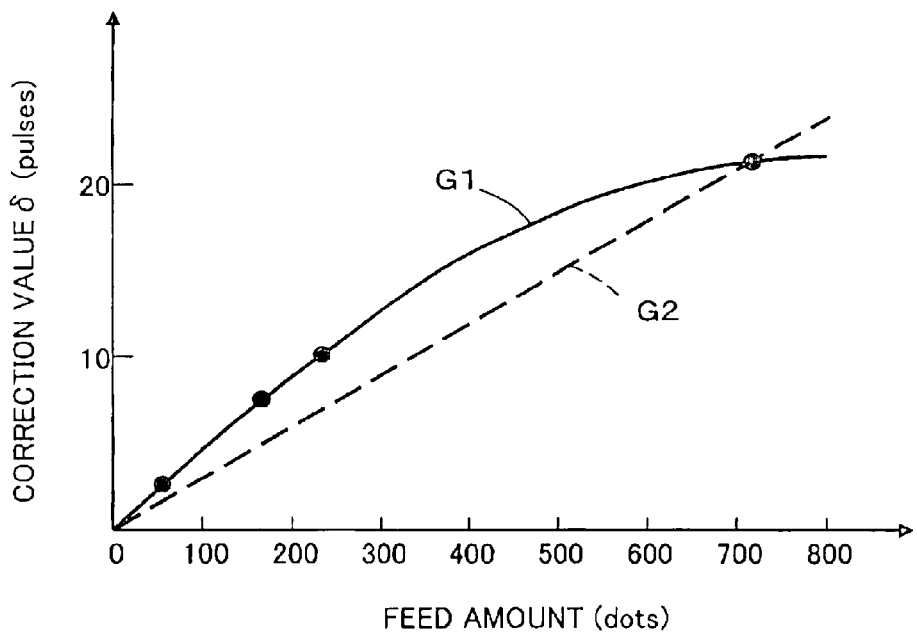
FIGS. 13(A) and (B) are explanatory diagrams which show the relationship between a paper feed amount F and a correction value $\delta$.
Figure 13B:
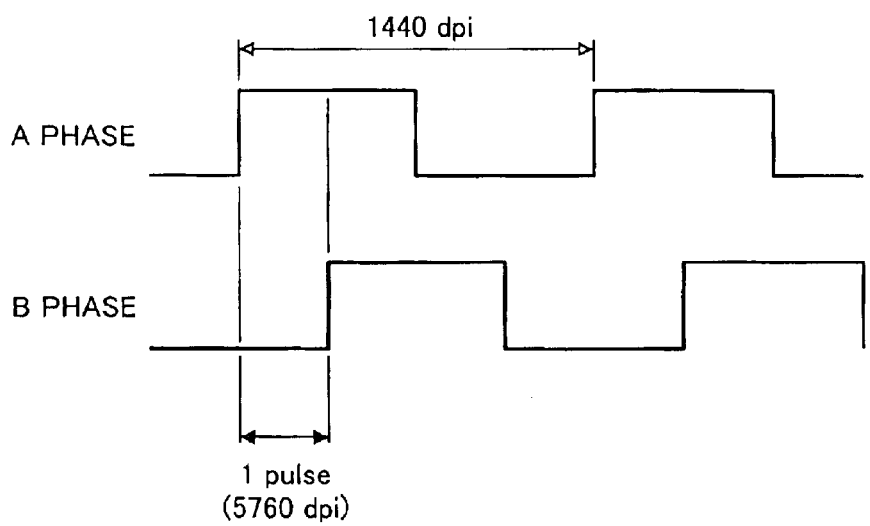

FIG. 13(A) shows the relationship between the paper feed amount F and the correction value δ. Here, the units of the paper feed amount F are "dots", and the units of the correction value δ are "pulses". FIG. 13(B) shows the units of the correction value δ. Here, it is assumed that one period of the signals of the A phase and B phase of the rotary encoder 46 (FIG. 4) of the paper feed mechanism corresponds to 1440 dpi. In an ordinary encoder, the signals of the A phase and B phase are phase-shifted by a ¼ period; accordingly, the position can be designated in units of ¼ of the period of 1440 dpi. Thus, in the present embodiment, a distance corresponding to ¼ of the period (1440 dpi) of the signals of the A phase and B phase of the encoder 46 is used as the unit "pulse" of the correction value δ.

However, some other value may be used for the units of the correction value δ. For example, ½ of the period of the output signals of the encoder may also be used as the units of the correction value δ. In cases where a step motor is used as the paper feed motor 31, one step pulse can be used as the units of the correction value δ.

The black circles in FIG. 13(A) show the correction values δ for the four feed amounts F: 59, dots, 179 dots, 237 dots and 717 dots. These four feed amounts F are those used in the four examples shown in FIGS. 12(A) and 12(B). Since the correction value for a 1 dot feed is almost zero, this corrections value is omitted in FIG. 13(A).

The various methods described below may be utilized as the method for determining the relationship between the plurality of feed amounts F and the correction values δ for these feed amounts.

Method 1: test patterns are actually printed using the plurality of feed amounts, and the correction value δ for each feed amount is determined.

Method 2: a test pattern is printed using a representative feed amount among the plurality of feed amounts to determine a correction value δ for this feed amount, and the correction values for the other feed amounts are predicted on the basis of this correction value.

In cases where Method 1 is used, for example, respective test patterns may be printed in the four types of modes shown in FIGS. 12(A) and 12(B), after which the respective correction values δ (in concrete terms, patch numbers) are determined.

In Method 2, there may be cases in which only a single value is used as the representative feed amount, and cases in which two or more values are used as representative feed amounts. In cases where only a single feed amount F is used as the representative feed amount, for example, a test pattern is printed for only the maximum value (=717) among the feed amounts F shown in FIGS. 12(A), 12(B) and 13(A), and the correction value δ for this feed amount is determined; then, the correction values for the other three feed amounts are predicted from this correction value. For example, the prediction of correction values for feed amounts other than the representative feed amount can be accomplished by setting the shape of a characteristic curve (predictive curve) such as the curve G1 or straight line G2 passing through the origin as shown in FIG. 13(A). Generally, it is sufficient to predict the correction values for feed amounts other than the representative feed amount in accordance with a predetermined predictive curve. Here, the term "predictive curve" has a broad sense that includes straight lines.

The reason why it is desirable to use the maximum value of the feed amounts used in the printer as the representative feed amount is that the correction value increases with the magnitude of the feed amount. In cases where two or more values are used as representative feed amounts, for example, the maximum value of the feed amounts used in the printer and one other arbitrary feed amount are used.

Thus, if a correction value is determined only for the representative feed amount by printing a test pattern, and the correction values for the other feed amounts are predicted from the correction value for this representative feed amount, the number of test patterns required is reduced, so that the time required for correction can be shortened.

Figures 14, 15:
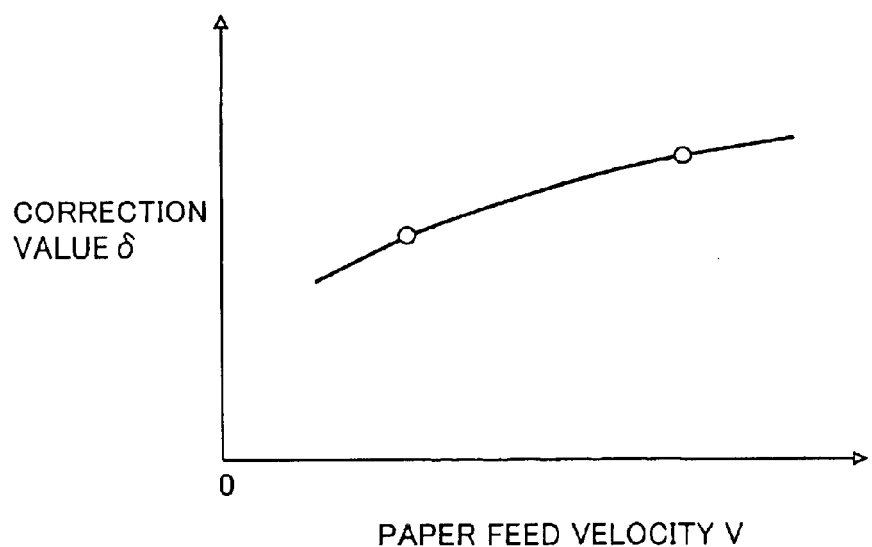
FIG. 14 is an explanatory diagram which shows paper feed correction values determined for different types of printing paper.
FIG. 15 is a graph which shows the relationship between a paper feed velocity V and the correction value $\delta$.

FIG. 14 is a table which shows paper feed correction values determined for different types of printing paper. In this table, correction values δ for four feed amounts F are registered for each of four types of printing paper. As is seen from this example, the ease of slipping varies according to the type of printing paper; accordingly, it is desirable to register respective correction values δ for each type of printing paper. If this is done, an appropriate paper feed correction can be performed for each type of printing paper.

Actual measurement of the correction values δ for each type of printing paper is not always necessary. For example, a method may be used in which correction values are actually measured for only one specified type of printing paper among the plurality of different types of printing paper, and the correction values for the other types of printing paper are predicted from these correction values. In concrete terms, for example, a method can be used in which the correction values δ for ordinary paper are measured, and the correction values for other types of printing paper are determined by multiplying the correction values for ordinary paper by respective specified coefficients. Ordinarily, an approximately fixed relationship holds between correction values for different types of printing paper, and there is seldom any great departure from this relationship; accordingly, such predictions are possible. If this is done, then determination of the correction values for a single type of printing paper makes it possible to perform an appropriate paper feed correction for other types of printing paper as well. Furthermore, such a method is especially advantageous in that the effort expended by the user in printing a test pattern for the printer 20 is reduced, so that the trouble of paper feed corrections can be alleviated.

FIG. 15 is a graph which shows the relationship between the paper feed velocity V and the correction value δ. As is shown here, the correction value for the paper feed amount tends to increase with an increase in the paper feed velocity V. Accordingly, in cases where the paper feed velocity varies according to the printing mode, it is desirable to set the paper feed correction value δ in accordance with the paper feed velocity. In this case as well, it is possible to use a method in which the correction value is actually measured for one paper feed velocity, and the correction values for other paper feed velocities are predicted from this correction value.

The correction values δ shown in FIGS. 13(A), 13(B), 14 and 15 are registered in a nonvolatile memory (EEPROM 58) inside the printer, and in the printer driver 96 (concretely, in the hard disk of the computer 90). Then, at the time of actual printing, the value obtained by correcting the paper feed amount F by the corresponding correction value δ is provided to the sub-scan drive circuit 62 by the system controller 54 as a command value.

Figure 16A:
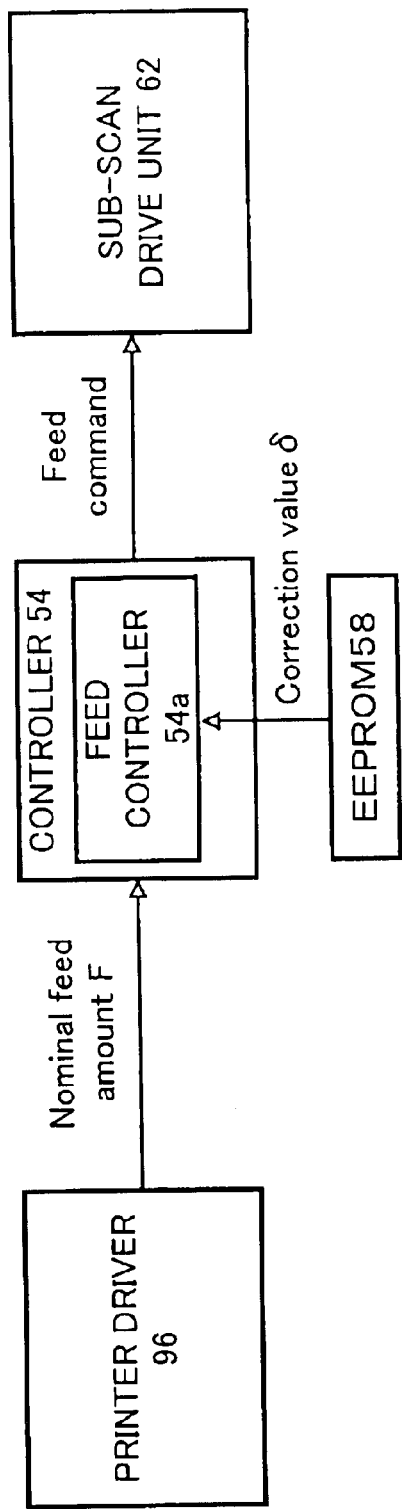
FIGS. 16(A) and 16(B) are explanatory diagrams which shows two methods for transmitting the paper feed amount F and corresponding correction value $\delta$.
Figure 16B:
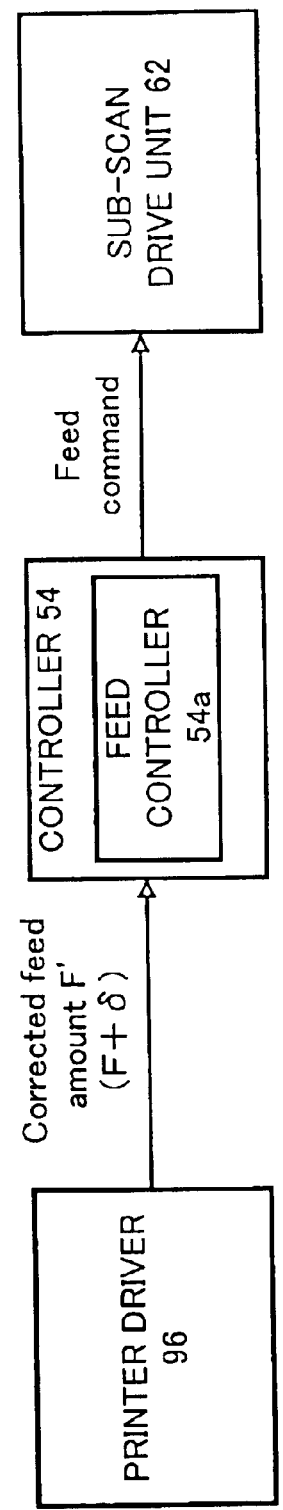

FIGS. 16 show two transmission methods for the paper feed amount F and corresponding correction value δ. In the first method shown in FIG. 16(A), the uncorrected normal feed amount F is transmitted to the system controller 54 from the printer driver 96. The paper feed controller 54*a* of the system controller 54 reads out the correction value δ from the EEPROM 58, corrects the feed amount F, and provides the corrected feed amount to the sub-scan drive circuit 62 as a command value. In the second method shown in FIG. 16 (B), a corrected feed amount F' is transmitted to the system controller 54 from the print driver 96. The paper feed controller 54*a* of the system controller 54 provides the corrected feed amount F' to the sub-scan drive circuit 62 as a command value.

Thus, in the present embodiment, a test pattern is printed using the same interlace recording mode as that used in actual printing, and the paper feed amount is corrected using a correction value δ that is determined in accordance with the results of this test pattern. Accordingly, printing with a high image quality in which there is little paper feed error can be performed. In particular, since correction values are registered for each type of printing paper, compensation can be made for differences in the paper feed amount arising from the printing paper that is actually used.

Figure 17:
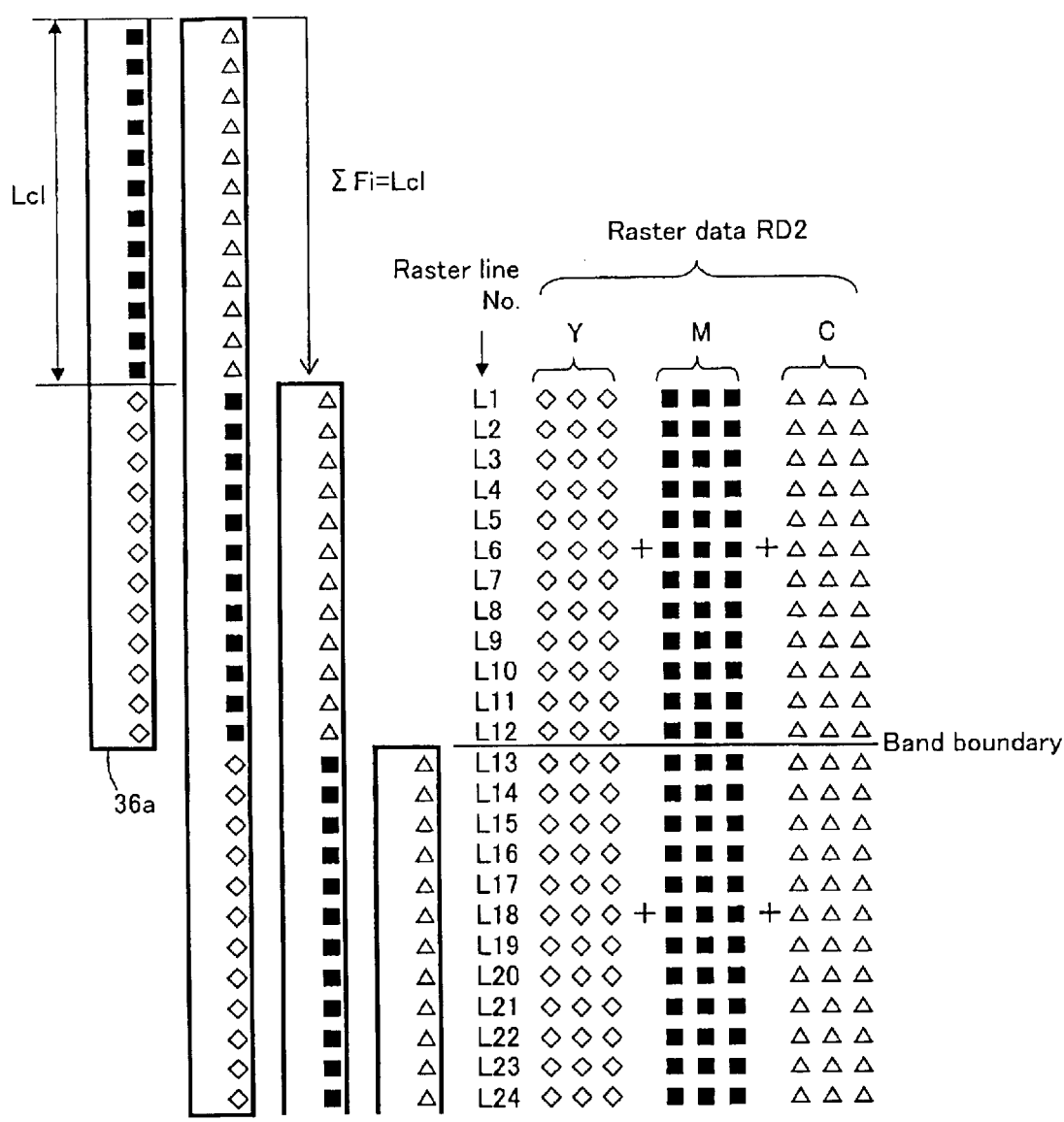
FIG. 17 is an explanatory diagram which shows the content of the test pattern print control signal used for patch No. 2.

D. Structure of Test Pattern Print Signal:

FIG. 17 shows one example of the test pattern print signal that is used to realize the patch of patch No. 2 shown in FIG. 7. The hypothetical dense nozzle row 36*a* shown in FIG. 11 is shown in FIG. 17. As was shown in FIG. 11, this dense nozzle row 36*a* is constructed by four passes. The dense nozzle row 36*a* may be viewed as an entity that is fed in the sub-scan direction by the band width Lc1 of one color at a time.

The structure of raster data RD1 that is used to form one color patch with 24 raster lines L1 through L24 using such a dense nozzle row 36a is shown in the right half of FIG. 17. On the basis of this raster data RD1, dots of the three colors Y, M and C are respectively recorded on all of the raster lines L1 through L24. Furthermore, in FIG. 18, the positions where the Y, M and C dots are formed are shifted for convenience of illustration; in actuality, however, dots of the respective colors are formed in the same pixel positions.

When such a test pattern print signal is used, a patch with no banding, such as patch No. 2 shown in FIG. 7, is formed in cases where the paper feed error is zero. On the other hand, when the paper feed error is a plus error, a white streak is formed at the band boundary, and when the paper feed error is a minus error, a black streak is formed at the band boundary. In other words, in the case of the print signals shown in FIG. 17, the paper feed error is simulated by differences in the paper feed amounts of the respective patches.

Figure 18:
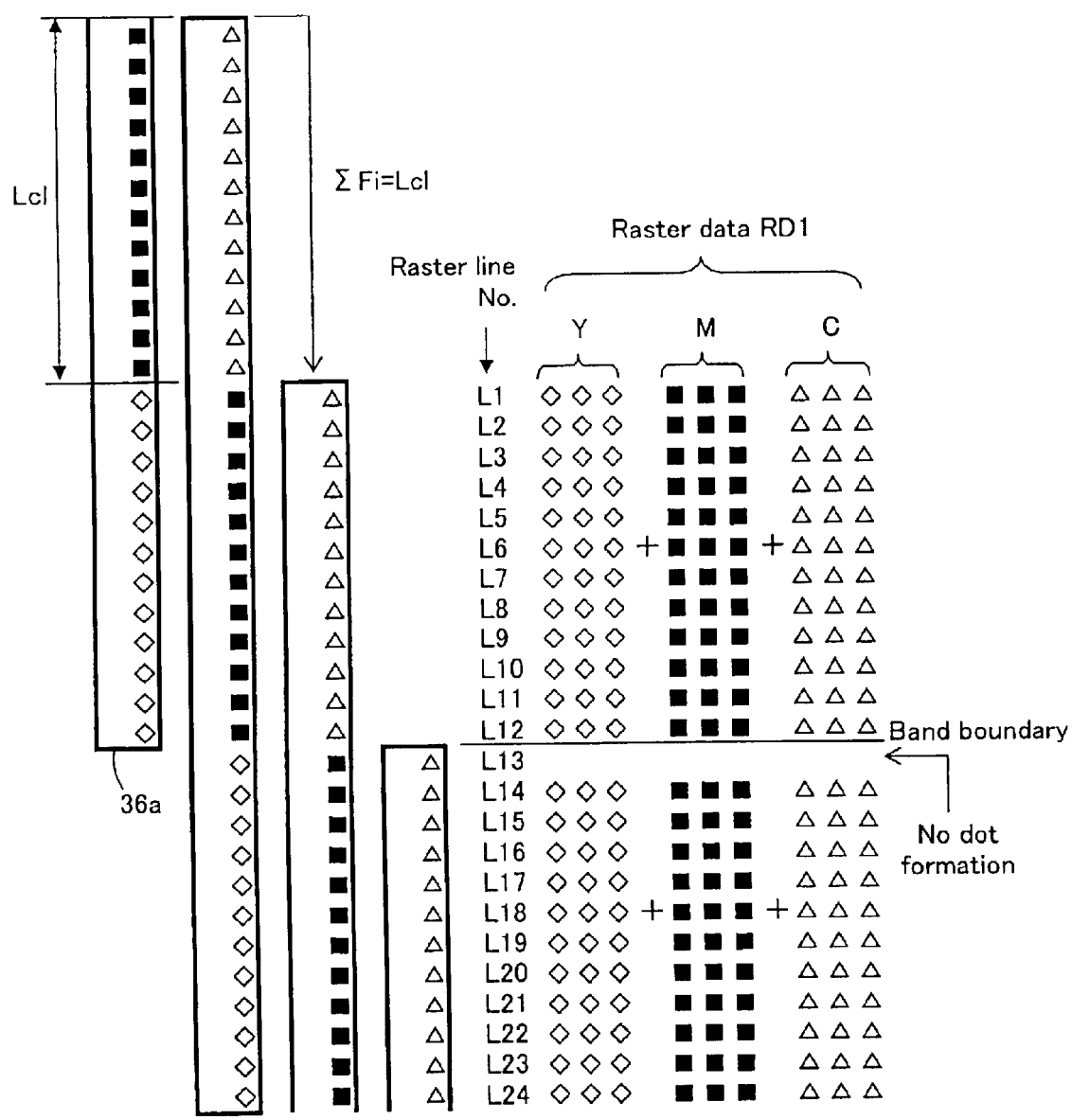
FIG. 18 is an explanatory diagram which shows the content of the test pattern print control signal used for patch No. 1.

FIG. 18 shows one example of the test pattern print signal that is used to reproduce patch No. 1 shown in FIG. 7. In the case of this print signal, the paper feed amount is the same as that shown in FIG. 17; however, the raster data that expresses the conditions for dot formation in the respective pixels is different from that shown in FIG. 17. Specifically, on the raster line L13 immediately below the band boundary, raster data is formed so that no dots of any of the Y, M or C inks are formed. In other words, in the print signal shown in FIG. 18, the paper feed error is simulated by differences in the raster data of the respective patches. If such a test pattern print signal is used, then a patch with a white streak, such as the patch of patch No. 1 shown in FIG. 7, is printed in cases where the paper feed error is zero. Accordingly, if a paper feed error of 1 dot is present during actual printing, a clean patch with no white streak is reproduced.

FIGS. 19(A) and 19(B) are explanatory diagrams which show examples of structure of test pattern print signals. The print signals used for the respective patches include the paper feed amounts and raster data. In the first example shown in FIG. 19(A), the print signals used for the respective patches have the same paper feed amounts, while the raster data is different in the respective signals. Furthermore, a value in the color mode of example 1 of the paper feed in FIGS. 12(A) and 12(B) is used as the paper feed amount. The print signals shown in FIGS. 17 and 18 correspond to the print signals in FIG. 19(A).

In the case of the second example shown in FIG. 19(B), the print signals used for the respective patches have the same raster data and different paper feed amounts. Specifically, the data inherently free of banding shown in FIG. 17 is used as the raster data. Furthermore, in regard to the paper feed amount, the value of the fourth feed amount F4 successively differs by 1 dot in the print signals used for the respective patches.

Both sets of the print signals shown in FIGS. 19(A) and 19(B) can print the three patches shown in FIG. 7. However, in cases where the respective patches are printed using the same paper feed amounts and using raster data that simulates the sub-scan feed error as shown in FIG. 19(A), the units of the paper feed amount correction values are limited to integral multiples of the raster line pitch. On the other hand, in cases where the respective patches are printed using the same raster data and paper feed amounts that simulates the sub-scan feed error as shown in FIG. 19(B), the units of the paper feed amount correction value can be set finer than the raster line pitch, as was also indicated in FIG. 13(B).

E. Modifications of the First Embodiment:

Furthermore, the present invention is not limited to the abovementioned examples and embodiments, but can be worked in various aspects within a range that involves no departure from the gist of the invention. For example, the following modifications are also possible.

E1. Modification 1:

The first embodiment is directed with reference to color ink jet printers, but the present invention can also be applied to monochromatic printers. Furthermore, the present invention can also be applied to printers other than ink jet printers. Generally, the present invention can be applied to printing devices that record images on printing media; for example, the present invention can be applied to facsimile devices and copying machines.

E2. Modification 2:

The first embodiment is described in cases where the nozzle pitch k is 4 dots. In general, however, the present invention can be used in cases where printing is performed in an interlace recording mode using a print head in which the nozzle pitch k is 2 dots or greater. Generally, quasi-band feeding is accomplished by performing one sub-scan with a feed amount of {N×k−(k−1)} dots after a sub-scan with a 1 dot feed is performed (k−1) times. In this case, dot recording is performed during the main scan between the respective sub-scan feeds. Furthermore, the unit of "1 dot" refers to the dot pitch in the sub-scan direction.

E3 . Modification 3:

The first embodiment uses, as shown in FIG. 5, a print head 36 with a two-row structure consisting of a black nozzle row and a color nozzle row. However, the present invention can also be applied to print heads in which the nozzle rows for the respective colors are all in the same position in the sub-scan direction, and are successively aligned along the main scan direction.

E4. Modification 4:

In the first embodiment, color patches are used as a test pattern; however, arbitrary patterns other than color patches can also be used as test patterns. However, if color patches are used, the advantage of easy detection of banding caused by the paper feed error is obtained.

Furthermore, in the first embodiment, correction values are determined using one type of test pattern; however, it would also be possible to determine correction values using a plurality of different types of test patterns. For example, it would also be possible to use a method in which a rough correction value is determined using a first test pattern used for rough adjustment, and a final fine correction value is then determined using a second test pattern used for fine adjustment. For example, the rough correction value can be set at 10-step intervals, and the fine correction value can be set at 1-step intervals. If a plurality of stages of adjustment are thus performed, a fine correction value can be efficiently determined.

E5. Modification 5:

In the first embodiment, gray patches reproduced by composite black are used as the color patches of the test pattern. However, other color patches can also be used. For example, gray patches reproduced by black ink alone, or monochromatic color patches reproduced by cyan ink or magenta ink can also be used. Alternatively, color patches of a secondary color reproduced using two inks among inks of the three colors cyan, magenta and yellow can also be used. The inks selected for reproducing the color patches are inks for which an improvement of the image quality by correction of the paper feed error is desired. Specifically, if the color patches are reproduced using inks for which an improvement of the image quality by correction of the paper feed error is desired, then the quality of images in which this inks are widely used can be achieved by correcting the paper feed error using these color patches.

E6. Modification 6:

In the first embodiment, the correction values are determined by visual observation of the test pattern by a human being. However, instead of this, it would also be possible to use a method in which the effects of sub-scan feed error on the image quality are measured using an image quality measuring device that automatically measures the image quality of the test pattern, and the sub-scan feed may be corrected by a correction device in accordance with the measurement results. If this is done, then the sub-scan feed error can be appropriately corrected without any need for manual operation.

II. The Second Embodiment

A. Paper Feed Correction

Paper feed correction in the second embodiment is different from that of the first embodiment in the test pattern and the point that printing resolutions can be selected. Other aspects including of hard ware structures are the same in the first embodiment.

Figure 20:
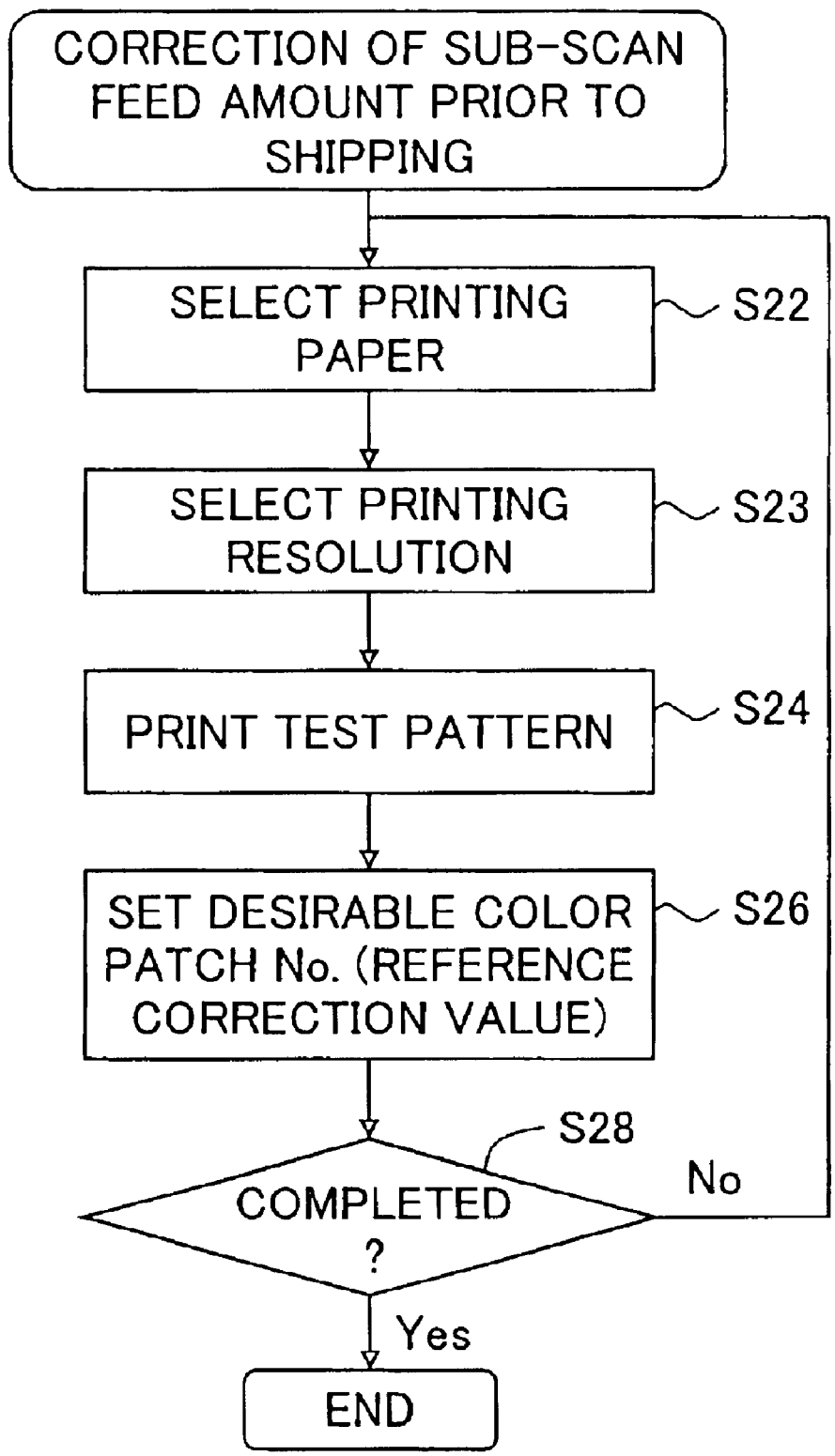
FIG. 20 is a flow chart showing the procedure of paper feed correction prior to shipping a printer.

FIG. 20 is a flow chart which shows the procedure in the second embodiment used to correct the paper feed prior to the shipping of the printer 20. The flow chart in FIG. 20 is the same as that of FIG. 6 except the point including Step 23. In Step S23 printing resolution is selected. In this example, it is possible to use as print resolutions two different print resolutions, a low resolution of 360×360 dpi and a high resolution of 720×720 dpi. Print resolution is denoted herein as (main scanning direction resolution)×(sub-scanning direction resolution).

Figure 21:
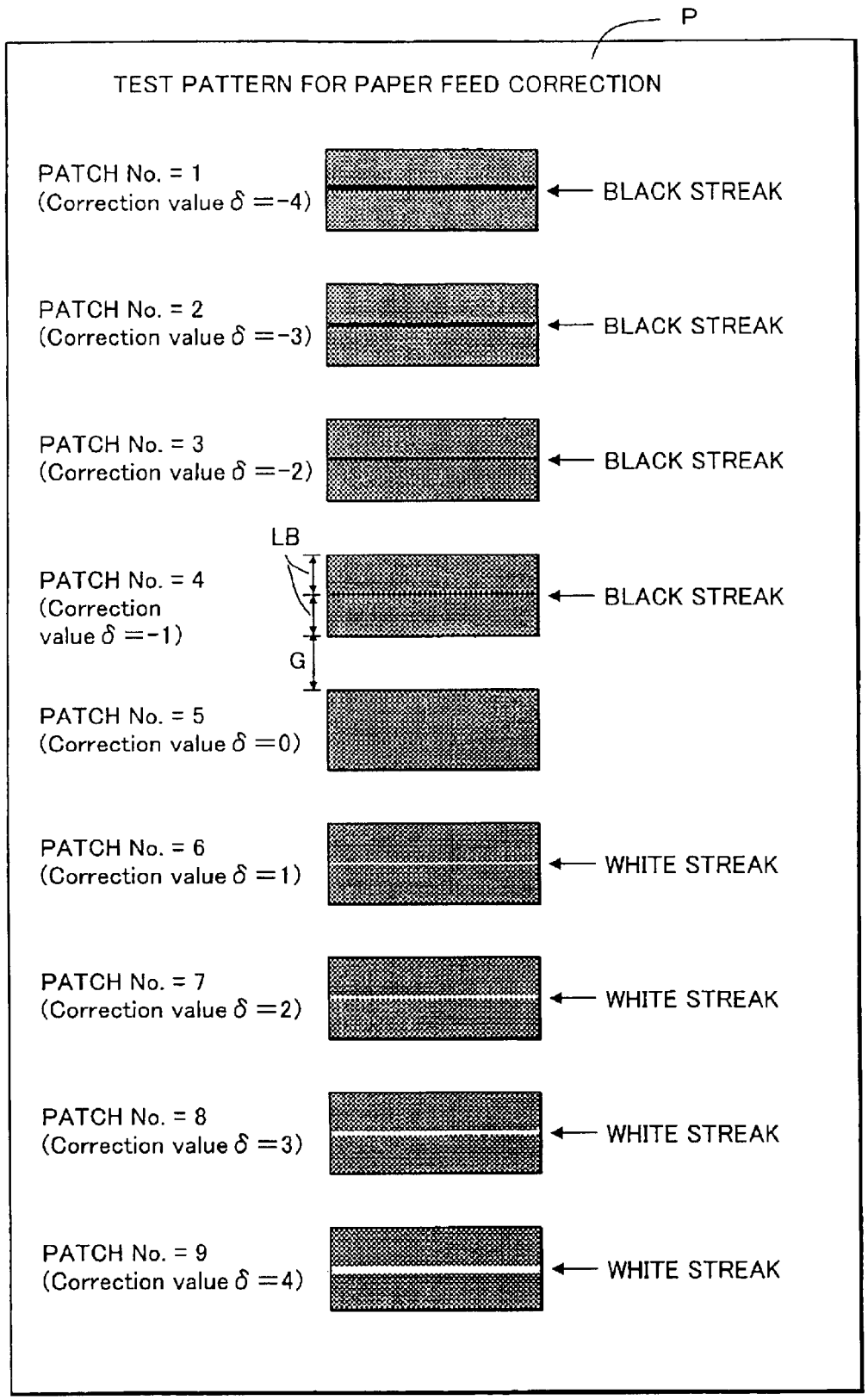
FIG. 21 is an illustrative diagram showing a test pattern.

In Step S24 the selected printing paper is set in printer 20, and a predetermined test pattern is printed thereon. An exemplary test pattern is shown in FIG. 21. The test pattern consists of nine color patches with different paper feed correction values δ, printed on a single sheet of A4 size printer paper P in a row extending in the sub-scanning direction (vertical direction in FIG. 21). The height of each test patch (2×LB) and the value of the gap G between color patches is set such that all color patches can be accommodated on a single sheet of printing paper P. These values (2×LB, G) will be described later.

The patch numbers printed to the side of color patches are pre-associated with paper feed correction values δ. For convenience, paper feed correction values δ are shown in the drawing, but are not actually printed. Each color patch consists of a gray patch of a gray area of uniform density, reproduced with black ink only.

Relative positions of the upper half and lower half of each gray patch are adjusted with reference to the paper feed correction value δ. As a result, a black streak or white streak extending parallel to the main scanning direction appears in each color patch, depending on the relationship of printer 20 paper feed error and paper feed correction value δ. The test pattern shown in FIG. 21 corresponds to printing in the absence of any paper feed error in printer 20. In this instance, gray patch No. 5 (correction value δ=0) is devoid of either a black streak or white streak, from which it may be observed to be the optimal correction condition. In the event that there is paper feed error, optimal correction condition will be obtained with a different patch.

Figure 22A:
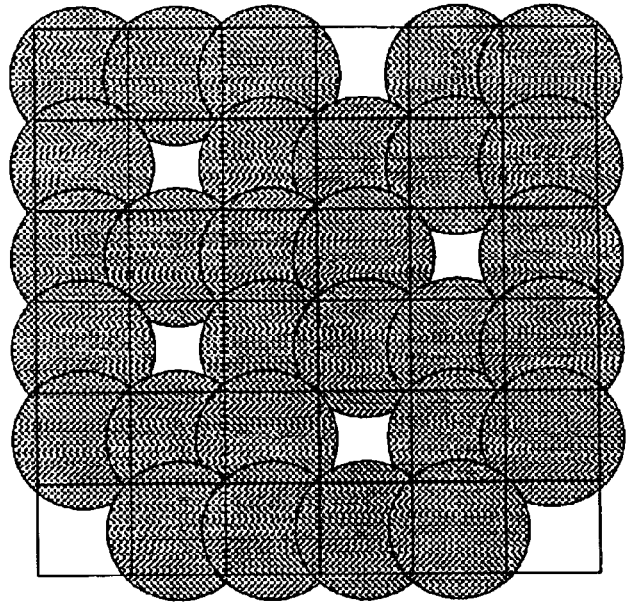
FIGS. 22(A) and 22(B) are illustrative diagrams showing two dot recording methods for a test patch.
Figure 22B:
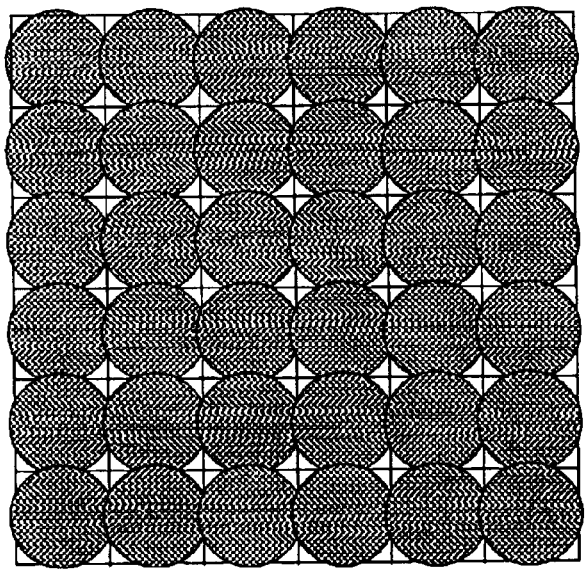

FIGS. 22(A) and 22(B) are illustrative diagrams showing two kinds of dot recordings for gray patches. In FIGS. 22(A) and 22(13), the square grids denote pixels, and the circles hatched with diagonal lines represent ink dots. In the first method illustrated in FIG. 22(A), dot size is solid size (100% size) and dot recording rate is 80%. Here, "solid size" refers to dot size that produces a solid area (i.e. an image area completely covered by ink without any gaps) when dots are recorded on all pixels. Solid size is typically predetermined for each print resolution. "Dot recording rate" refers to the percentage of pixels recorded by dots.

In the dot recording method illustrated in FIG. 22(A), the reason for setting dot recording rate to 80% is to facilitate detection of black streaks and white streaks in the gray patches shown in FIG. 21. That is, if dot recording rate is set to an excessively high value (100%, for example), there is tendency for the ink to bleed, possibly making it difficult to observe black streaks and white streaks. If, on the other hand, dot recording rate is set to an excessively low value (60%, for example), ink dots will tend to become excessively sparse, possibly making it difficult to observe black streaks and white streaks. In contrast, where dot recording rate is set to about 80%, ink bleeding is negligible, while the dots are arranged fairly densely, so that black streaks and white streaks are readily apparent. When using plain paper, it is acceptable for gray patch dot recording rate to be less than 100%, with values in the range of about 70% to about 90% being preferred, especially values of about 75% to about 85%, and ideally about 80%.

In the second method shown in FIG. 22(B), dot size is 80% of solid size, and dot recording rate is 100%. With this dot recording method, like the method of FIG. 22(A), it is possible to record gray patches in which black streaks and white streaks are readily apparent.

Herein, the product of dot size (% of area where solid size is assigned a value of 100%) and dot recording rate is termed "ink duty". In the two methods depicted in FIGS. 8(A) and (B), ink duty is 80%. When using plain paper, it is acceptable for ink duty in the gray patches of the test pattern to be less than 100%, with values in the range of about 70% to about 90% being preferred, especially values of about 75% to about 85%, and ideally about 80%. In preferred practice, the ink duty value for gray patches will be set to different values depending on the type of printing medium (difference in surface qualities).

Various patterns other than that shown in FIG. 21 can be used as test patterns, for example, those using different kinds of color patches, or ruled line patterns etc. In particular, color patches are not limited to gray patches, it being possible to use color patches produced using other inks. Herein, "color patch" refers to an image area reproduced with substantially uniform color. When using color patches, it is preferable to print color patches using only a single kind of ink, so as to facilitate detection of white and black streaks. The method for printing test patterns will be described in greater detail hereinbelow.

In Step 26 in FIG. 20, the center color patch that has highest printing quality without white streak or black streak is selected and its patch number (which is 5) is stored in EPROM 58 (FIG. 21).

In step S28, a judgment is made as to whether or not steps S22 through S26 have been completed for all of the printing papers that are planned to be used in the printer 20. If the steps have not been completed, the processing returns to step S1.

Figure 23:
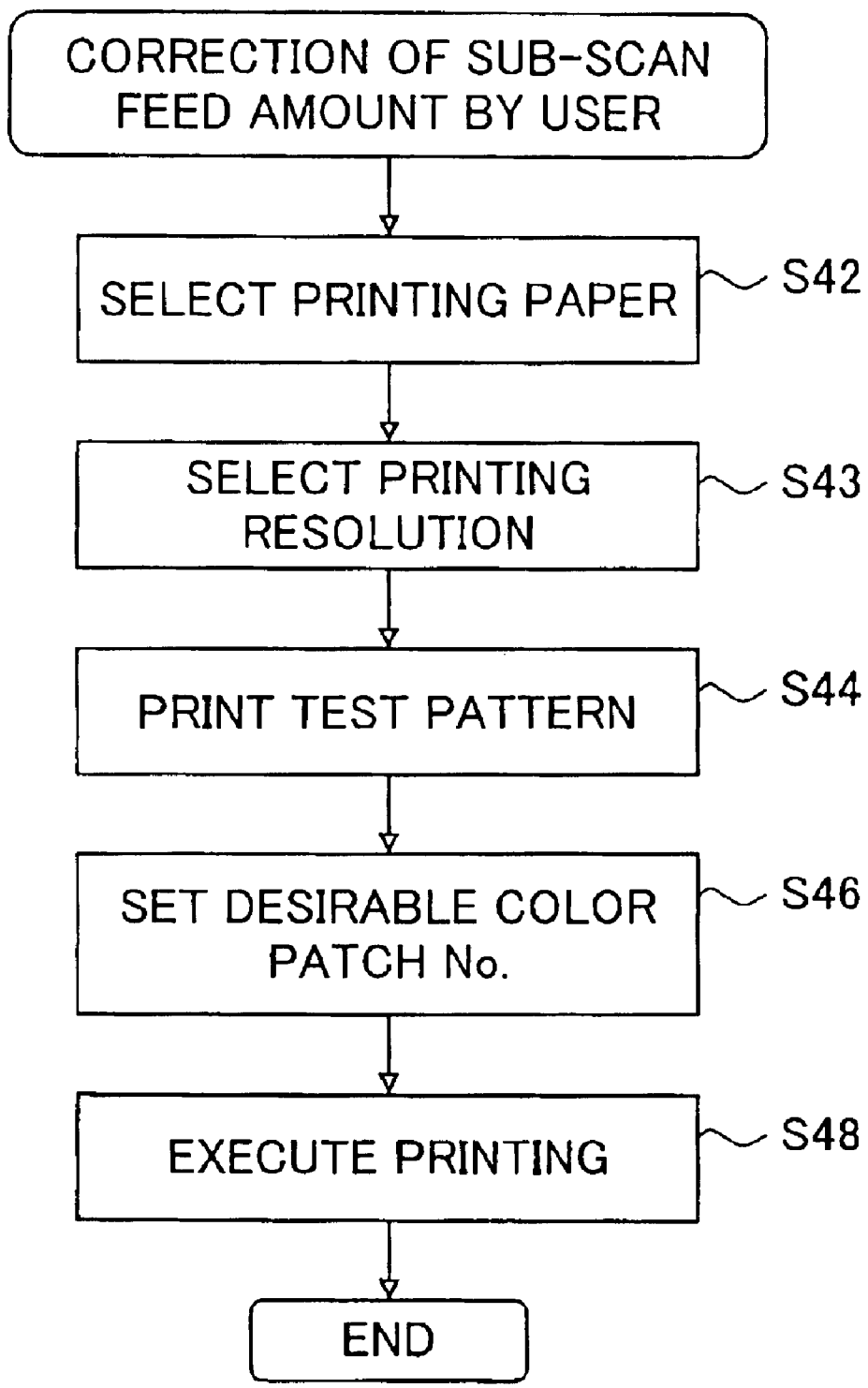
FIG. 23 is a flow chart showing the procedure of paper feed correction by the user.

FIG. 23 is a flow chart which shows the procedure in the second embodiment used for paper feed correction performed by a user. The flow chart in FIG. 23 is the same as that of FIG. 8 except the point including Step 43. In Step S43 printing resolution is selected by the user. The test patterns are different from that of paper feed correction in the first embodiment in the configuration of printed test patterns (FIGS. 21 and 22). Accordingly, the configuration of the user interface window (in Step S46) is different from the case of the first embodiment.

(h671)

Figure 24:
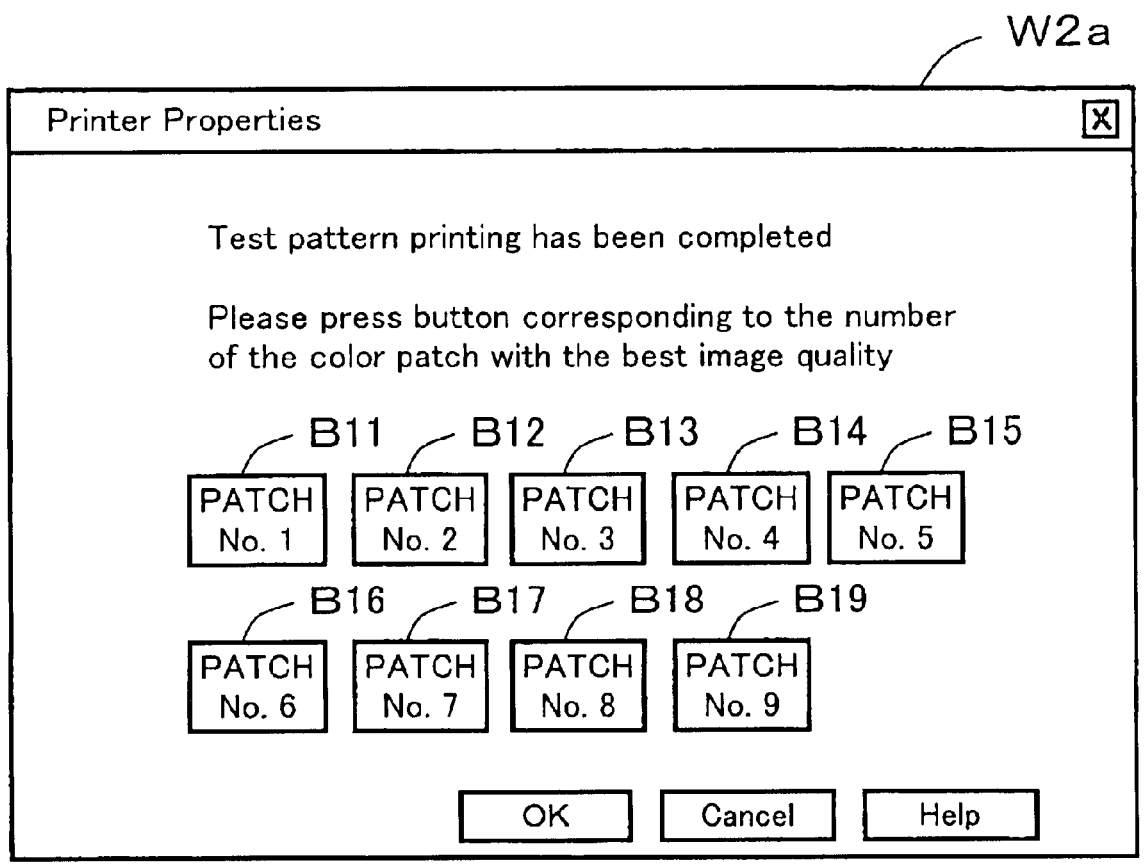
FIG. 24 is an illustrative diagram showing an exemplary user interface window W2 that allows the user to set patch number.

FIG. 24 is an explanatory diagram which shows an example of the user interface window W2a that allows the user to set the desired patch number. A plurality of buttons B11 through B19 that are used to select the desired patch number are disposed in this window W2a. When the user clicks on one of these buttons B11 through B19, the desired patch number is set in the EEPROM 58 (FIG. 3) of the printer 20.

In this example, the test pattern is printed with gray patches at ink duty of approximately 80% using black ink only, which has the advantage that black and white streaks resulting from paper feed error in printer 20 are readily apparent. Since all of the gray patches are arranged in order in the sub-scanning direction on a single sheet of printing paper P, it is unnecessary to use more than one sheet of printing paper P to print the test pattern.

Figure 25:
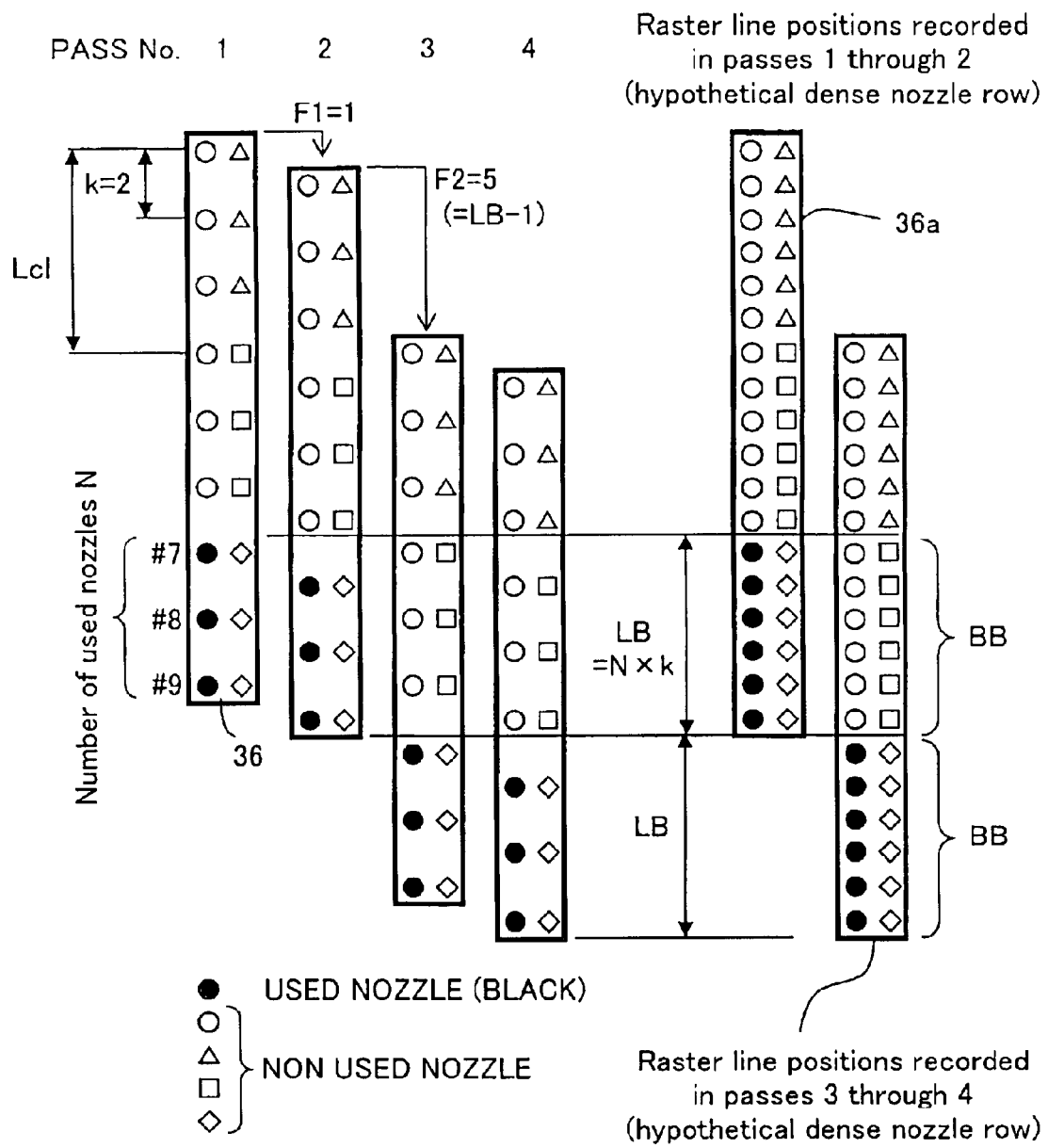
FIG. 25 is an illustrative diagram showing a first example of paper feed used during printing of a test pattern.

B. Detailed Description of Test Pattern Printing Method and Method for Determining Paper Feed Correction Value FIG. 25 shows an example of paper feed for use during printing of a test pattern in Step S24 of FIG. 20 and Step S44 of FIG. 23. This paper feed is for use in 360×360 dpi low-resolution printing mode. As described in FIG. 5, nozzle pitch k·D is 180 dpi, so where print resolution in the sub-scanning direction is 360 dpi, the integer k that stipulates nozzle pitch is 2.

FIG. 25 shows the position of the print head 36 in the sub-scanning direction during the four passes pass 1–pass 4. Here, "pass" refers to one main scan. For convenience in illustration in FIG. 25, print head 36 is depicted with a smaller number of nozzles, namely, nine black nozzles and three colored nozzles for each color. The solid black symbols denote nozzles that are used in printing the test pattern, and the white symbols denote nozzles that are not used. In this example, gray patches are reproduced using black ink only, so no colored nozzles are used, and of the nine black nozzles, only the three nozzles #7–#9 are used. The reason for using only some of the black nozzles #7–#9 is to reduce gray patch height (i.e. width in the sub-scanning direction) so that a large number of gray patches can be printed on a single sheet of printing paper P.

In the example of FIG. 25, nozzle pitch k is 2 dots, so a gap equivalent to one line is present between raster lines (main scan lines) recorded in a single pass. Paper feed amount F1 after pass 1 is 1 dot. Thus, in pass 2, the line in the gap that was not recorded in pass 1 is recorded. Positions of raster lines recorded in passes 1–2 are indicated at right in FIG. 25. From these it will be understood that in passes 1–2 six contiguous lines are recorded with black ink. Here, the six lines recorded with black ink in passes 1–2 are termed "black band BB". This black band BB is equivalent to the raster lines printed in a single pass using a hypothetical dense nozzle array 36a having six nozzles arrayed at dot pitch k of one dot. In other words, passes 1–2 are equivalent to a single pass using a dense nozzle array 36a such as that depicted at right in FIG. 25. The height LB (termed "band width") of this dense nozzle array 36a is defined as (number of nozzles used N)×(nozzle pitch k). In the example in FIG. 25, band width LB is set to equal the height Lc1 of the nozzle group for a single color.

Paper feed amount F2 after pass 2 is 5 dots; by means of this paper feed the topmost nozzle of the black nozzles used is now positioned at the uppermost edge of the area not recorded with black dots at completion of pass 1. This recording method will be understood to be substantially equivalent to a recording method in which the hypothetical dense nozzle array depicted at right in FIG. 25 is used at paper feed increments equal to band width LB during each single pass. Accordingly, feed like that depicted in FIG. 25 is termed "virtual band feed". Paper feed amount F2 after pass 2 is a value equal to band width LB minus the previous feed amount F1 (=1 dot). Thus, the total ΣFi of feed amounts F1–F2 during the two passes is equivalent to band width LB.

In passes 1–2, the top half of a single gray patch shown in FIG. 21 is printed, and in passes 3–4 the bottom half of the gray patch is printed. Accordingly, the height of each gray patch in the sub-scanning direction is approximately twice the band width LB. When printing each color patch, the value of feed amount F2 following the second pass is adjusted with reference to the paper feed correction value δ. That is, the color patches simulate different paper feed errors.

Figure 26:
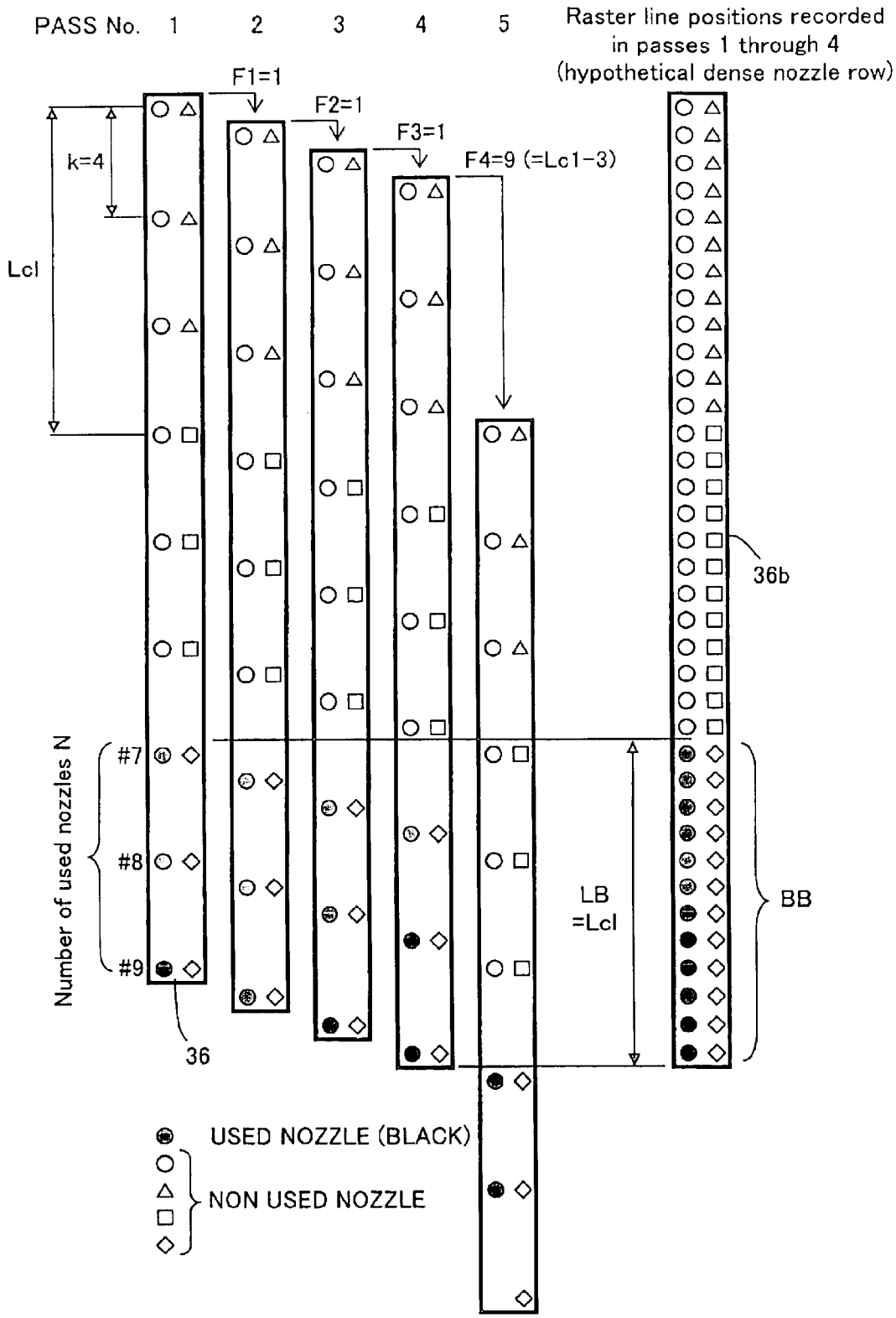
FIG. 26 is an illustrative diagram showing a second example of paper feed used during printing of a test pattern.

FIG. 26 shows an example of paper feed for 720×720 dpi high-resolution printing mode. Since the integer k that stipulates nozzle pitch is 4, raster lines can be recorded without gaps by means of four passes, passes 1–4. At right in FIG. 26 is shown a dense nozzle array 36b capable of recording in a single pass the raster lines recorded in passes 1–4. The height LB of this dense nozzle array 36b is equivalent to the height Lc1 of the nozzle group for a single color.

In the examples of FIG. 25 and FIG. 26, the number of nozzles used is shown as three for convenience in description, but in actual practice the nozzles used will number several dozen or more. FIGS. 27(A) and 27(B) show examples of actual paper feed amount in two printing modes. Actual paper feed amount is predetermined by printer driver 96. FIG. 27(A) is an example of paper feed used for a test pattern in low-resolution printing mode. In this mode, nozzle pitch is 2 dots and the number of nozzles used is 60. The first feed amount F1 is 1 dot, and the second feed amount F2 is 119. The total of the two feed amounts F1–F2 is equivalent to band with N×k (=120). FIG. 25 shows a simplified portrayal of paper feed.

FIG. 27(B) is an example of paper feed used for a test pattern in high-resolution printing mode. In this mode, the first three feed amounts F1–F3 are each 1 dot, and the fourth feed amount F4 is 117. The total of the four feed amounts F1–F4 is equivalent to band with N×k (=120). FIG. 26 shows a simplified portrayal of paper feed.

When a test pattern is printed using virtual band feed such as illustrated in FIG. 25 and FIG. 26, banding tends to occur at the borders of color bands due to paper feed error, which has the advantage that paper feed error will be easy to detect. For example, in the upper four test patterns in FIG. 21, dark banding (black streak) is apparent at the border of the upper half and lower half, and in the lower four test patterns light banding (white streak) is apparent. White streaks occur when paper feed is insufficient, and black streaks when paper feed is excessive. Detecting of banding may be done with the naked eye, or automatically by means of imaging the test pattern and performing image processing.

Using a print head 36 with a nozzle pitch of 2 or greater to print a test pattern (color patches) at virtual band feed in this manner offers the advantage of being able to easily detect paper feed error. In this example, ink duty is set to about 80%, making paper feed error even more easy to detect.

Figure 28:
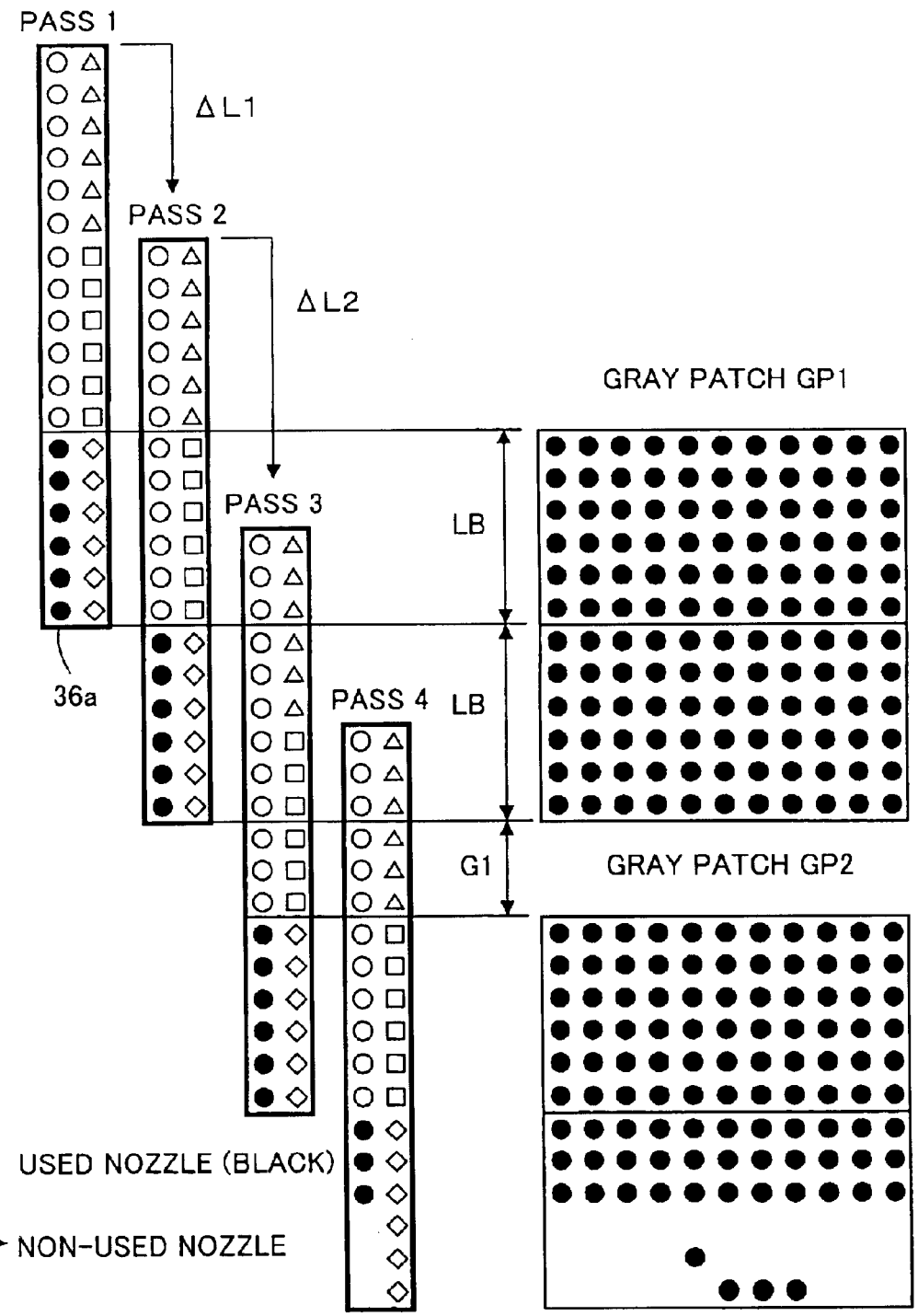
FIG. 28 is an illustrative diagram showing a method for printing a gray patch using black ink only.
Figure 29:
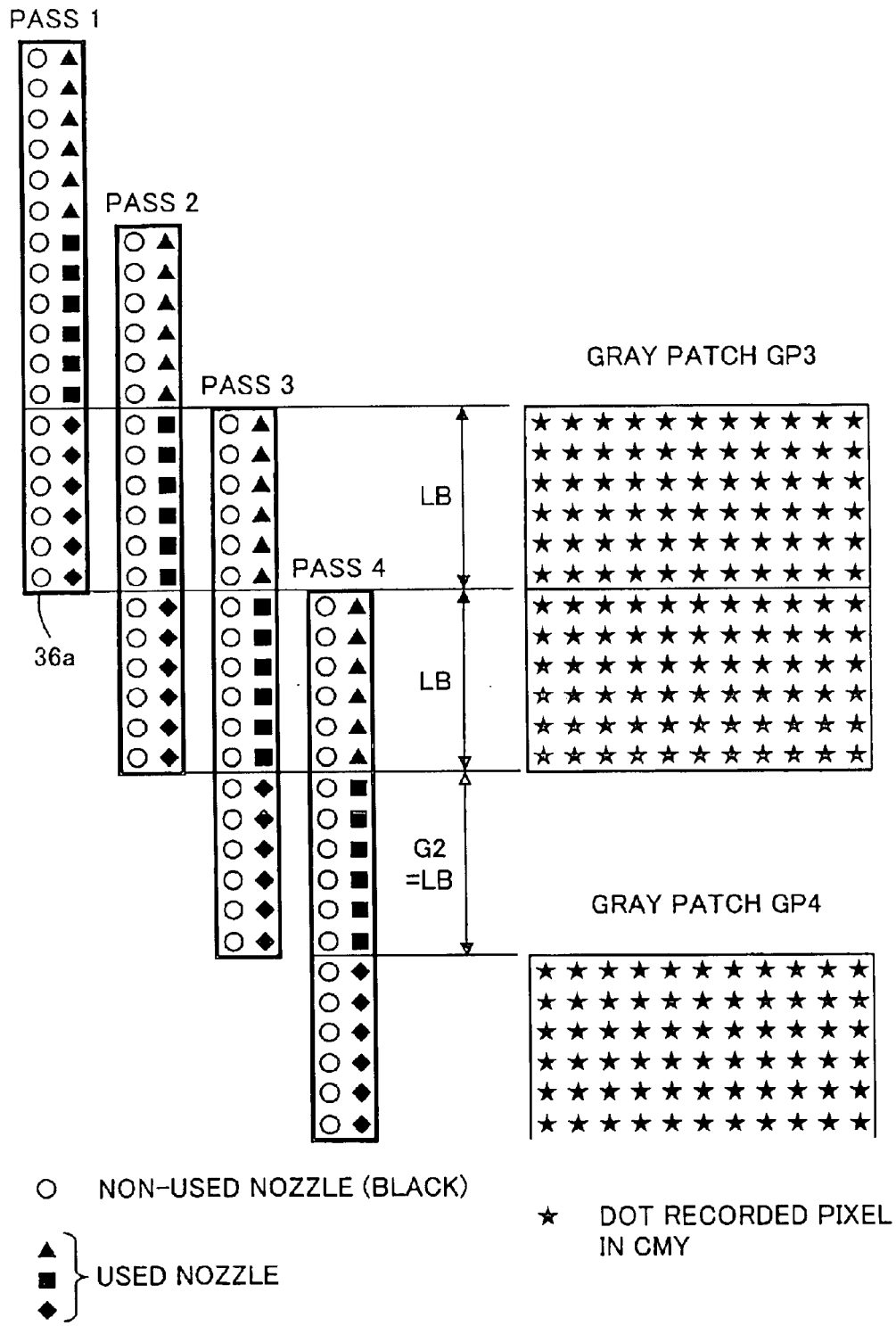
FIG. 29 is an illustrative diagram showing a method for printing a gray patch using composite black ink.

One reason for printing the test pattern using only one kind of ink (black ink) in this example is to minimize the size of the gap G (FIG. 21) between color patches so that a large number of color patches may be printed on a single sheet of printing paper P. FIG. 28 and FIG. 29 show a comparison of a method of printing gray patches using black ink only, and a method of printing gray patches using composite black. Here, "composite black" refers to the achromatic color reproduced using the three inks CMY.

FIG. 28 illustrates printing of two gray patches GP1, GP2 using the hypothetical dense nozzle array 36a depicted in FIG. 25. The top half of gray patch GP1 is printed in one pass using one dense nozzle array 36a, and the bottom half is printed in the subsequent pass. One pass of dense nozzle array 36a is equivalent to two passes (e.g. pass 1 and pass 2) of the print head 36 shown in FIG. 25.

The difference in position $\Delta L1$ of dense nozzle array 36a between pass 1 and pass 2 is set to equal the band width LB. Strictly speaking, this difference in position $\Delta L1$ is equal to band width LB plus the paper feed correction value $\delta$ for gray patch GP1. The second gray patch GP2 is printed similarly in pass 3 and pass 4 of dense nozzle array 36a.

The gap G1 between the two gray patches GP1, GP2 is equal to the difference in position $\Delta L2$ of dense nozzle array 36a between pass 3 and pass 4, minus band width LB. This difference in position $\Delta L2$ can be set arbitrarily, so gap G1 can be set arbitrarily as well.

Where gray patches are printed using composite ink as shown in FIG. 29, on the other hand, restrictions such as the following apply to the gap G2 between the two gray patches GP3, GP4. Where gray patches are printed using composite ink, ink dots of the three colors CMY are formed in the upper half of the gray patches by performing three passes of dense nozzle array 36a. In the example of FIG. 29, the upper half of gray patch GP3 is recorded by pass 1–pass 3, and the lower half thereof is recorded by pass 2–pass 4.

Subsequent printing of gray patch GP4 can be commenced from pass 4. The gap G2 at this time is equivalent to band width LB. Assuming that so-called "back feed" (reverse paper feed) is not performed, this gap G2=LB is the smallest gap between gray patches. If back feed is performed, feed error may occur as a result of backlash of the gear mechanism etc., so during normal printing back feed is not performed. Thus, where gray patches are printed with composite black, it is difficult to make the gap G2 between gray patches smaller than band width LB. Accordingly, it is preferable to use simple black rather than composite black, in terms of producing a smaller gap between gray patches.

When printing a test pattern, as described earlier in FIG. 21, it is desirable to conserve paper resources by arranging as many color patches as possible on a single sheet of printing paper P. To do so it is desirable to make the gap between test patches as small as possible. In this sense, it is preferable to print test patterns using only one kind of ink (for example, black ink only), rather than using multiple types of ink as with composite black. However where the print head is a transverse array head (a head in which nozzle groups of each color are arrayed in order along the main scanning direction) rather than a longitudinal array head like that depicted in FIG. 5, there are no restrictions as regards the gap such as those described in FIG. 29. Thus, in this case the test pattern may be printed with multiple types of ink.

In the first embodiment, a distance corresponding to one-fourth cycle of the A phase and B phase signal of encoder 46 (1440 dpi) is used as the "pulse" unit of correction value $\delta$ (FIG. 13(B)). In the second embodiment, a distance corresponding to one cycle of the A phase and B phase signal of encoder 46 (1440 dpi) is used as the "pulse" unit of correction value $\delta$. But, a distance corresponding to one-fourth of a cycle of the A phase and B phase signal of encoder 46 (1440 dpi) can be used as the "pulse" unit of correction value $\delta$. Alternatively, one-half of a cycle of the encoder output signal can be used as the correction value $\delta$ unit. Where the paper feed motor 31 is a step motor, one step pulse can be used as the correction value $\delta$ unit.

In the above manner, in this example, paper feed amount is corrected using correction values $\delta$ that are determined with reference to printed results of a test pattern, making possible high quality printing with negligible paper feed error. In particular, as the test pattern consists of color patches printed at approximately 80% ink duty using only one kind of ink (black ink), banding due to paper feed error is easy to detect, and as a result, it is easy to determine a proper correction value for paper feed error.

C. Modification of the Second Embodiment

The present invention in not limited to the embodiments or examples described above, and various other variations may be implemented within the scope thereof. For example, the variations described below are possible.

C1. Modification 1

In the preceding examples, the printing that is performed in the interlace recording mode using the printing head having the nozzle pitch of 2 dots or more. But, this invention is applicable to the printing that is performed using the high density nozzle (that is the printing head whose nozzle pitch k is 1 dot)

C2. Modification 2

In the preceding examples, the color patches of the test pattern are gray patches reproduced with black ink only, but it would be possible to use different color patches. For example, single-color test patches reproduced with cyan ink or magenta ink could be used.

III. The Third Embodiment
A. Summary of the Third Embodiment

Figure 30:
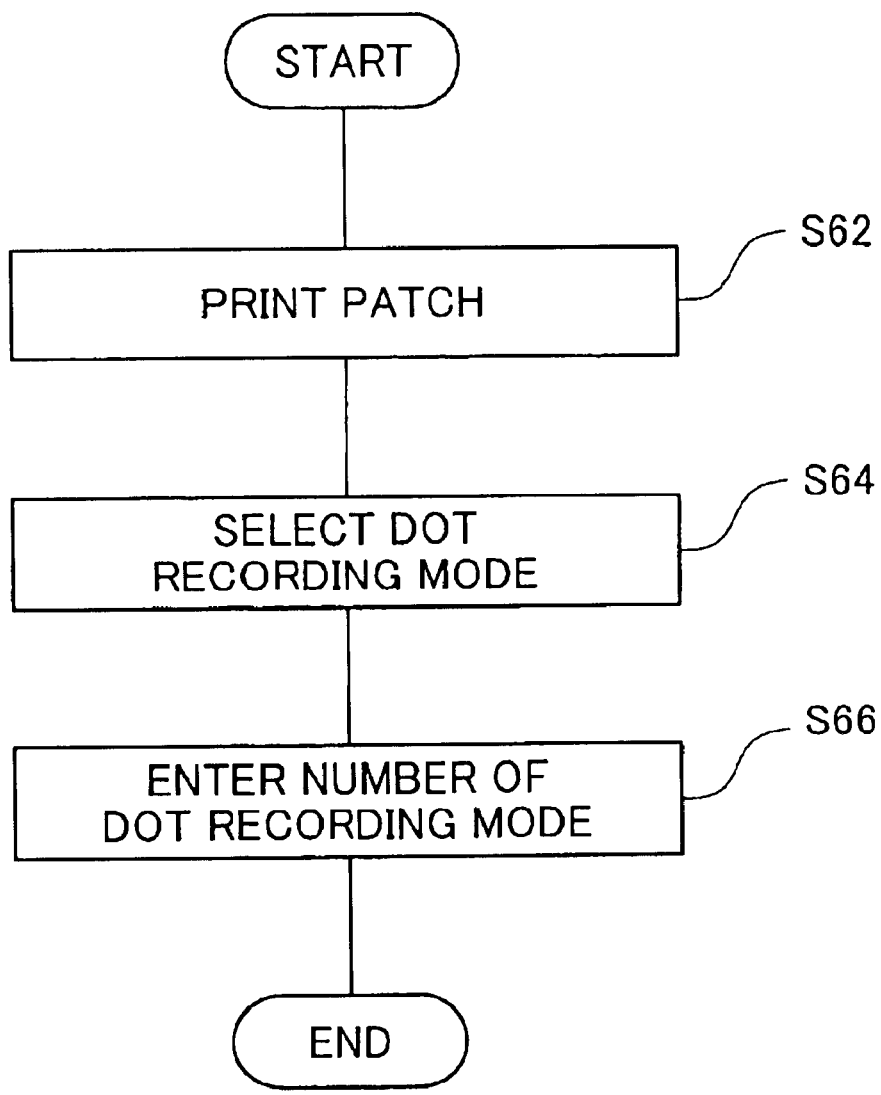
FIG. 30 is a flow chart illustrating a procedure for deciding dot recording mode.

FIG. 30 is a flow chart illustrating a procedure for deciding dot recording mode. In Step S62, the user first prints color patches onto printing paper using a number of different dot recording modes. In each dot recording mode, main scan is performed in the same manner, but using different feed amounts for the sub-scan performed at intervals between main scans. Here, feed amount in the dot recording mode having the smallest feed amount is equivalent to at least 90% of the feed amount in the dot recording mode having the greatest feed amount. Each color patch is printed using inks of three colors: light cyan, light magenta and yellow. Under ideal printing conditions, the color patch will appear to be a uniform gray.

In Step S64, the user selects from among the color patches printed in the different dot recording modes that color patch that appears to have the most uniform gray. In Step S66, the user then inputs to the computer the number appended to the selected color patch, by means of the user interface screen of the computer. The computer sends this number to the printer. When the printer receives a print command later, it performs image processing and printing in accordance with the dot recording mode corresponding to the number input in Step S66. By carrying out actual printing in each dot recording mode and then selecting dot recording mode, high quality printing is possible.

B. Example 1
B1. Arrangement of Device

Figure 31:
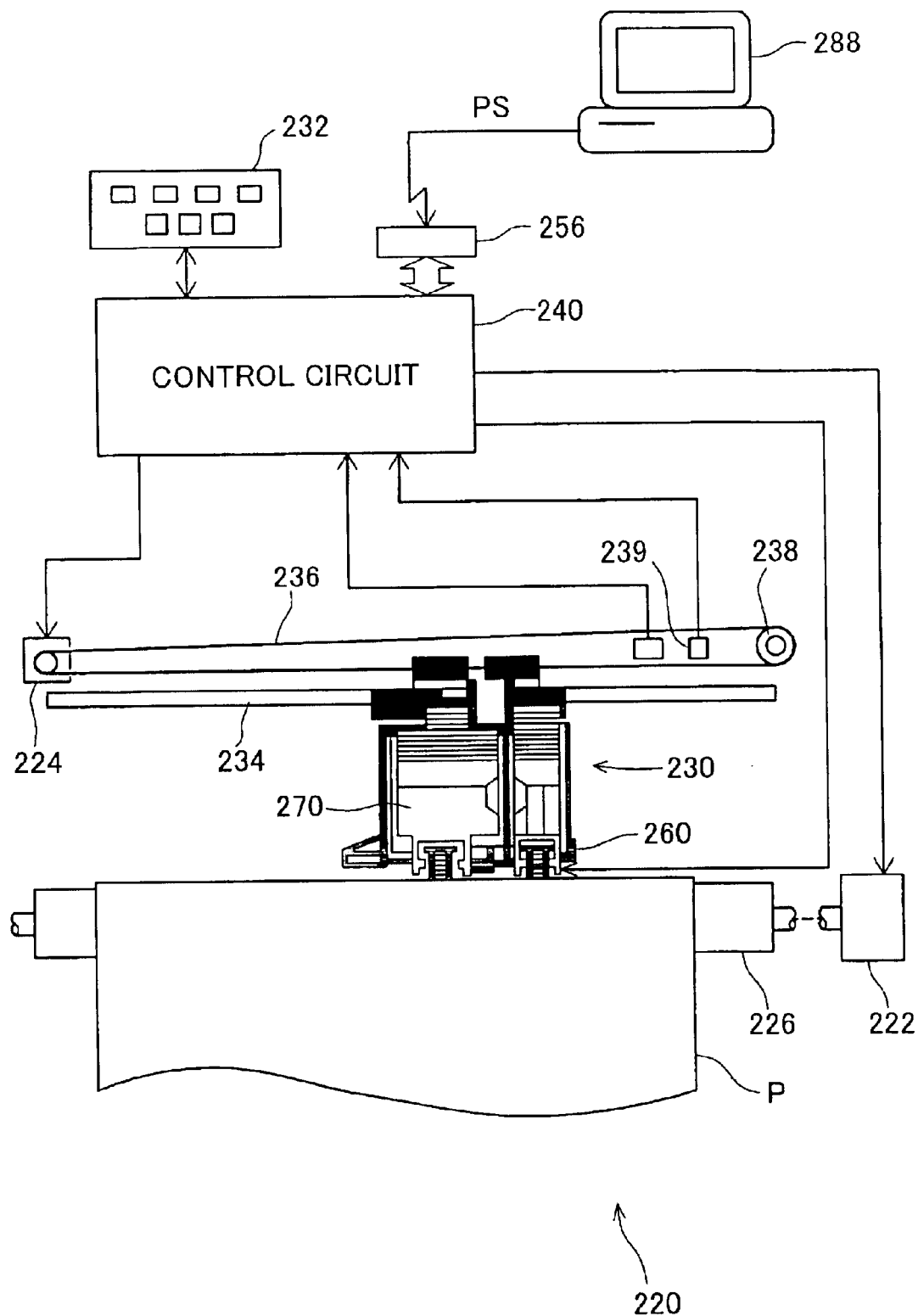
FIG. 31 is a schematic diagram showing a printing system comprising an ink jet printer 220 of an example.

FIG. 31 is a schematic diagram showing a printing system comprising an ink jet printer 220 as an example of the invention. Printer 220 comprises a sub-scan feed mechanism for conveying printing paper P in the sub-scanning direction by means of a paper feed motor 222, a main scan feed mechanism for reciprocating a carriage 230 in the axial direction of a platen 226 (the main scanning direction) by means of a carriage motor 224, a head driving mechanism for driving a print head unit 260 mounted on carriage 230, to control ejection of ink and formation of dots, and a control circuit 240 that controls exchanging of signals with the paper feed motor 222, carriage motor 224, print head unit 260, and a control panel 232. Control circuit 240 is connected to computer 288 via a connector 256.

The main scan feed mechanism that reciprocates carriage 230 comprises a sliding axis 234 for slidably holding carriage 230, a pulley 38 with an endless drive belt 236 extending between it and carriage motor 224, and a position sensor 239 for sensing the home position of carriage 230. The sub-scan feed mechanism for conveying printing paper P in the sub-scanning direction comprises a gear train (not shown) that transmits rotation of paper feed motor 222 to a paper conveying roller (not shown). By means of the paper conveying roller, printing paper P is conveyed in a direction perpendicular to sliding axis 234, i.e., in a direction intersecting the main scanning direction.

Figure 32:
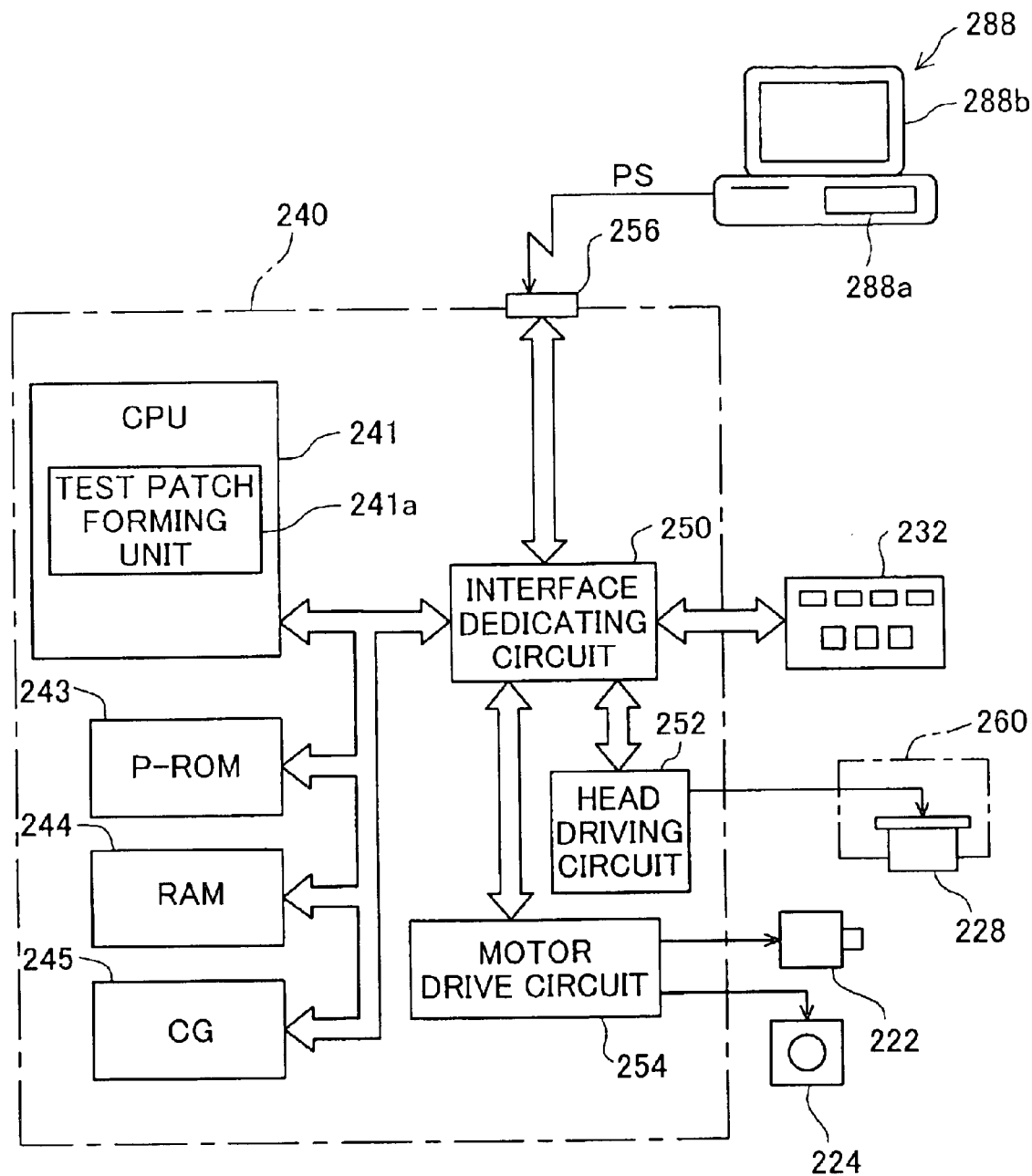
FIG. 32 is a block diagram showing the arrangement of control circuit 240 in printer 220.

FIG. 32 is a block diagram showing the arrangement of printer 220, focusing on control circuit 240. Control circuit 240 is configured as an arithmetic and logic circuit comprising a CPU 241, programmable ROM (P-ROM) 43, RAM 244, and a character generator (CG) 245 that stores a character dot matrix. This control circuit 240 further comprises an interface dedicating circuit 250 for dedicated interface with external motors etc., a head driving circuit 252 connected to this interface dedicating circuit 250, for driving a print head unit 260 to eject ink, and a motor drive circuit 254 for driving paper feed motor 222 and carriage motor 224. Interface dedicating circuit 250 incorporates a parallel interface circuit and can receive print signals PS supplied from computer 288 via connector 256. CPU 241, by executing a computer program stored in P-ROM 243, functions as a color patch forming unit 241a, described later.

Figure 33:
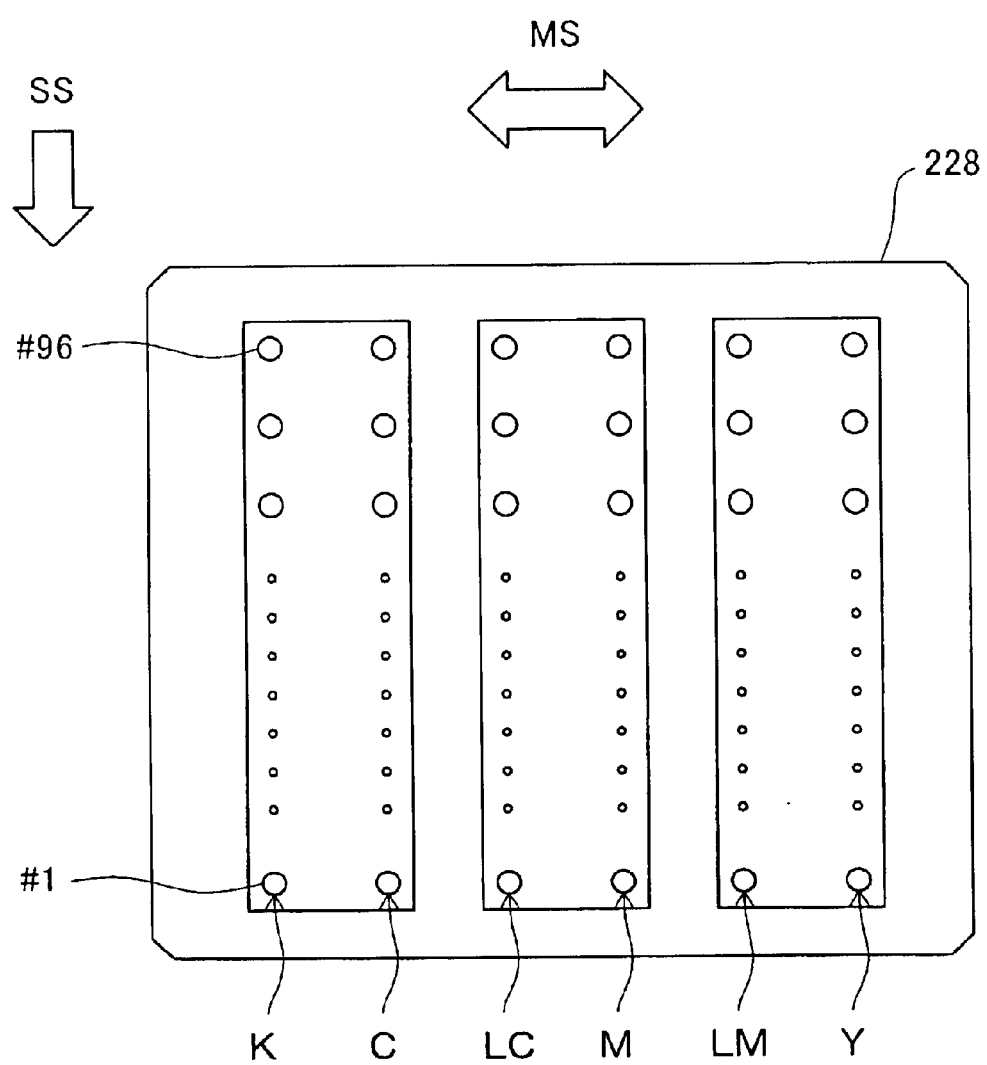
FIG. 33 is an illustrative diagram showing a plurality of nozzle rows provided to print head 228.

FIG. 33 is an illustrative diagram showing a plurality of nozzle rows provided to print head 228. This printer 220 is quipped with nozzle rows for ejecting black (K), dark cyan (C), light cyan (LC), dark magenta (M), light magenta (LC) and yellow inks respectively. Each nozzle row is equipped with 96 nozzles. Dark cyan and light cyan are cyan inks having substantially the same hue but different densities. Dark magenta and light magenta are analogous. During main scan, print head 228 is conveyed in the direction indicated by arrows MS in FIG. 33, and during sub-scanning, printing paper P is conveyed in the direction indicated by arrow SS in FIG. 33.

Figure 34:
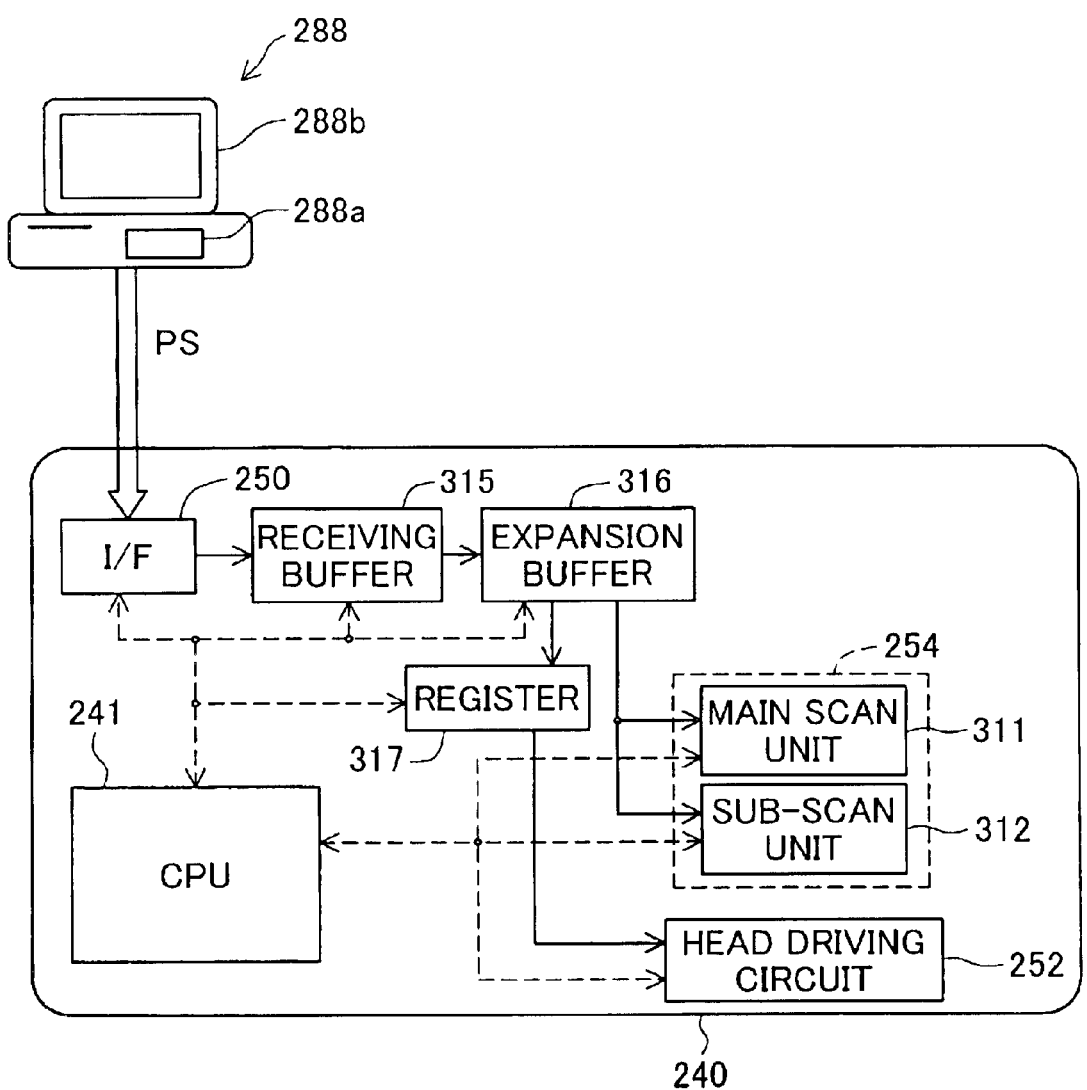
FIG. 34 is a block diagram showing functional units inside control circuit 240.

FIG. 34 is a block diagram showing functional units inside control circuit 240. Control circuit 240 is provided with a receiving buffer 315, expansion buffer 316 and register 317. These functional units are specifically realized by means of RAM 244, P-ROM 243, etc. controlled by CPU 241 in control circuit 240 (see FIG. 32). FIG. 34 shows main scan unit 311 and sub-scan unit 312 as the functional units of interface dedicating circuit 250, head driving circuit 252, and motor drive circuit 254.

In control circuit 240, interface dedicating circuit 250 receives a print signal PS sent from printer driver 288a, and temporarily places this in receiving buffer 315. From the data held in receiving buffer 315, data sufficient for a single pass is sent sequentially to expansion buffer 316. Each single main scan is termed a "pass". For example, where each main scan line is recorded over eight main scans, the data sent to expansion buffer 316 will contain data for one of eight pixels contained in a main scan line. Data that contains dot formation information for each main scan line is sent to expansion buffer 316. The sent data is the data for main scan lines recorded dots in one main scan, that is, for all nozzles used in one main scan, From dot formation information in expansion buffer 316 that is sufficient for nozzles in a single pass, i.e. for one main scan line, dot formation information for single-pixels respectively corresponding each nozzle is acquired in the order in which the dots will be formed by the nozzles, and sent to register 317. In register 317 the selected data is converted to serial data and sent to head driving circuit 252. Head driving circuit 252 then drives the head in accordance with the serial data to print the image. Meanwhile, from the dot formation information sufficient for a single pass held in expansion buffer 316, data indicating the manner of main scan feed and data indicating the manner of sub-scan feed is acquired and sent to main scan unit 311 and sub-scan unit 312. Main scan unit 311 and sub-scan unit 312 then perform main scan of the head and convey the printing paper in accordance with this data.

B2. Dot Recording Modes

FIG. 35 is an illustrative diagram showing how main scan lines are recorded on printing paper in a first dot recording mode. In FIG. 35, numbers assigned to main scan lines are shown at left. At the top of FIG. 35 are shown numbers assigned to passes in which each main scan line is recorded. The print head is indicated by the vertical rows of squares, and positions of the nozzles on the print head are indicated by nozzle numbers. In FIG. 35, only one column of the nozzle rows for each color is shown, in order to simplify the description.

As shown in FIG. 35, in first dot recording mode, sub-scan by a feed amount equivalent to 47 dots is performed once for each single main scan. "1 dot" is the interval between main scan lines in the sub-scanning direction. In actual practice printing paper P is conveyed relative to the print head so that the relative positions of the two change, but to simplify the description, the illustration in FIG. 35 makes it appear as if the print head moves in the direction of arrow SS' with respect to printing paper P. Arrow SS' indicates the opposite direction from the arrow SS in FIG. 33. Hereinbelow, both arrow SS and arrow SS' shall be used to indicate the sub-scanning direction in the drawings. In FIG. 35, in order to simplify the description, the print head is shown as shifting to the right each time that a single sub-scan is performed. When describing recording of main scan lines herein, the direction of the leading edge as printing paper P is fed by paper feed motor 222 shall be designated as the "top" and the direction of the trailing edge as the "bottom". These top and bottom designations correspond to top and bottom in FIG. 35.

As shown in FIG. 35, in first dot recording mode, as a general rule two nozzles pass over each main scan line. For example, nozzles #88 and #41 pass over line 70 in passes made in that order. Hereinbelow nozzle number shall be denoted by "#". Pixels included in a main scan line passed over by two nozzles are recorded by either of the two nozzles passing over those pixels.

In contrast, main scan lines such as line 51, line 55, line 98, line 102 etc. are passed over by three nozzles. Line 61 and line 98 are passed over by nozzles #95, #48 and #1, in passes made in that order. Line 55 and line 102 are then passed over by nozzles #96, #49 and #2, in passes made in that order. In first dot recording mode, nozzles #95 and #96 are not used. Therefore, in first dot recording mode, main scan lines over which nozzles #95, #48 and #1 pass are recorded by nozzles #48 and #1. Main scan lines over which nozzles #96, #49 and #2 pass are recorded by nozzles #49 and #2.

In first dot recording mode, recording of areas analogous to the area extending from line 51 to line 97 (shown enclosed in a thick box in FIG. 35) is repeated in the direction of arrow SS'. For example, line 98 is recorded analogously to line 51, and line 99 is recorded analogously to line 52. The size of the unit repeated in the sub-scanning direction is 47 lines, the same as the 47-dot feed amount.

Figure 36:
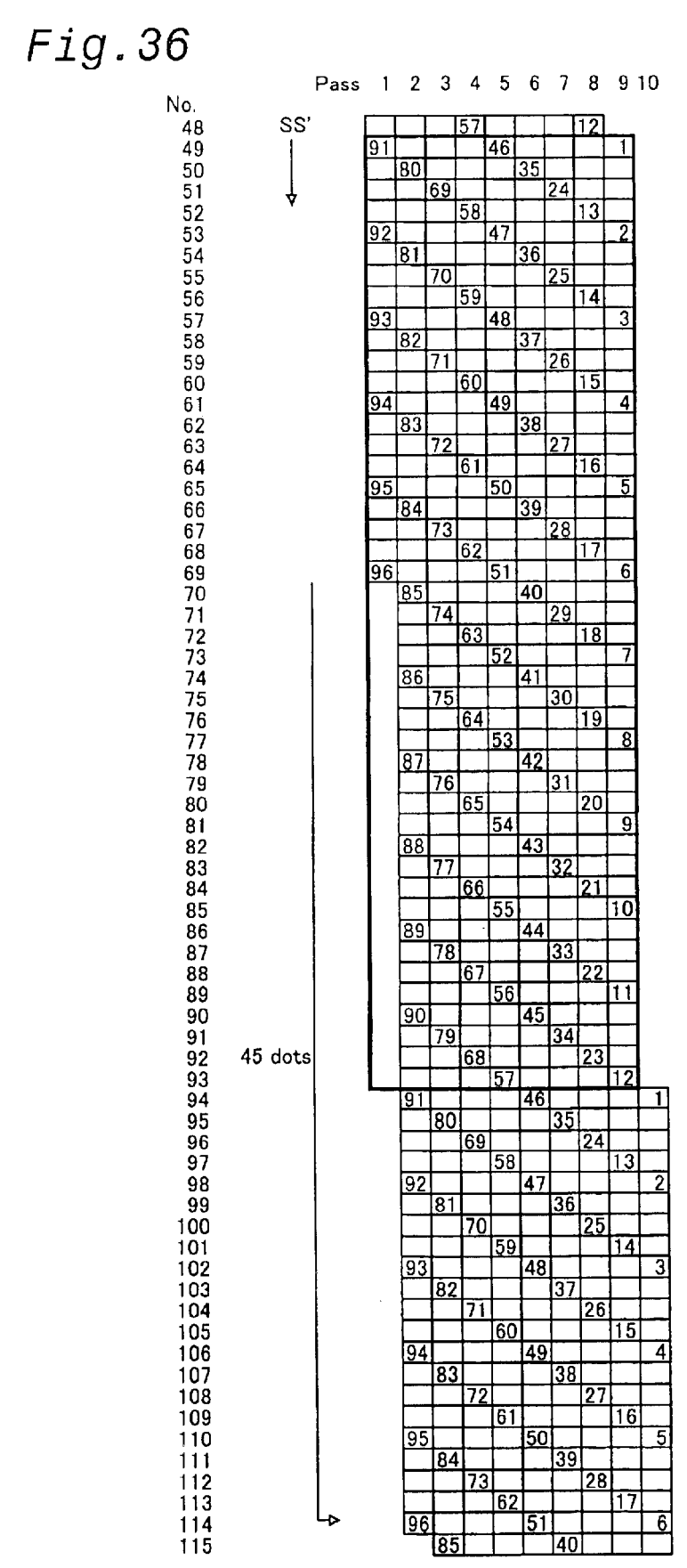

FIG. 36 is an illustrative diagram showing how main scan lines are recorded on printing paper in a second dot recording mode. As shown in FIG. 36, in second dot recording mode, sub-scan at a feed amount of 45 dots is performed once for each single main scan. In second dot recording mode, nozzles #91–#96 are not used.

As shown in FIG. 36, in second dot recording mode as well, as a general rule two nozzles pass over each main scan line. For example, nozzles #85 and #40 pass over line 70, in passes made in that order. Pixels included in a main scan line passed over by two nozzles are recorded by either of the two nozzles passing over the pixels in question.

In contrast, main scan lines such as line 49, line 53, line 57, line 61, line 65, line 69 etc. are passed over by three nozzles. However, the nozzles passing over these main scan lines include the nozzles #91–96 that are not used in second dot recording mode. Therefore, pixels contained in these main scan lines are recorded by either of two nozzles, these nozzles being other than nozzles #91–#96.

In second dot recording mode, recording of areas analogous to the area extending from line 49 to line 93 (shown enclosed in a thick box in FIG. 36) is repeated in the direction of arrow SS'. The size of the unit repeated in the sub-scanning direction is 45 lines, the same as the 45-dot feed amount.

Figure 37:
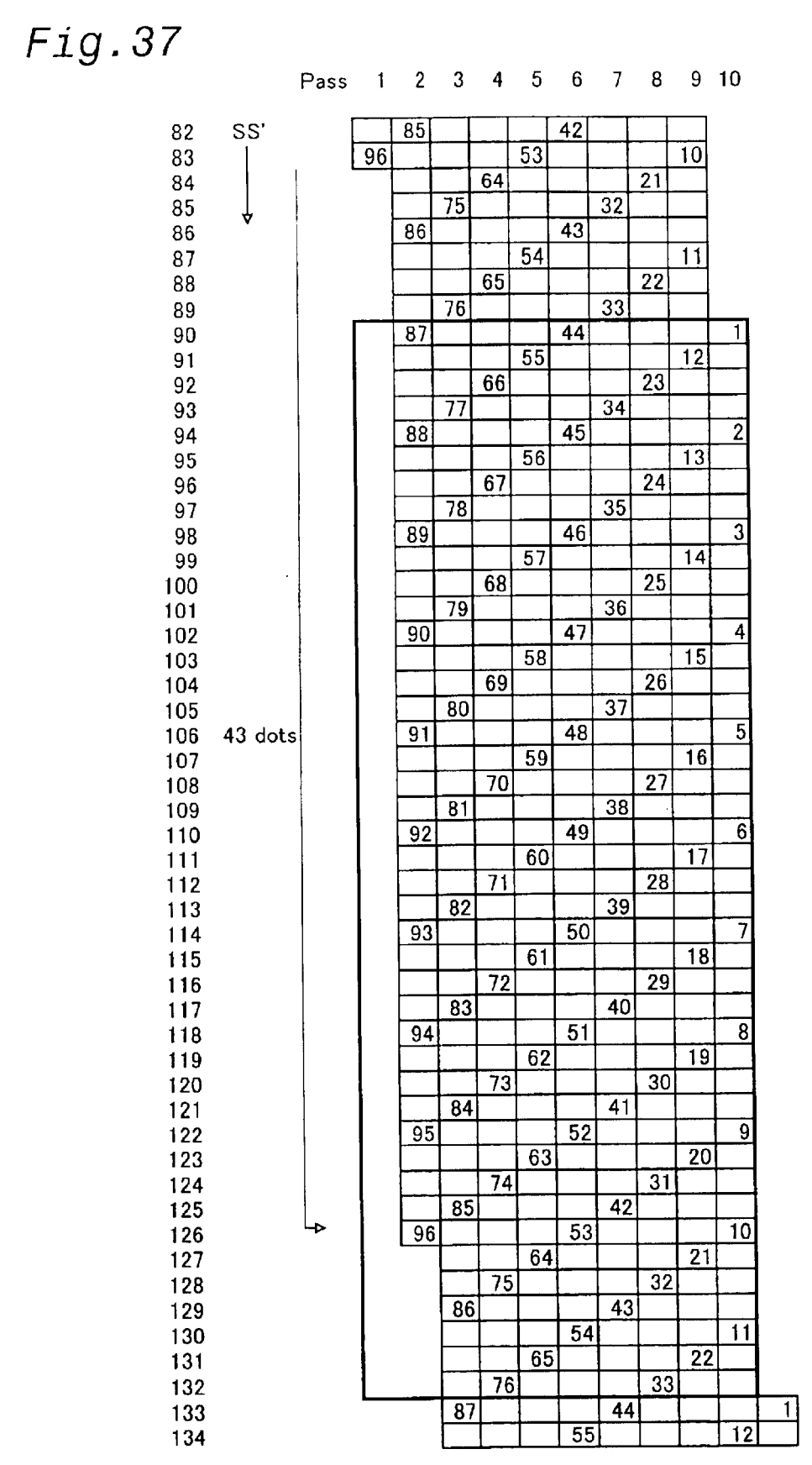

FIG. 37 is an illustrative diagram showing how main scan lines are recorded on printing paper in a third dot recording mode. As shown in FIG. 37, in third dot recording mode, sub-scan at a feed amount of 43 dots is performed once for each single main scan. In third dot recording mode, nozzles #87–#96 are not used.

As shown in FIG. 37, in third dot recording mode as well, as a general rule two nozzles pass over each main scan line. For example, nozzles #54 and #11 pass over line 130, in passes made in that order. Pixels included in a main scan line passed over by two nozzles are recorded by either of the two nozzles passing over the pixels in question.

In contrast, main scan lines such as line 90, line 94, line 98 etc. are passed over by three nozzles. However, the nozzles passing over these main scan lines include the nozzles #87–#96 that are not used in third dot recording mode. Therefore, pixels contained in these main scan lines are recorded by either of two nozzles, these nozzles being other than nozzles #87–#96.

In third dot recording mode, recording of areas analogous to the area extending from line 90 to line 132 (shown enclosed in a thick box in FIG. 37) is repeated in the direction of arrow SS'. The size of the unit repeated in the sub-scanning direction is 43 lines, the same as the 43-dot feed amount.

In the first to third dot recording modes, pixels on any main scan line are recorded by two nozzles. In first dot recording mode, printing is done at 47-dot feeds using nozzles #1–#94. In second dot recording mode, printing is done at 45-dot feeds using nozzles #1–#90. In third dot recording mode, printing is done at 43-dot feeds using nozzles #1–#86. Thus the feed amount in second dot recording mode is 45/47×100=95.7% with respect to the feed amount in first dot recording mode. That is, printing speed in second dot recording mode is 95.7% of printing speed in first dot recording mode. Feed amount in third dot recording mode is 43/47×100=91.5% with respect to the feed amount in first dot recording mode. That is, printing speed in third dot recording mode is 91.5% of printing speed in first dot recording mode.

In Example 1, one dot recording mode is selected from among a plurality of dot recording modes having substantially equal feed amounts as described above. Herein, "substantially equal feed amounts" refers to the fact that the feed amount of the dot recording mode with the smallest feed amount is equivalent to at least 80% of the feed amount of the dot recording mode with the greatest feed amount. In Example 1, since a single dot recording mode is selected from among a plurality of dot recording modes having substantially equal feed amounts, the effect is that a single dot recording mode is selected from among a plurality of candidate dot recording modes giving substantially equal printing speeds. Thus, printing speed does not become extremely slow regardless of the dot recording mode selected. This allows the user to select the dot recording mode giving the highest quality printed result, without concern for printing speed. In preferred practice, feed amount in the dot recording mode with the smallest feed amount is equivalent to at least 90% of the feed amount in the dot recording mode with the greatest feed amount.

FIGS. 38(A), 38(B) and 38(C) are charts showing which main scan lines are recorded in which pass in the first to third dot recording modes. FIG. 38(A) corresponds to the first dot recording mode shown in FIG. 35. FIG. 38(B) corresponds to the second dot recording mode shown in FIG. 36, and FIG. 38(C) corresponds to the third dot recording mode shown in FIG. 37. All indicate passes in which main scan lines in the portions shown enclosed by thick boxes in FIGS. 35–37 are recorded. In FIGS. 38(B) and 38(C), main scan lines have been added for purposes of comparison with FIG. 38(A), giving a total of 47 lines. In FIGS. 38(B) and 38(C), borders between main scan lines in portions shown enclosed by thick boxes in FIGS. 36 and 37 on the one hand and these additional scan lines on the other are indicated by thick horizontal lines. Line numbers appearing at the left in FIGS. 38(A), 38(B) and 38(C) differ from the line numbers shown in FIGS. 35–37. Line numbers appearing at the left in FIGS. 38(A), 38(B) and 38(C) are numbered designating the uppermost line of the areas by the thick boxes in FIGS. 35–37 as line 1.

In each of the first to third dot recording modes, each main scan line is recorded in two passes, so in FIGS. 38(A)–(C), pass numbers are shown in two columns for each main scan line. From FIG. 38(A) it will be apparent that in first dot recording mode, a relationship similar to the relative front-to-back relationship of the pass recording lines 1–4, shown enclosed by a thick box, repeats in the direction indicated by arrow SS'. Similarly, from FIG. 38(B) it will be apparent that in second dot recording mode, a relationship similar to the relative front-to-back relationship of the pass recording lines 2–5, shown enclosed by a thick box, repeats in the direction indicated by arrow SS'. From FIG. 38(C) it will be apparent that in third dot recording mode, a relationship similar to the relative front-to-back relationship of the pass recording lines 1–4, shown enclosed by a thick box, repeats in the direction indicated by arrow SS'.

As will be apparent from comparison of areas shown enclosed in thick boxes in FIGS. 38(A)–(C), the first to third dot recording modes have mutually different front-to-back relationships of passes recording main scan lines that are consecutive in the sub-scanning direction. For example, as shown in FIG. 38(A), in first dot recording mode lines 4–1 are recorded going from bottom to top in passes 2–5, and then lines 4–1 are recorded going from bottom to top in passes 6–9. In second dot recording mode, on the other hand, as shown in FIG. 38(B), lines 2–5 are recorded going from top to bottom in passes 2–5, and then lines 2–5 are recorded going from top to bottom in passes 6–9.

FIGS. 39(A), 39(B) and 39(C) are illustrative diagrams showing printed result quality obtained in the first to third dot recording modes. The printed results shown in FIGS. 39(A)–(C) are printed results obtained in the first to third dot recording modes, respectively. These correspond to printed results in the dot recording modes shown in FIGS. 38(A)–(C). In the figures at left in FIGS. 39(A)–(C) numbers assigned to nozzles that record pixels are shown in squares corresponding to the pixels in question. As will be apparent from FIGS. 39(A)–(C), in first to third dot recording modes, mutually different combinations of nozzles are used to record main scan lines that are sequential in the sub-scanning direction. As a result, in first to third dot recording modes, mutually different combinations of nozzles record a plurality of pixels that are sequential in the sub-scanning direction.

Typically, in a row of nozzles arranged in the sub-scanning direction (see FIG. 33), there is greater error in dot formation placement and greater error in ejected ink amount the closer the nozzle is to an end. For example, let it be assumed that, of nozzles #1–96 located in a nozzle row, nozzles #1–#20, which are located close to an end, have a greater tendency to form dots at locations that are higher within pixels than do the majority of nozzles located in proximity to center of the nozzle row, while nozzles #77–#96 have a greater tendency to form dots at locations that are lower within pixels than do the majority of nozzles located in proximity to center of the nozzle row. In the figures at right in FIGS. 39(A)–(C), upward-pointing arrows are shown in pixels recorded by nozzles #1–#20, and downward-pointing arrows are shown in pixels recorded by nozzles #77–#96.

In the figures at right in FIGS. 39(A)–(C), where arrows of upper and lower lines face each other, there exists the possibility that dots formed in these lines may overlap to a greater extent in the sub-scanning direction SS'. The printed results in these areas may be noticeably darker in color than normal. Such areas are indicated by arrows AD. Areas indicated by arrows AD may be noticeable as dark streaks of color extending in the main scanning direction.

Where, on the other hand, arrows of upper and lower lines face away from each other, there exists the possibility that dots formed in these lines may be farther away from each other in the sub-scanning direction SS'. The printed results in these areas may be noticeably lighter in color than normal. Such areas are indicated by arrows AL. Areas indicated by arrows AL may be noticeable as light streaks of color extending in the main scanning direction, or as streaks that are the same color as the printing paper.

From the drawing at right in FIG. 39(A) it will be apparent that in first dot recording mode, in lines 20–33, areas of darker printed color (arrows AD) and lighter areas (arrows AL) repeat in alternating fashion. In contrast, in the second dot recording mode shown in FIG. 39(B), areas of lighter printed color (arrows AL) repeat at substantially identical intervals, and in the third dot recording mode shown in FIG. 39(C), areas of darker printed color (arrows AD) repeat at substantially identical intervals. In this way the quality of printed results can vary among the first to third dot recording modes. Which dot recording mode will give the highest print quality will be determined by various factors such as printer production errors, printing paper quality, ambient temperature and humidity, quality of the ink solvent, etc.

B3. Dot Recording Mode Selection

Figure 40:
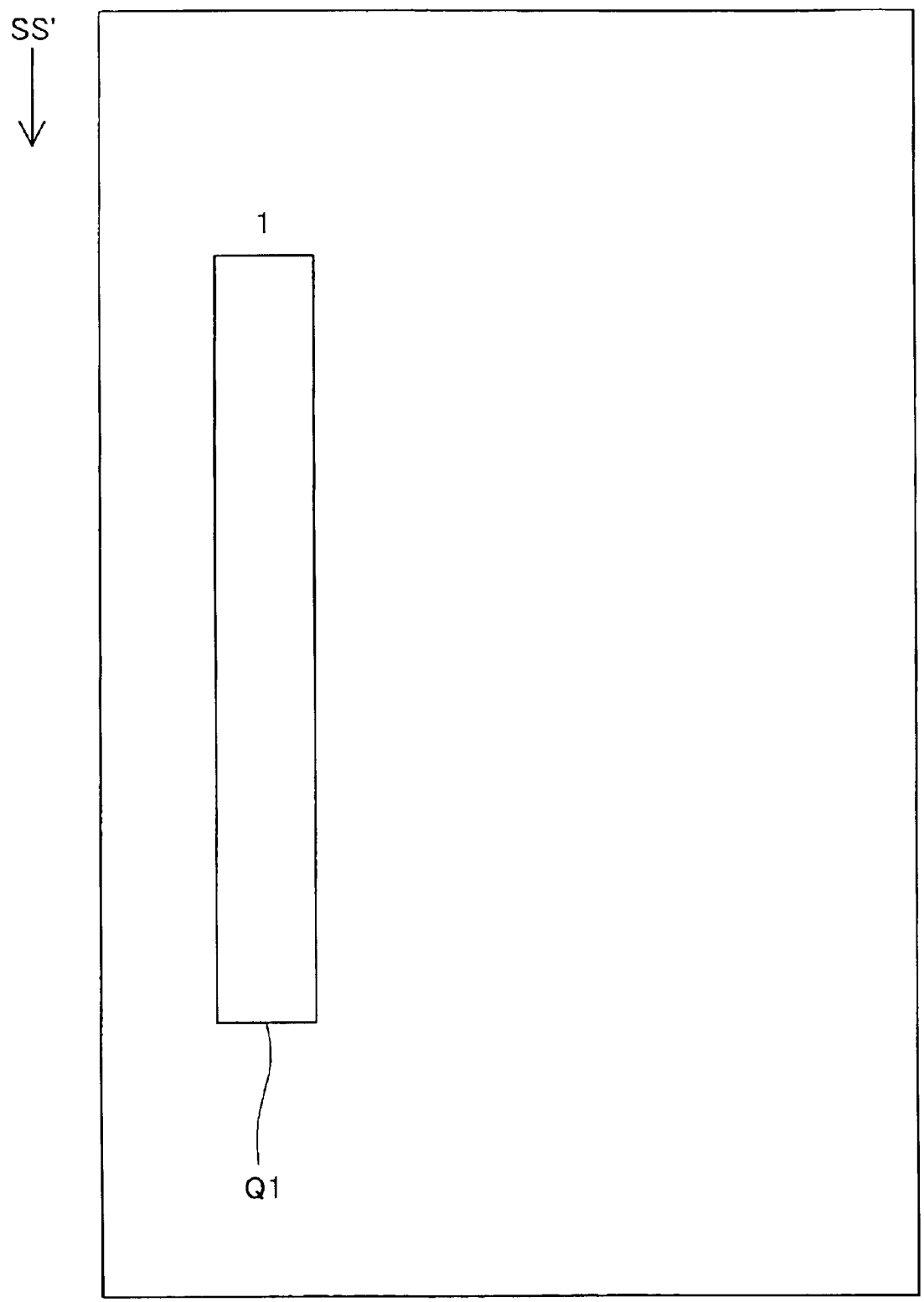
FIG. 40 is an illustrative diagram showing a test patch corresponding to first dot recording mode.

FIG. 40 is an illustrative diagram showing a color patch corresponding to first dot recording mode. When selecting dot recording mode, the user, in Step S62 shown in FIG. 30, first prints color patches Q1–Q3 onto printing paper using a number of different dot recording modes. Specifically, the user sends a color patch print command to the printer driver via a user interface screen on computer 288. Printer 220 then prints the color patches. The user interface screen is displayed on a display 288b by means of a printer driver 288a run in computer 288. Color patch printing is executed by the color patch forming unit 241a (see FIG. 32) of CPU 241.

Color patches are printed using inks of three colors: light cyan, light magenta and yellow. Under ideal printing conditions, the color patch will appear to be a uniform gray. Image data for each color patch can be provided together with the printer driver on a flexible disk, CD-ROM etc. Image data for each color patch can be stored via computer 288 on P-ROM 243 (see FIG. 32) of printer 220.

The dot recording modes in which color patches are formed on printing paper by printer 220 are the first to third dot recording modes shown in FIG. 35 to FIG. 37. In first dot recording mode, printer 220 first prints a color patch elongated in the sub-scanning direction, as shown in FIG. 40, onto the printing paper. At the top of the color patch is printed a number indicating the dot recording mode. Since the color patch is elongated in the sub-scanning direction SS', effects on image quality produced by sub-scan will be readily apparent (see FIG. 38, FIGS. 39(A), 39(B) and 39(C)). The user then again feeds the printing paper printed with color patch Q1 into the printer 220.

Figure 41:
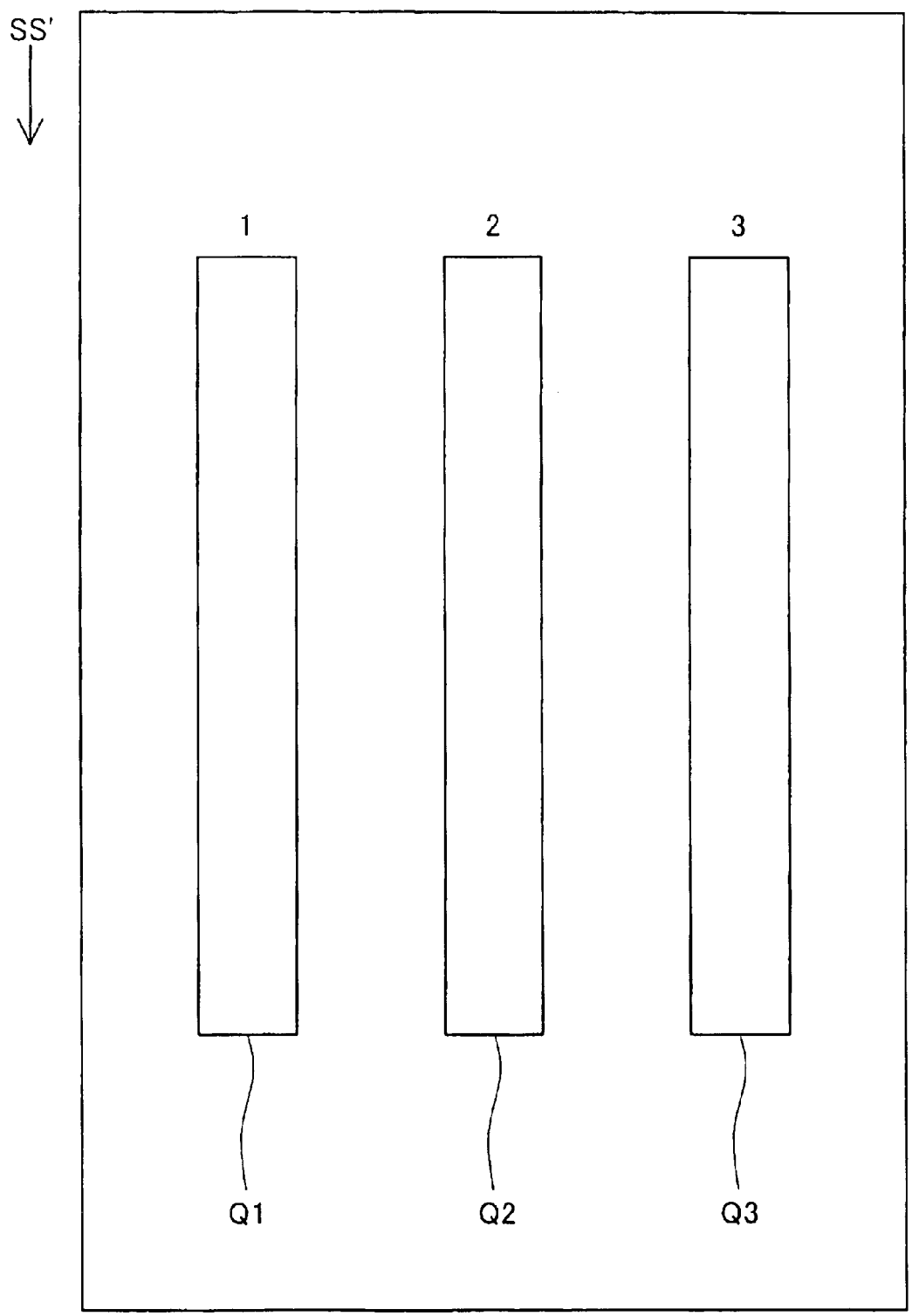
FIG. 41 is an illustrative diagram showing test patches corresponding to the first to third dot recording modes.

FIG. 41 is an illustrative diagram showing color patches corresponding to the first to third dot recording modes. When the printing paper printed with color patch Q1 is fed to the printer 220, it prints onto the printing paper a color patch Q2 in the second dot recording mode, located to the right of color patch Q1. The user then again feeds the printing paper printed with color patches Q1 and Q2 into the printer 220, whereupon the printer 220 prints onto the printing paper a color patch Q3 in the third dot recording mode, located to the right of color patches Q1 and Q2. In this way, color patches Q1, Q2 and Q3 are printed onto the printing paper in the manner illustrated in FIG. 41.

Figure 42:
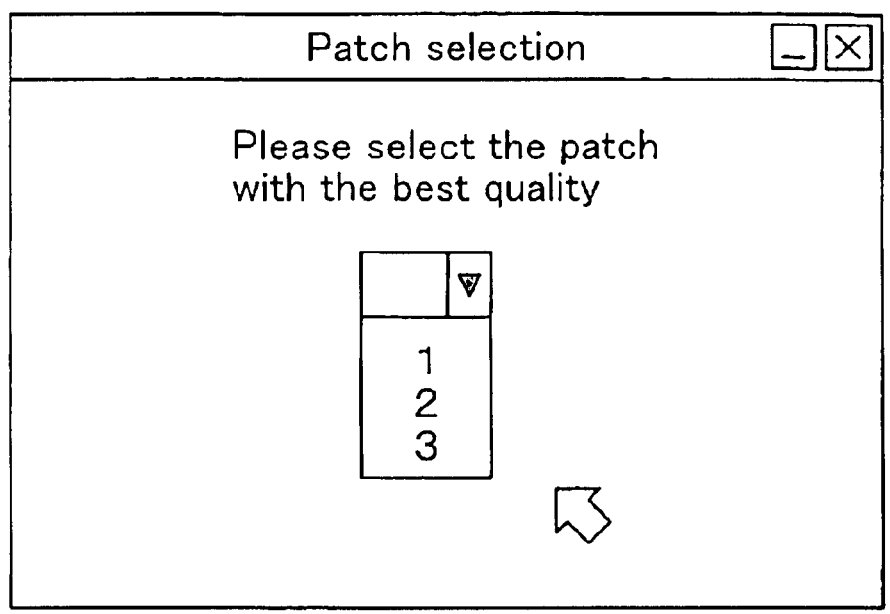
FIG. 42 is an illustrative diagram showing a user interface screen for entering the selected number into the computer.

FIG. 42 is an illustrative diagram showing a user interface screen for entering the selected number into the computer. In Step S64 (see FIG. 30), the user selects from among the color patches printed in the different dot recording modes a color patch that appears to have the most uniform gray. In Step S66, as shown in FIG. 41, the user then enters into the computer the number appended to the selected color patch, by means of the user interface of the computer. The computer sends the entered number to the printer, whereupon the printer stores the number in P-ROM 243 (see FIG. 32). By storing the number in P-ROM 243 the printer can designate the selected dot recording mode from among a plurality of dot recording modes on the basis of the color patch. The printer driver 288a in computer 288, by virtue of displaying the user interface screen on display 288b, functions as the "input unit" recited in the claims. That is, the "printing device" recited in the claims is a concept that includes both printer 220 and computer 288. The number entered by the user into computer 288 via the user interface screen corresponds to the "dot recording mode selection data" recited in the claims, and P-ROM 243 corresponds to the "dot recording mode memory unit" recited in the claims.

When the printer receives a print command later, it performs image processing in accordance with the dot recording mode associated with the number in P-ROM 243. Specifically, the printer, in accordance with the dot recording mode associated with the number in P-ROM 243, acquires data sufficient for a single pass from the receiving buffer 315, and sends it to the extension buffer 316 (see FIG. 34). From the data sufficient for a single pass held in expansion buffer 316, data indicating the manner of sub-scan feed of the dot recording mode associated with the number stored in P-ROM 443 is acquired and sent to the main scan unit 311 and sub-scan unit 312.

In this example, in a printer capable of executing a plurality of dot recording modes, color patches associated with the various dot recording modes are printed, and on the basis of the printed results the dot recording mode to be used for actual printing is selected. It is therefore possible to perform high quality printing.

C. Example 2

In Example 1, an example of selecting one dot recording mode from among dot recording modes in which sub-scan is performed at fixed feed amounts of 47 dots, 45 dots and 43 dots was described. Feeding wherein sub-scan is always performed at a constant feed amount during sub-scan performed at intervals between main scans, as in Example 1, is termed "constant feed". In contradistinction to this, feeding wherein sub-scan is performed while repeating sub-scans by a plurality of different feed amounts in cyclical fashion is termed "non-constant feed". The invention may also be implemented in dot recording modes involving non-constant feed.

Figure 43:
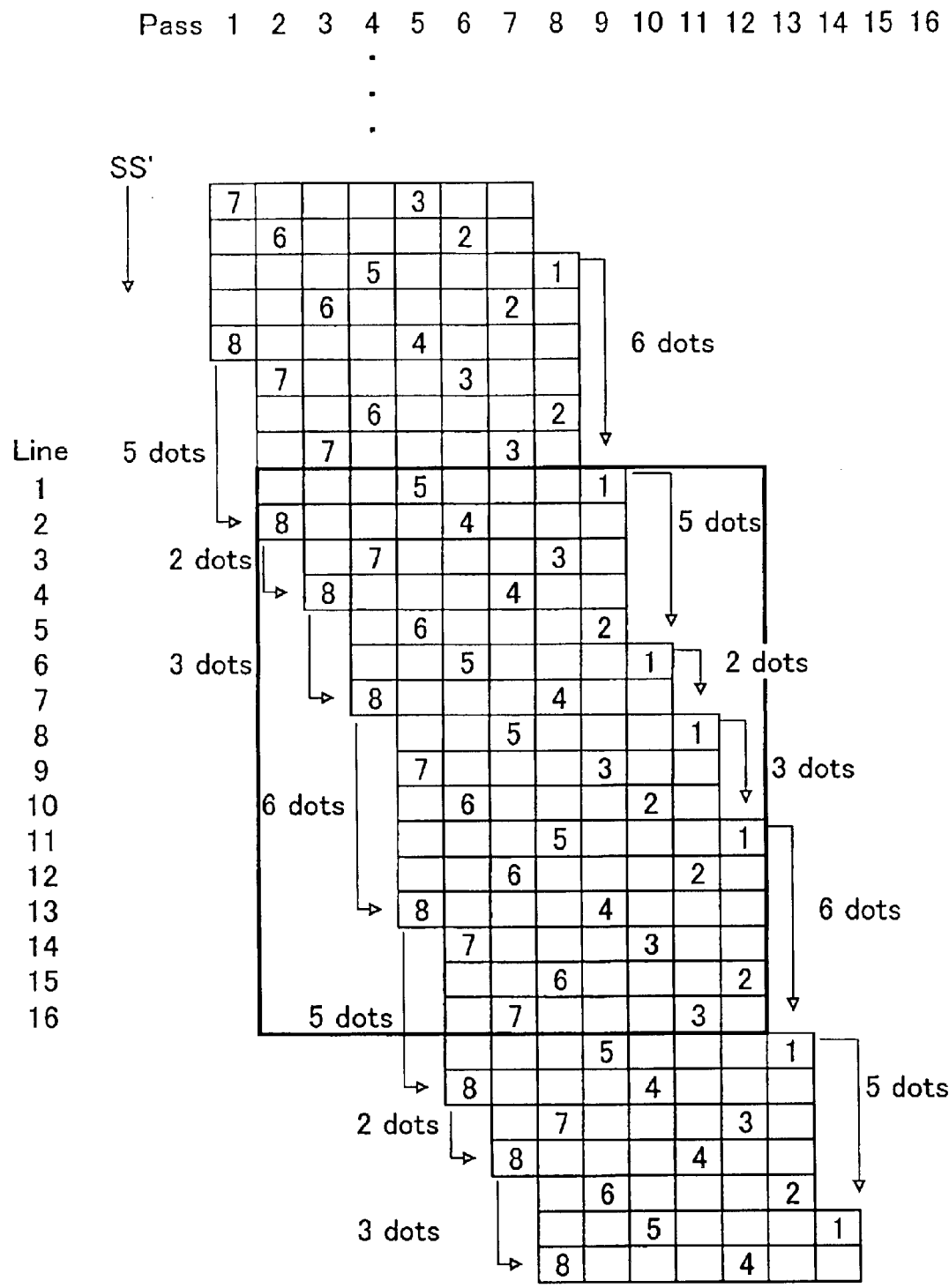
FIG. 43 is an illustrative diagram showing the manner in which main scan lines are recorded on printing paper in first dot recording mode in Example 2.

FIG. 43 is an illustrative diagram showing the manner in which main scan lines are recorded on printing paper in a first dot recording mode in Example 2 of the third embodiment. The printer of Example 2 of the third embodiment has eight nozzles for each color. In first dot recording mode, sub-scan by 5 dots, 2 dots, 3 dots and 6 dots is performed repeatedly at intervals between main scans. The 5-dot, 2-dot, 3-dot and 6-dot sub-scans correspond to the "unit sub-scan" recited in the claims. During printing in the first dot recording mode, recording of areas analogous to the area shown enclosed in a thick box in FIG. 43 are repeated in the direction of arrow SS'.

Figure 44:
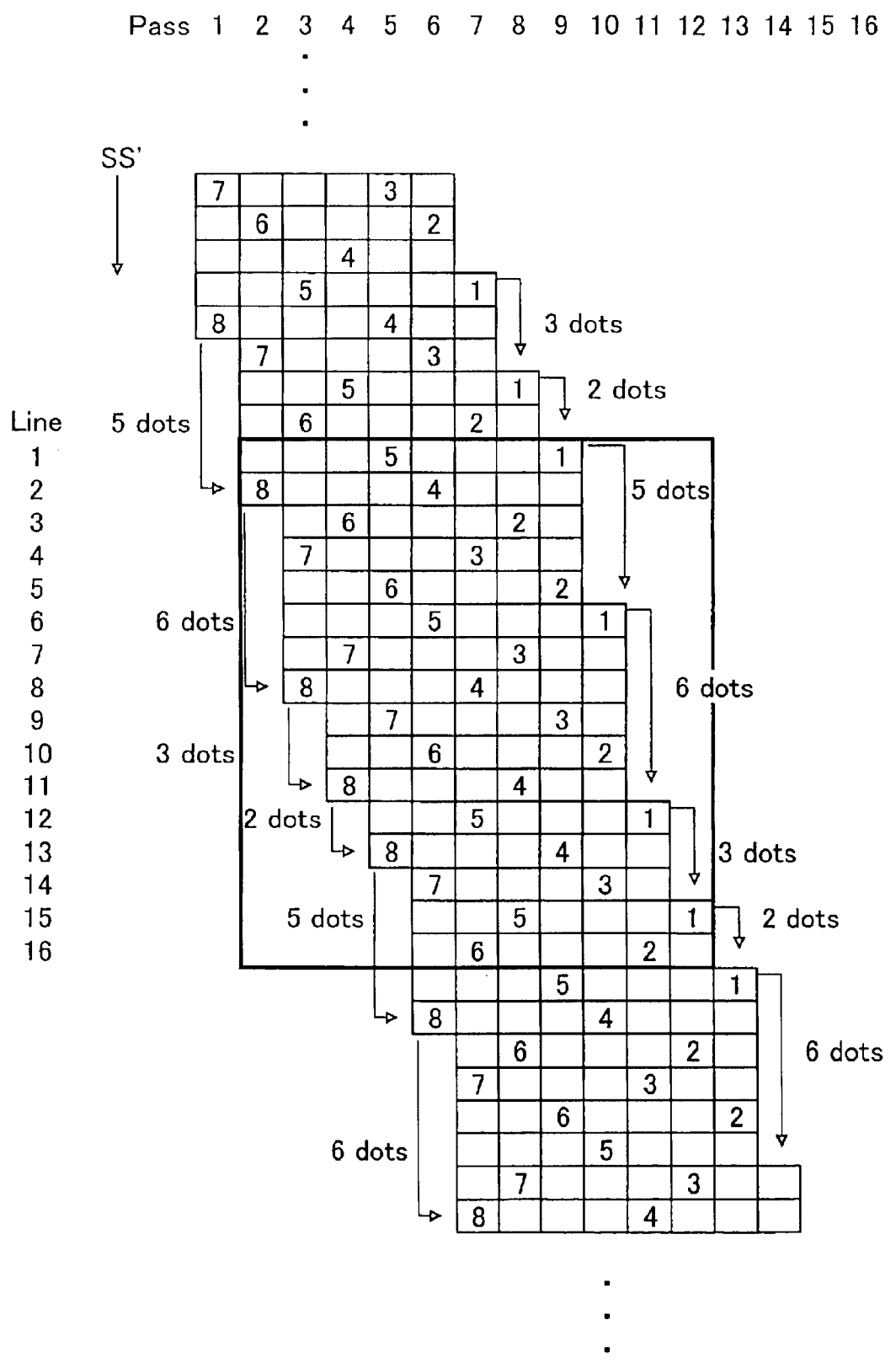

FIG. 44 is an illustrative diagram showing the manner in which main scan lines are recorded on printing paper in a second dot recording mode in Example 2 of the third embodiment. Whereas in first dot recording mode, sub-scan by 5 dots, 2 dots, 3 dots and 6 dots is performed repeatedly at intervals between main scans, in second dot recording mode sub-scan is performed repeatedly in the order 5 dots, 6 dots, 3 dots, 2 dots. During printing in second dot recording mode, recording of areas analogous to the area shown enclosed in a thick box in FIG. 44 are repeated in the direction of arrow SS'. In both the first dot recording mode and second dot recording mode, the average value for feed amount of sub-scans included in the unit sub-scan is 4 dots.

The third line from the top in the area shown enclosed in a thick box in FIG. 43 is recorded by nozzles #7 and #3. The fourth line from the top is recorded by nozzles #8 and #4. In contradistinction to this, in FIG. 44, the third line from the top is recorded by nozzles #6 and #2, and the fourth line from the top is recorded by nozzles #7 and #3. In this, way, numbers assigned to nozzles that record adjacent main scan lines differ between the first dot recording mode and second dot recording mode. As a result, first dot recording mode and second dot recording mode employ mutually different combinations of nozzles to record a plurality of pixels contiguous in the sub-scanning direction SS'.

The eighth line from the top in the area shown enclosed in a thick box is recorded in FIG. 43 in pass 7 and pass 11, whereas in FIG. 44 it is recorded in pass 3 and pass 7. In this way, first dot recording mode and second dot recording mode also record main scan lines in different passes.

Numbers assigned to nozzles recording adjacent main scan lines, as well as the passes in which these main scan lines are recorded, differ between first dot recording mode and second dot recording mode. It is accordingly possible for quality of printed results to differ. In this way, a dot recording mode giving a printed result of high quality can be selected even in a situation where test patches such as those shown in FIG. 41 are formed in different dot recording modes, these modes having different orders for a plurality of sub-scans included in the unit sub-scan, and dot recording mode is selected.

D. Example 3

A printer may be adjusted in a number of ways other than selection of one dot recording mode from among dot recording modes having different sub-scanning, as described in Example 1 and Example 2. Example 3 describes the order of adjustment through selection of one dot recording mode from among dot recording modes having different sub-scanning, as described in Example 1 and Example 2, and other adjustments.

Where dots are formed on printing paper by ejecting ink drops from nozzles during both a forward pass in which the nozzle group and/or printing medium are moved in a first direction (for example, rightward in FIG. 33) and a reverse pass in which the nozzle group and/or printing medium are moved in a second direction that is the reverse of the first direction (for example, leftward in FIG. 33), it is desirable to determine an adjustment value that adjusts the timing of ink drop ejection during the forward pass and/or reverse pass. This is because by adjusting the timing of ink drop ejection, ink drops ejected onto a same given location during the forward pass and reverse pass can actually be deposited at the same location.

Also, in printing by recording in a plurality of different main scans a plurality of pixels included in a single main scan line, it is desirable that the order of recording of the plurality of pixels included in a single main scan line be such that the printed results have the highest quality. For example, as shown in FIG. 35, in first dot recording mode, pixels contained in line 70 are recorded in two passes, by nozzle #88 or nozzle #41. However, each main scan line could instead be recorded in three passes by three nozzles #a, #b, #c. In this case, it is conceivable that quality of printed results will differ depending on whether contiguous pixels are recorded in the order of nozzle #a, #b, #c, #a, #b, #c, or recorded in the order of nozzle #a, #c, #b, #a, #c, #b. Accordingly, it is desirable to prepare a plurality of patterns for the order in which a plurality of pixels included in a single scan line are recorded, and to select from among these the recording order that gives printed results of the best quality.

Figure 45:
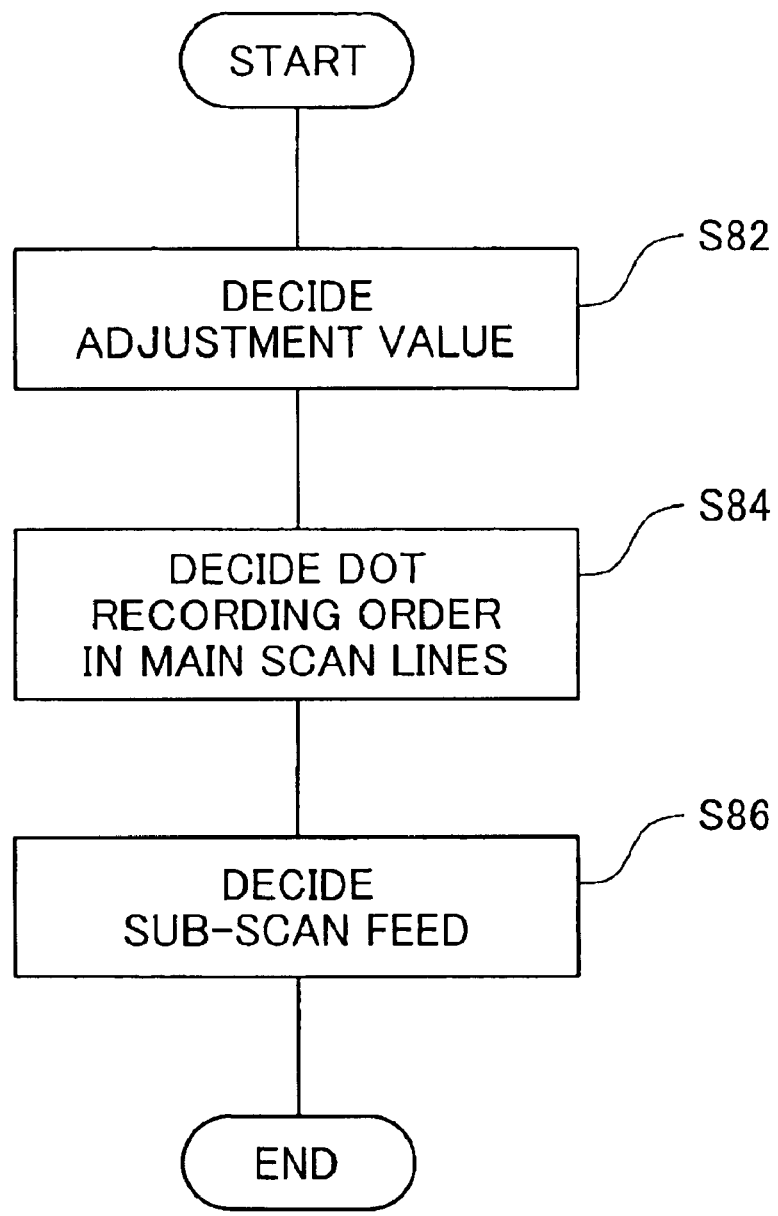
FIG. 45 is a flow chart showing the procedure of selecting sub-scan feed and performing other adjustments.

FIG. 45 is a flow chart showing the procedure of selecting sub-scan feed and performing other adjustments. In Example 3 of the third embodiment, in Step S82, the aforementioned adjustment value for ink drop ejection timing in the main scan forward pass and reverse pass is determined. A detailed example of the procedure of Step S82 could be as follows, for example. First, using a plurality of candidate adjustment values, dots are formed on the printing medium during the forward and reverse passes, to form on the printing medium a plurality of second color patches that reproduce mutually equivalent colors. An adjustment value is then selected from among the plurality of candidate adjustment values, on the basis of the plurality of second color patches.

After Step S82, in Step S84, the order of recording a plurality of pixels included in a single main scan line is determined. A detailed example of the procedure of Step S84 could be as follows, for example. First, in a plurality of second dot recording modes having mutually different orders of recording a plurality of pixels included in a single main scan line, third test patches are formed on the printing medium. The second dot recording mode is then selected by selecting one test patch from among the third test patches.

After Step S84, in Step S86, a single dot recording mode is selected from among the dot recording modes of different sub-scan patterns in the manner described previously in Example 1 and Example 2, to decide the sub-scan feed. Since the pixel dot recording order for each main scan line has been decided previously in Step S84, in Step S86 a single dot recording mode is selected from among a plurality of dot recording modes having mutually equivalent recording orders of the plurality of pixels included in a single main scan line.

With this arrangement, settings that will give printed results of high quality can be made through efficient adjustment. That is, with an arrangement such as that of Example 3 of the third embodiment, adjustments to minimize deviation in dot formation location due to different causes can be made individually and sequentially. In Step S86, a dot recording mode whereby sub-scan gives a printed result of the best quality can be selected from among the candidates of dot recording modes previously optimized in respect of adjustment values compensating for deviation of dot formation location due to dot recording in main scan forward passes and reverse passes, and the dot recording order in the main scanning direction.

E. Modifications of the Third Embodiment (1) Examples 1 and 2 of the third embodiment printing wherein a single main scan line is recorded in two main scans. However, the invention is applicable to other printing strategies, such as those in which a single main scan line is recorded in three or four main scans. Also, dot recording mode may be selected from among a plurality of dot recording modes in which the number of the main scans needed to record all pixels included in a single main scan line are different.

Figure 46:
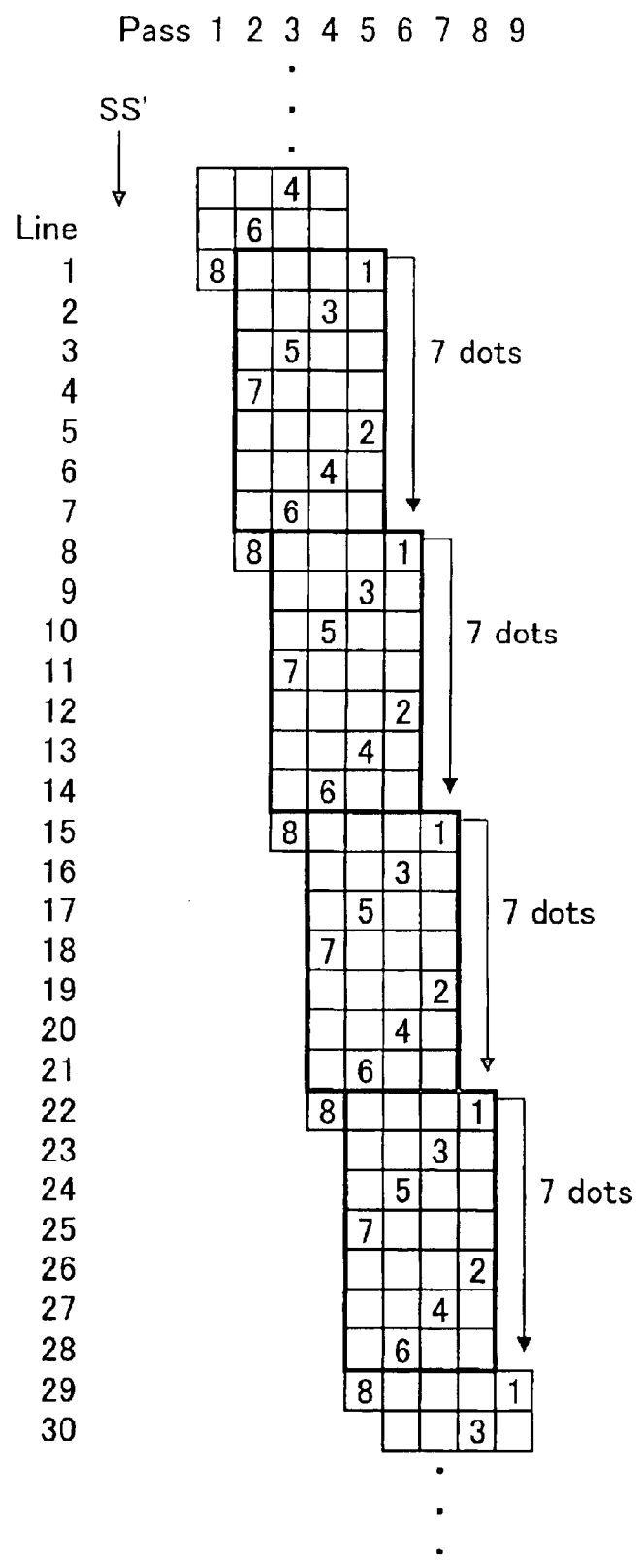
Figure 47:
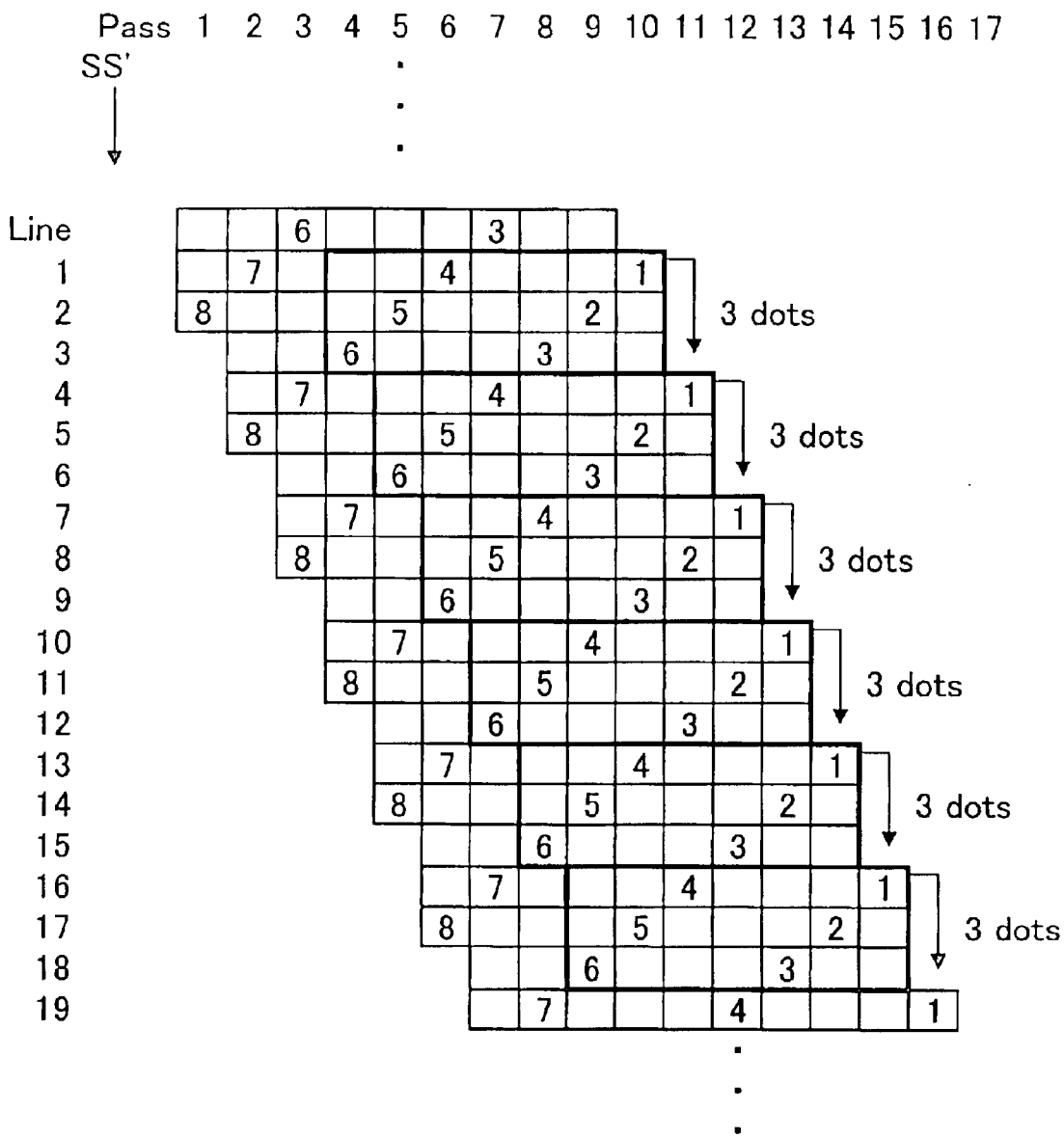
FIG. 47 is an illustrative diagram depicting printing in a dot recording mode that involves a 3-dot constant feed in a printer having eight nozzles.

FIG. 46 is an illustrative diagram depicting printing in a dot recording mode that involves a 7-dot constant feed in a printer having eight nozzles. FIG. 47 is an illustrative diagram depicting printing in a dot recording mode that involves a 3-dot constant feed in a printer having eight nozzles. In the dot recording mode of FIG. 46 the number of main scans needed to record all pixels included in a single main scan line is 1. In the dot recording mode of FIG. 46, nozzle #8 is not used. In the dot recording mode of FIG. 47, the number of main scans needed to record all pixels included in a single main scan line is 2. In the dot recording mode of FIG. 47, nozzle #7 and nozzle #8 are not used.

During selection of dot recording mode, dot recording mode may be selected from among dot recording modes like those shown in FIG. 46 and FIG. 47. For example, using a procedure analogous to that of FIG. 30, in step S62, color patches are printed in dot recording modes like those shown in FIG. 46 and FIG. 47. Next, in Step S64, a dot recording mode is selected, and in Step S66 the number of the dot recording mode is entered into the computer. In other words, the plurality of dot recording modes that print color patches can be dot recording modes in which sub-scan conducted at intervals between the main scans differs in content.

(2) The first dot recording mode and second dot recording mode shown in Example 2 are in a relationship of different order of performing a plurality of sub-scans included in a unit sub-scan. However, the invention may also be realized as embodiment in which a single dot recording mode is selected from among dot recording modes having different feed amounts of a plurality of sub-scans included in a unit sub-scan. That is, the plurality of dot recording modes by which color patches are formed may consist of a number of dot recording modes in which a unit sub-scan is repeated that includes sub-scans by a plurality of different feed amounts, and the order of executing sub-scans by a plurality of different feed amounts included in the sub-scan, and/or the plurality of feed amounts, differs.

The plurality of dot recording modes wherein sub-scans included in a unit sub-scan have different feed amounts do not need to have equal average values of the feed amount of the sub-scans included in the unit sub-scan. In dot recording modes that print color patches, however, it is preferable for these average values of feed amount that are substantially equal. Here, the sentence "average values of feed amount are substantially equal" refers to the fact that the average feed amount of the dot recording mode with the smallest average feed amount is equivalent to at least 80% of the average feed amount of the dot recording mode with the greatest average feed amount. By selecting a dot recording mode to be used from among a plurality of dot recording modes having small differences in average feed amount, print speed will not be slowed appreciably regardless of which dot recording mode is selected. This allows the user to select the dot recording mode giving the highest quality printed result, without concern for printing speed. In preferred practice, the feed amount in the dot recording mode with the smallest average feed amount will be equivalent to at least 90% of the feed amount in the dot recording mode with the greatest average feed amount.

(3) In the examples, test patches are printed using light cyan, light magenta and yellow inks, but the combination of inks used is not limited thereto. For example, where the colored inks employed in color printing are of the three colors magenta, cyan and yellow, test patches may be printed using the inks of these three colors. In printers that use four colors of ink, quality of printed results is appreciably affected by deviation in dot formation placement, and accordingly it is preferable to apply the invention to implementation in printers that use four colors of ink.

Where the colored inks employed in color printing are of the five colors dark magenta, dark cyan, yellow, light magenta and light cyan, printing of test patches is not limited to the three colors of yellow, light magenta and light cyan, but may employ other ink combinations. That is, the patches may be formed with one or two colors, provided that the patches formed in the dot recording modes enable quality of the printed results to be observed.

Where color patches are formed with a single color, it is preferable to form the dots in such a way that spaces are produced among the formed dots. For example, where dots are formed so as to extend beyond the range of a single pixel, it is preferable to leave a pixel having no dot recorded thereon between pixels recorded by dots, rather than recording all pixels with dots. Where all pixels are recorded with dots, it is preferable to form the dots such that they do not extend beyond the range of their pixels. With this arrangement, it is possible to form test patches that make variations in shading readily apparent.

When selecting a dot recording mode, it is preferable to form test patches using three colors of chromatic ink, and especially preferable for the three colors to be the three colors of cyan, magenta and yellow, or three colors similar to these colors. By forming test patches with these colors and selecting a dot recording mode, quality of color printing can be improved.

(4) In the examples, the group of nozzles that eject single-color inks are configured as nozzle rows composed of nozzles arranged in rows, but nozzle arrangement is not limited to this. Any set of nozzles that eject single-color inks is acceptable.

(5) In the preceding examples, an ink-jet printer is described, but the invention is not limited to ink-jet printers, and can be implemented generally in any of a number of various printing devices that print using a print head. Further, the invention is not limited to methods and devices that eject ink drops, and can be implemented in other methods or devices the record dots by other means.

(6) Selection of the aforementioned dot recording mode may be performed by the user using the printing device, or dot recording mode may be selected and preset during the printing device production process.

(7) In the preceding examples, some of the arrangements realized through hardware may be substituted by software, and conversely some of the arrangements realized through software may be substituted by hardware. For example, the function of transferring a portion of the data held in the receiving buffer shown in FIG. 34 to the expansion buffer 316, or the function of acquiring a portion of the data held in the expansion buffer 316 for the main scan unit all and sub-scan unit 312, could be performed by hardware. These functions could also be performed by the printer driver 288*a* in computer 288.

What is claimed is:

1. A dot recording method for recording ink dots on a printing medium with a printing head that has a plurality of nozzles arranged in a sub-scanning direction substantially perpendicular to a main scanning direction while moving the printing head in the main scanning direction, the plurality of nozzles being arranged in the sub-scanning direction at a nozzle pitch of k times (k is an integer of 2 or greater) a dot pitch in the sub-scanning direction comprising the steps of:
   (a) forming a test pattern on a printing medium, the test pattern including a plurality of color patches printed in a plurality of printing modes, respectively, for selecting a printing mode from among the plurality of printing modes which are different from each other in a sub-scan feed amount and/or an adjustment value for a sub-scan feed amount, and
   (b) recording dots in accordance with a printing mode selected based on printing result of the test pattern, wherein step (a) comprises a step of:
   (a1) printing the plurality of color patches in the printing modes including different correction values, respectively, in accordance with an interlace recording mode.

2. A dot recording method according to claim 1, wherein the step (a1) comprises steps of:
   (i) selecting N nozzles (N is an integer of 2 or greater) for each color among the plurality of nozzles as used nozzles;
   (ii) performing (k−1) scan sets each comprising a single main scan and a sub-scan feed by a first feed amount that is equal to the dot pitch in the sub-scanning direction, and then further performing a single main scan and a sub-scan feed by a second feed amount which is equal to {N×k−(k −1)} time the dot pitch; and
   (iii) printing the test pattern by repeatedly performing the step (ii).

3. A dot recording method according to claim 2, wherein the plurality of color patches is gray patches that are reproduced by composite black.

4. A dot recording method according to claim 2, wherein the plurality of color patches is monochromatic patches that are reproduced using one ink among inks of black, cyan and magenta.

5. A dot recording method according to claim 2, wherein the plurality of color patches is color patches of a secondary color that is reproduced using two inks among inks of three colors of cyan, magenta and yellow.

6. A dot recording method for recording ink dots on a printing medium with a printing head that has a plurality of nozzles arranged in a sub-scanning direction substantially perpendicular to a main scanning direction while moving the printing head in the main scanning direction, comprising the steps of:
   (a) forming a test pattern on a printing medium, the test pattern including a plurality of color patches printed in a plurality of printing modes, respectively, for selecting a printing mode from among the plurality of printing modes which are different from each other in a sub-scan feed amount and/or an adjustment value for a sub-scan feed amount, and (b) recording dots in accordance with a printing mode selected based on printing result of the test pattern, wherein step (a) comprises a step of:

(a1) printing the plurality of color patches with one type of ink and at an ink duty of less than 100% in the printing modes including different correction values, respectively.

7. A dot recording method according to claim 6, wherein the ink duty is varied depending on a type of the printing medium.

8. A dot recording method according to claim 6, wherein the plurality of color patches is gray patches reproduced by means of black ink.

9. A dot recording method according to claim 8, wherein the ink duty of each of the gray patches is a value in a range of about 70% to about 90%.

10. A dot recording method according to claim 6, wherein the plurality of color patches is arrayed in a row in the sub-scanning direction on a single sheet of printing medium.

11. A dot recording method according to claim 10, wherein the print head comprises a color nozzle row wherein a plurality of color nozzle groups is arranged in predetermined order in the sub-scanning direction, and a black nozzle row arranged juxtaposed to the color nozzle row, and the plurality of color patches is printed using only some of a plurality of black nozzles included in the black nozzle row.

12. A dot recording method for recording ink dots on a printing medium with a printing head that has a plurality of nozzles arranged in a sub-scanning direction substantially perpendicular to a main scanning direction while moving the printing head in the main scanning direction, comprising the steps of:

(a) forming a test pattern on a printing medium, the test pattern including a plurality of color patches printed in a plurality of printing modes, respectively, for selecting a printing mode from among the plurality of printing modes which are different from each other in a sub-scan feed amount and/or an adjustment value for a sub-scan feed amount, and (b) recording dots in accordance with a printing mode selected based on printing result of the test pattern, wherein the printing modes involve recording a plurality of pixels on a single main scan line over a plurality of different main scans, and wherein step (a) comprises a step of:

(a1) forming the color patches on the printing medium using the plurality of printing modes in which the number of main scans needed to record all pixels on a single main scan line is mutually equal, and in which the sub-scan feed content conducted at intervals between the main scans is mutually different.

13. A dot recording method according to claim 12, wherein the plurality of printing modes employs different combinations of nozzles for recording a plurality of pixels that are contiguous in the sub-scanning direction.

14. A dot recording method according to claim 12, wherein the step (a1) comprises a step of:

forming the color patches on the printing medium using the plurality of printing modes each of which involves repeated execution of the sub-scan by a single constant feed amount, wherein the printing modes mutually differ in the feed amount.

15. A dot recording method according to claim 14, wherein the feed amounts in the plurality of printing modes of mutually different feed amounts are substantially equal.

16. A dot recording method according to claim 12, wherein the step (a1) comprises a step of:

forming color patches on the printing medium using the plurality of printing modes each involving repeated execution of a unit sub-scan, the unit sub-scan including sub-scans with a plurality of feed amounts, wherein the printing modes differ in an order of execution of sub-scans with the plurality of feed amounts included in the unit sub-scan, and/or in the plurality of feed amounts.

17. A dot recording method according to claim 16, wherein the plurality of printing modes for repeated execution of the unit sub-scan has substantially equal average values for feed amount of the sub-scans included in the unit sub-scan.

18. A dot recording method according to claim 12, wherein the step (a1) comprises a step of:

forming the color patches by forming dots with magenta, cyan and yellow inks in each of the printing modes.

19. A printing apparatus for printing by recording ink dots on a printing medium while moving a printing head in a main scanning direction, comprising:

a printing head including a plurality of nozzles arranged in a sub-scanning direction substantially perpendicular to a main scanning direction, the plurality of nozzles being arranged in the sub-scanning direction at a nozzle pitch of k times (k is an integer of 2 or greater) a dot pitch in the sub-scanning direction;

a main scan drive unit configured to move the printing head in the main scanning direction;

a sub-scan drive unit configured to move the printing medium in the sub-scanning direction by a plurality of intermittent feedings;

a head driving unit configured to eject ink droplets from the nozzles during the main scan of the printing head;

a control unit configured to control the main scan drive unit, the sub-scan drive unit and the head driving unit;

wherein the control unit is configured (a) to have a test pattern printing mode in which a test pattern is formed on a printing medium, the test pattern including a plurality of color patches printed in a plurality of printing modes, respectively, for selecting a printing mode from among the plurality of printing modes which are different each other in a sub-scan feed amount and/or an adjustment value for a sub-scan feed amount, and (b) in printing, to send to the sub-scan drive unit command data for recording dots in accordance with a printing mode selected based on printing result of the test pattern; and wherein the control unit prints the plurality of color patches in the printing modes including different correction values, respectively, in accordance with an interlace recording mode in printing the test pattern.

20. A printing apparatus according to claim 19, wherein the control unit is configured, in printing the test pattern,
(i) to select nozzles (N is an integer of 2 or greater) for each color among the plurality of nozzles as used nozzles;
(ii) to perform (k−1) scan sets each comprising a single main scan and a sub-scan feed by a first feed amount that is equal to the dot pitch in the sub-scanning direction, and then further performing a single main scan and a sub-scan feed by a second feed amount which is equal to {N×k−(k−1)} time the dot pitch; and
(iii) to print the test pattern by repeatedly performing the step (ii).

21. A printing apparatus according to claim 20, wherein the plurality of color patches is gray patches that are reproduced by composite black.

22. A printing apparatus according to claim 20, wherein the plurality of color patches is monochromatic patches that are reproduced using one ink among inks of black, cyan and magenta.

23. A printing apparatus according to claim 20, wherein the plurality of color patches is color patches of a secondary color that is reproduced using two inks among inks of three colors of cyan, magenta and yellow.

24. A printing apparatus for printing by recording ink dots on a printing medium while moving a printing head in a main scanning direction, comprising:
a printing head including a plurality of nozzles arranged in a sub-scanning direction substantially perpendicular to a main scanning direction;
a main scan drive unit configured to move the printing head in the main scanning direction;
a sub-scan drive unit configured to move the printing medium in the sub-scanning direction by a plurality of intermittent feedings;
a head driving unit configured to eject ink droplets from the nozzles during the main scan of the printing head;
a control unit configured to control the main scan drive unit, the sub-scan drive unit and the head driving unit;
wherein the control unit is configured
(a) to have a test pattern printing mode in which a test pattern is formed on a printing medium, the test pattern including a plurality of color patches printed in a plurality of printing modes, respectively, for selecting a printing mode from among the plurality of printing modes which are different each other in a sub-scan feed amount and/or an adjustment value for a sub-scan feed amount,
(a1) to print the plurality of color patches with one type of ink and at an ink duty of less than 100% in the printing modes including different correction values, respectively, in printing the test pattern, and
(b) in printing, to send to the sub-scan drive unit command data for recording dots in accordance with a printing mode selected based on printing result of the test pattern.

25. A printing apparatus according to claim 24, wherein the ink duty is varied depending on a type of the printing medium.

26. A printing apparatus according to claim 24, wherein the plurality of color patches is gray patches reproduced by means of black ink.

27. A printing apparatus according to claim 26, wherein the ink duty of each of the gray patches is a value in a range of about 70% to about 90%.

28. A printing apparatus according to claim 24, wherein the plurality of color patches is arrayed in a row in the sub-scanning direction on a single sheet of printing medium.

29. A printing apparatus according to claim 24, wherein the print head comprises a color nozzle row wherein a plurality of color nozzle groups are arranged in predetermined order in the sub-scanning direction, and a black nozzle row arranged juxtaposed to the color nozzle row, and
the plurality of color patches is printed using only some of a plurality of black nozzles included in the black nozzle row.

30. A printing apparatus for printing by recording ink dots on a printing medium while moving a printing head in a main scanning direction, comprising:
a printing head including a plurality of nozzles arranged in a sub-scanning direction substantially perpendicular to a main scanning direction;
a main scan drive unit configured to move the printing head in the main scanning direction;
a sub-scan drive unit configured to move the printing medium in the sub-scanning direction by a plurality of intermittent feedings;
a head driving unit configured to eject ink droplets from the nozzles during the main scan of the printing head;
a control unit configured to control the main scan drive unit, the sub-scan drive unit and the head driving unit;
wherein the control unit is configured
(a) to have a test pattern printing mode in which a test pattern is formed on a printing medium, the test pattern including a plurality of color patches printed in a plurality of printing modes, respectively, for selecting a printing mode from among the plurality of printing modes which are different each other in a sub-scan feed amount and/or an adjustment value for a sub-scan feed amount, and
(b) in printing, to send to the sub-scan drive unit command data for recording dots in accordance with a printing mode selected based on printing result of the test pattern;
an input unit configured to receive a data input from exterior;
wherein the printing modes involve recording a plurality of pixels on a single main scan line over a plurality of different main scans, and
wherein the control unit comprises:
a color patch forming unit configured to form the color patches on the printing medium using the plurality of printing modes in which the number of main scans needed to record all pixels on a single main scan line is mutually equal, and in which the sub-scan feed content conducted at intervals between the main scans is mutually different; and
a dot recording mode memory configured to store dot recording mode selection data which indicates a printing mode selected from among the plurality of printing modes based on the color patches and is entered via the input unit.

31. A printing apparatus according to claim 30, wherein the color patch forming unit is configured to form the color patches in the plurality of printing modes in which different combinations of nozzles are employed for recording a plurality of pixels that are contiguous in the sub-scanning direction.

32. A printing apparatus according to claim 30, wherein the color patch forming unit is configured to form the color patches on the printing medium using the plurality of printing modes each of which involves repeated execution of the sub-scan by a single constant feed amount, wherein the printing modes mutually differ in the feed amount.

33. A printing apparatus according to claim 32, wherein the feed amounts in the plurality of printing modes of mutually different feed amounts are substantially equal.

34. A printing apparatus according to claim 30, wherein the color patch forming unit is configured to form color patches on the printing medium using the plurality of printing modes each involving repeated execution of a unit sub-scan, the unit sub-scan including sub-scans with a plurality of feed amounts, wherein the printing modes differ in an order of execution of sub-scans with the plurality of feed amounts included in the unit sub-scan, and/or in the plurality of feed amounts.

35. A printing apparatus according to claim 34, wherein the plurality of printing modes for repeated execution of the unit sub-scan has substantially equal average values for feed amount of the sub-scans included in the unit sub-scan.

36. A printing apparatus according to claim 30, wherein a nozzle group comprises:
a magenta nozzle group configured to eject magenta ink;
a cyan nozzle group configured to eject cyan ink; and
a yellow nozzle group configured to eject yellow ink, and
the color patch forming unit is configured to form the color patches by forming dots with magenta, cyan and yellow inks in each of the printing modes.

37. A computer program product for correcting sub-scan feed amounts of a printing medium using a computer, the computer being connected with a dot recording device, the dot recording device being configured to perform printing by recording ink dots on a printing medium with a printing head while moving the printing head in a main scanning direction, the printing head having a plurality of nozzles arranged in a sub-scanning direction substantially perpendicular to the main scanning direction, the plurality of nozzles being arranged in the sub-scanning direction at a nozzle pitch of k times (k is an integer of 2 or greater) a dot pitch in the sub-scanning direction, the computer program product comprising:
a computer readable medium; and
a computer program stored on the computer readable medium, the computer program comprising:
(a) a first program for causing a computer to form a test pattern on a printing medium, the test pattern including a plurality of color patches printed in a plurality of printing modes, respectively, for selecting a printing mode from among the plurality of printing modes which are different each other in a sub-scan feed amount and/or an adjustment value for a sub-scan feed amount, and
(b) a second program for causing a computer to record dots in accordance with a printing mode selected based on printing result of the test pattern,
wherein the first program comprises a third program for causing a computer to print the plurality of color patches in the printing modes including different correction values, respectively, in accordance with an interlace recording mode.

38. A computer program product according to claim 37, wherein
the third program comprises a fourth program for causing a computer to execute the steps of:
(i) selecting N nozzles (N is an integer of 2 or greater) for each color among the plurality of nozzles as used nozzles;
(ii) performing (k−1) scan sets each comprising a single main scan and a sub-scan feed by a first feed amount that is equal to the dot pitch in the sub-scanning direction, and then further performing a single main scan and a sub-scan feed by a second feed amount which is equal to {N×k−(k−1)} time the dot pitch; and
(iii) printing the test pattern by repeatedly performing the step (ii).

39. A computer program product for correcting sub-scan feed amounts of a printing medium using a computer, the computer being connected with a dot recording device, the dot recording device being configured to perform printing by recording ink dots on a printing medium with a printing head while moving the printing head in a main scanning direction, the printing head having a plurality of nozzles arranged in a sub-scanning direction substantially perpendicular to the main scanning direction, the computer program product comprising:
a computer readable medium; and
a computer program stored on the computer readable medium, the computer program comprising:
(a) a first program for causing a computer to form a test pattern on a printing medium, the test pattern including a plurality of color patches printed in a plurality of printing modes, respectively for selecting a printing mode from among the plurality of printing modes which are different each other in a sub-scan feed amount and/or an adjustment value for a sub-scan feed amount, and
(b) a second program for causing a computer to record dots in accordance with a printing mode selected based on printing result of the test pattern,
wherein the first program comprises a third program for causing a computer to print the plurality of color patches with one type of ink and at an ink duty of less than 100% in the printing modes including different correction values, respectively.

40. A computer program product for correcting sub-scan feed amounts of a printing medium using a computer, the computer being connected with a dot recording device, the dot recording device being configured to perform printing by recording ink dots on a printing medium with a printing head while moving the printing head in a main scanning direction, the printing head having a plurality of nozzles arranged in a sub-scanning direction substantially perpendicular to the main scanning direction, the computer program product comprising:
a computer readable medium; and
a computer program stored on the computer readable medium, the computer program comprising:
(a) a first program for causing a computer to form a test pattern on a printing medium, the test pattern including a plurality of color patches printed in a plurality of printing modes, respectively, for selecting a printing mode from among the plurality of printing modes which are different each other in a sub-scan feed amount and/or an adjustment value for a sub-scan feed amount, and (b) a second program for causing a computer to record dots in accordance with a printing mode selected based on printing result of the test pattern, wherein the printing modes involve recording a plurality of pixels on a single main scan line over a plurality of different main scans, and wherein the first program comprises a third program for causing a computer to form the color patches on the printing medium using the plurality of dot recording modes in which the number of main scans needed to record all pixels on a single main scan line is mutually equal, and in which the sub-scan feed content conducted at intervals between the main scans is mutually different.

41. A computer program product according to claim 40, wherein the computer readable medium further stores image data for forming the color patches.

42. A dot recording method for recording ink dots on a printing medium with a printing head that has a plurality of nozzles arranged in a sub-scanning direction substantially perpendicular to a main scanning direction while moving the printing head in the main scanning direction, comprising the steps of:

(a) forming a test pattern on a printing medium, the test pattern including a plurality of color patches printed in a plurality of printing modes, respectively, for selecting a printing mode from among the plurality of printing modes which employ different combinations of nozzles for recording a plurality of pixels that are contiguous in the sub-scanning direction, and (b) recording dots in accordance with a printing mode selected based on printing result of the test pattern.

43. A printing apparatus for printing by recording ink dots on a printing medium while moving a printing head in a main scanning direction, comprising:

a printing head including a plurality of nozzles arranged in a sub-scanning direction substantially perpendicular to a main scanning direction;

a main scan drive unit configured to move the printing head in the main scanning direction;

a sub-scan drive unit configured to move the printing medium in the sub-scanning direction by a plurality of intermittent feedings;

a head driving unit configured to eject ink droplets from the nozzles during the main scan of the printing head;

a control unit configured to control the main scan drive unit, the sub-scan drive unit and the head driving unit;

wherein the control unit is configured (a) to have a test pattern printing mode in which a test pattern is formed on a printing medium, the test pattern including a plurality of color patches printed in a plurality of printing modes, respectively, for selecting a printing mode from among the plurality of printing modes which employ different combinations of nozzles for recording a plurality of pixels that are contiguous in the sub-scanning direction, and (b) in printing, to send to the sub-scan drive unit command data for recording dots in accordance with a printing mode selected based on printing result of the test pattern.

44. A computer program product for correcting sub-scan feed amounts of a printing medium using a computer, the computer being connected with a dot recording device, the dot recording device being configured to perform printing by recording ink dots on a printing medium with a printing head while moving the printing head in a main scanning direction, the printing head having a plurality of nozzles arranged in a sub-scanning direction substantially perpendicular to the main scanning direction, the computer program product comprising:

a computer readable medium; and a computer program stored on the computer readable medium, the computer program comprising:

(a) a first program for causing a computer to form a test pattern on a printing medium, the test pattern including a plurality of color patches printed in a plurality of printing modes, respectively, for selecting mode from among the plurality of printing modes which employ different combination of nozzles for recording a plurality of pixels that are contiguous in the sub-scanning direction, and a second program for causing a computer to record dots in accordance with a printing mode selected based on printing result of the test pattern.

* * * * *